(12) United States Patent
Lee et al.

(10) Patent No.: US 10,080,213 B2
(45) Date of Patent: Sep. 18, 2018

(54) METHOD FOR TRANSMITTING BUFFER STATUS REPORT IN DEVICE-TO-DEVICE COMMUNICATION, AND DEVICE THEREOF

(71) Applicant: KT CORPORATION, Gyeonggi-do (KR)

(72) Inventors: KyungJun Lee, Seoul (KR); Seunghyun Kang, Seoul (KR); Kyujin Park, Seoul (KR); Woo-jin Choi, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 30 days.

(21) Appl. No.: 15/054,077

(22) Filed: Feb. 25, 2016

(65) Prior Publication Data
US 2016/0183241 A1    Jun. 23, 2016

Related U.S. Application Data

(62) Division of application No. 14/910,026, filed as application No. PCT/KR2014/007081 on Jul. 31, 2014.

(30) Foreign Application Priority Data

Aug. 9, 2013 (KR) ........................ 10-2013-0094718
Sep. 6, 2013 (KR) ........................ 10-2013-0107593
(Continued)

(51) Int. Cl.
*H04W 72/04* (2009.01)
*H04W 76/14* (2018.01)
(Continued)

(52) U.S. Cl.
CPC ... *H04W 72/0406* (2013.01); *H04W 56/0015* (2013.01); *H04W 72/0453* (2013.01);
(Continued)

(58) Field of Classification Search
None
See application file for complete search history.

(56) References Cited

U.S. PATENT DOCUMENTS 9,681,479 B2 * 6/2017 Kalhan ............... H04W 76/023
2012/0093098 A1   4/2012 Charbit et al.
(Continued)

FOREIGN PATENT DOCUMENTS

CN           102334368 A    1/2012
KR   10-2011-0089311 A    8/2011
(Continued)

OTHER PUBLICATIONS

CMCC, "Discussion on LTE D2D Discovery", R2-132334, 3GPP TSG-RAN WG2 Meeting #83, Barcelona, Spain, Aug. 19-23, 2013.

*Primary Examiner* — Jamal Javaid
*Assistant Examiner* — Rosene Clark
(74) *Attorney, Agent, or Firm* — IP Legal Services, LLC

(57) ABSTRACT

Provided are a method for transmitting a buffer status report (BSR), and a device thereof, and to: a method by which a first terminal transmits and receives a BSR required for performing device-to-device communication with a second terminal in order to efficiently allocate a wireless resource to be used for the device-to-device communication; and a device therefor. Specifically, provided are a method and a device by which the first terminal performs device-to-device communication with the second terminal. Such a method includes triggering a BSR for the device-to-device communication with the second terminal, transmitting the BSR to a base station or a wireless resource allocation entity, and receiving wireless resource allocation information for the device-to-device communication with the second terminal from the base station or the wireless resource allocation entity.

20 Claims, 39 Drawing Sheets

(30) Foreign Application Priority Data

| Oct. 31, 2013 | (KR) | ........................ 10-2013-0131376 |
| Jan. 23, 2014 | (KR) | ........................ 10-2014-0008556 |
| Feb. 17, 2014 | (KR) | ........................ 10-2014-0017610 |
| May 19, 2014 | (KR) | ........................ 10-2014-0059638 |

(51) Int. Cl.
*H04W 56/00* (2009.01)
*H04W 72/12* (2009.01)
*H04W 88/06* (2009.01)
*H04W 88/10* (2009.01)

(52) U.S. Cl.
CPC ... *H04W 72/1215* (2013.01); *H04W 72/1284* (2013.01); *H04W 76/14* (2018.02); *H04W 72/1242* (2013.01); *H04W 88/06* (2013.01); *H04W 88/10* (2013.01)

(56) References Cited

U.S. PATENT DOCUMENTS

2012/0134344 A1  5/2012  Yu et al.
2013/0064103 A1  3/2013  Koskela et al.
2013/0150061 A1  6/2013  Shin et al.
2014/0003319 A1  1/2014  Etemad
2014/0023008 A1  1/2014  Ahn et al.
2014/0044024 A1  2/2014  Zou et al.
2014/0064203 A1  3/2014  Seo et al.
2014/0241262 A1  8/2014  Novak et al.
2014/0314039 A1* 10/2014  Jang ................ H04W 76/023
                                                 370/329
2015/0282155 A1  10/2015  Webb et al.
2015/0358838 A1  12/2015  Wei et al.
2016/0073392 A1*  3/2016  Byun ................ H04W 72/048
                                                 370/280
2016/0143078 A1  5/2016  Jeong
2017/0013661 A1*  1/2017  Kalhan ............... H04W 76/023

FOREIGN PATENT DOCUMENTS

KR   10-2012-0074254 A    7/2012
KR   10-2013-0065373 A    6/2013
WO      2011/015250 A1    2/2011
WO      2012/128505 A2    9/2012
WO      2013/073915 A1    5/2013

* cited by examiner

SHORT BSR MAC CONTROL ELEMENT FORMAT

LONG BSR MAC CONTROL ELEMENT FORMAT

D2D BSR MAC CONTROL ELEMENT FORMAT

FIG.8
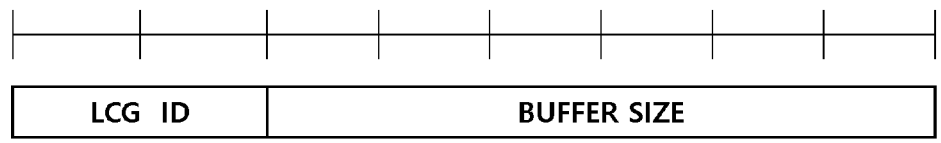
(A) D2D SHORT BSR MAC CONTROL ELEMENT FORMAT
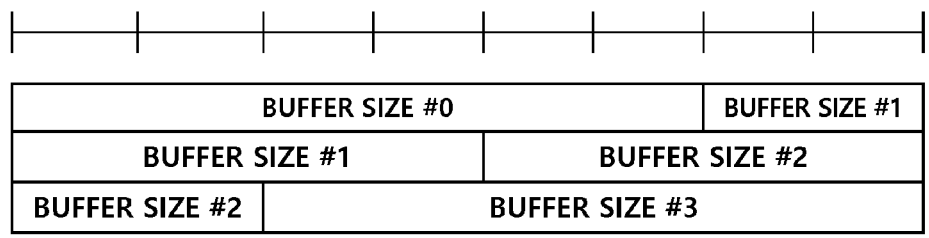
(B) D2D LONG BSR MAC CONTROL ELEMENT FORMAT

| INDEX | LCID VALUES |
|---|---|
| 00000 | CCCH |
| 00001-01010 | IDENTITY OF THE LOGICAL CHANNEL |
| 01011-10111 | RESERVED |
| 11000 | D2D BSR (e.g. LONG BSR OR SHORT BSR) |
| 11001 | EXTENDED POWER HEADROOM REPORT |
| 11010 | POWER HEADROOM REPORT |
| 11011 | C-RNTI |
| 11100 | TRUNCATED BSR |
| 11101 | SHORT BSR |
| 11110 | LONG BSR |
| 11111 | PADDING |

900 { (rows 11000)

FIG.10

| INDEX | LCID VALUES |
|---|---|
| 00000 | CCCH |
| 00001-01010 | IDENTITY OF THE LOGICAL CHANNEL |
| 01011-10111 | RESERVED |
| 10110 | D2D TRUNCATED BSR |
| 10111 | D2D SHORT BSR |
| 11000 | D2D LONG BSR |
| 11001 | EXTENDED POWER HEADROOM REPORT |
| 11010 | POWER HEADROOM REPORT |
| 11011 | C-RNTI |
| 11100 | TRUNCATED BSR |
| 11101 | SHORT BSR |
| 11110 | LONG BSR |
| 11111 | PADDING |

1000: {10110, 10111, 11000}
1010: {11100, 11101, 11110}

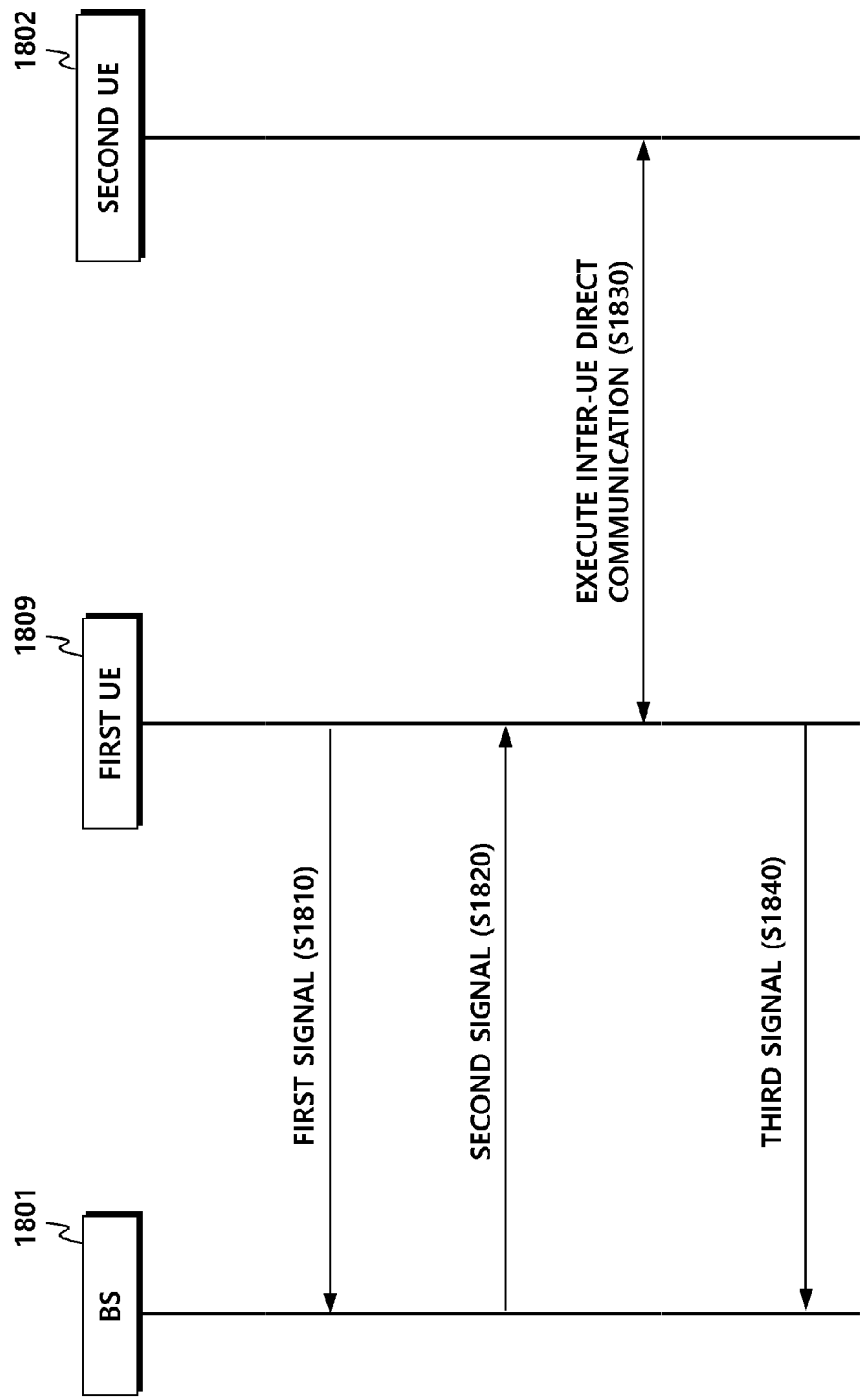

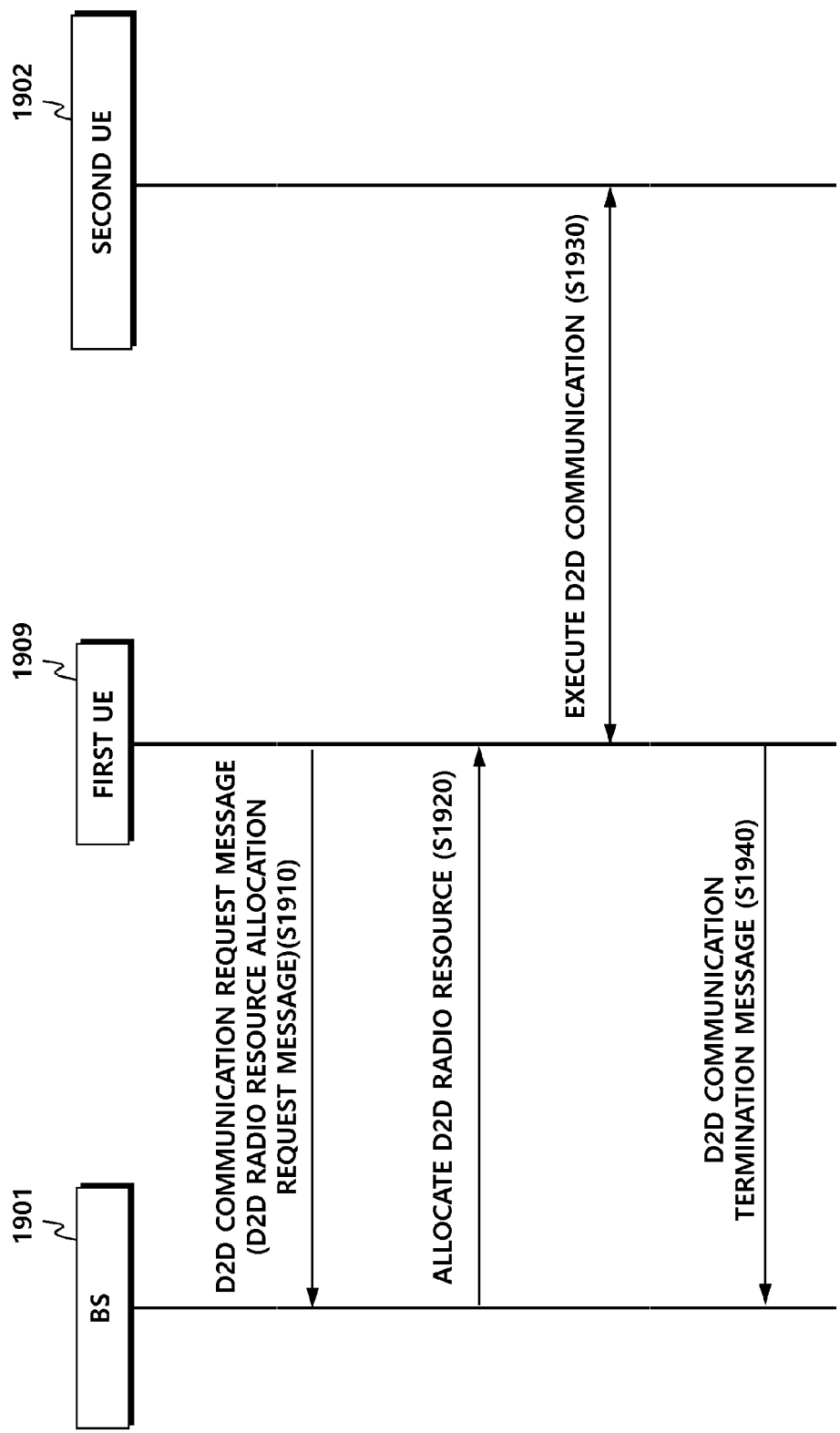

FIG.20

RADIORESOURCECONFIGDEDICATED INFORMATION ELEMENT 2000

```
-- ASN1START

RadioResourceConfigDedicated ::=    SEQUENCE {
    srb-ToAddModList                SRB-ToAddModList           OPTIONAL,   -- Cond HO-Conn
    drb-ToAddModList                DRB-ToAddModList           OPTIONAL,   -- Cond HO-toEUTRA
    drb-ToReleaseList               DRB-ToReleaseList          OPTIONAL,   -- Need ON
    mac-MainConfig                  CHOICE {
        explicitValue                   MAC-MainConfig,
        defaultValue                    NULL
    }                                                          OPTIONAL,   -- Cond HO-
    toEUTRA2
    sps-Config                      SPS-Config                 OPTIONAL,   -- Need ON
    physicalConfigDedicated         PhysicalConfigDedicated    OPTIONAL,   -- Need ON
    d2d-Config                      D2D-Config                 OPTIONAL,   -- Need ON     2010
    ....,
    [[ rlf-TimersAndConstants-r9    RLF-TimersAndConstants-r9  OPTIONAL    -- Need ON
    ]],
    [[ measSubframePatternPCell-r10 MeasSubframePatternPCell-r10 OPTIONAL  -- Need ON
    ]],
    [[ neighCellsCRS-Info-r11       NeighCellsCRS-Info-r11     OPTIONAL    -- Need ON
    ]]
}
....

-- ASN1STOP
```

FIG. 21

D2D-CONFIG INFORMATION ELEMENT                                      2100

```
-- ASN1START

D2D-Config ::=      SEQUENCE {
    D2DC-RNTI           C-RNTI                              OPTIONAL,       -- Need OR
    release             NULL,
    setup               SEQUENCE {
        groupID             BIT STRING (SIZE (16)),
        d2dDiscoveryFrequency   CHOICE {
            eutra-r9            ARFCN-ValueEUTRA,
            utra-r9             ARFCN-ValueEUTRA,
            ...,
            eutra2-v9e0         ARFCN-ValueEUTRA-v9e0
        },
        d2dFrequency        CHOICE {
            eutra-r9            ARFCN-ValueEUTRA,
            utra-r9             ARFCN-ValueEUTRA,
            ...,
            eutra2-v9e0         ARFCN-ValueEUTRA-v9e0
        },
        D2DsemiPersistSchedInterval   ENUMERATED {
                                sf10, sf20, sf32, sf40, sf64, sf80,
                                sf128, sf160, sf320, sf640, spare6,
                                spare5, spare4, spare3, spare2,
                                spare1}                     OPTIONAL,       -- Need OR,
        numberOfConfSPS-Processes   INTEGER (1..8),
        Duration            ENUMERATED {
                                min10, min20, min40, min60, min90, min120,
                                spare2, spare1},
        drb-ToAddModList    DRB-ToAddModList                OPTIONAL,
        d2dUE-Identity      PagingUE-Identity,
        ...
    }
}
```

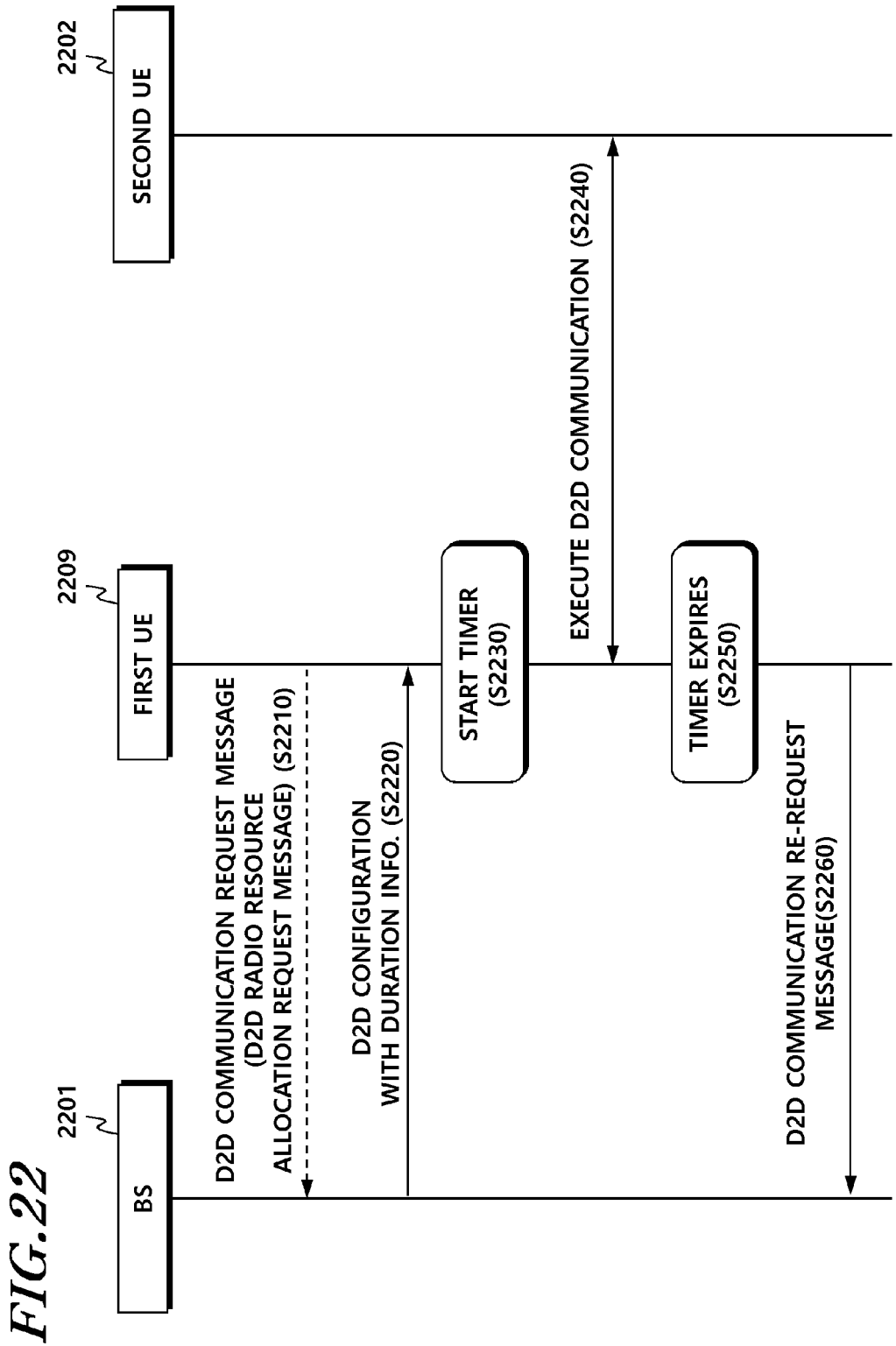

FIG.23

```
-- ASN1START

SPS-Config ::=          SEQUENCE {
    semiPersistSchedC-RNTI      C-RNTI              OPTIONAL,   -- Need OR
    sps-ConfigDL                SPS-ConfigDL        OPTIONAL,   -- Need ON
    sps-ConfigUL                SPS-ConfigUL        OPTIONAL,   -- Need ON
    D2DsemiPersistSchedC-RNTI   C-RNTI              OPTIONAL,   -- Need OR
}
```

SPS-CONFIG INFORMATION ELEMENT 2300

FIG.24

SPS-CONFIGDL INFORMATION ELEMENT 2400

```
SPS-ConfigDL ::=         CHOICE{
  release                NULL,
  setup                  SEQUENCE {
    semiPersistSchedIntervalDL    ENUMERATED {
                                    sf10, sf20, sf32, sf40, sf64, sf80,
                                    sf128, sf160, sf320, sf640, spare6,
                                    spare5, spare4, spare3, spare2,
                                    spare1},
    numberOfConfSPS-Processes     INTEGER (1..8),
    n1-PUCCH-AN-PersistentList    N1-PUCCH-AN-PersistentList,
    semiPersistSchedDurationDL    ENUMERATED {
                                    min10, min20, min40, min60, min90, min120,
                                    spare2, spare1},
    groupID                       BIT STRING (SIZE (16)),
    ...
    [[ twoAntennaPortActivated-r10    ENUMERATED {true}    OPTIONAL,    -- Need OR
       n1-PUCCH-AN-PersistentListP1-r10    N1-PUCCH-AN-PersistentList    OPTIONAL    -- Cond FFS
    ]]
  }
}
```

FIG. 25

SPS-CONFIGUL INFORMATION ELEMENT

```
SPS-ConfigUL ::=        CHOICE {
    release             NULL,
    setup               SEQUENCE {
        semiPersistSchedIntervalUL      ENUMERATED {
                                            sf10, sf20, sf32, sf40, sf64, sf80,
                                            sf128, sf160, sf320, sf640, spare6,
                                            spare5, spare4, spare3, spare2,
                                            spare1},
        implicitReleaseAfter            ENUMERATED {e2, e3, e4, e8},
        p0-Persistent                   SEQUENCE {
            p0-NominalPUSCH-Persistent      INTEGER (-126..24),
            p0-UE-PUSCH-Persistent          INTEGER (-8..7)
        }                               OPTIONAL,      -- Need OP
        twoIntervalsConfig              ENUMERATED {true}     OPTIONAL,  -- Cond TDD
        semiPersistSchedDurationUL      ENUMERATED {
                                            min10, min20, min40, min60, min90, min120,
                                            spare2, spare1},
        ...
    }
}

N1-PUCCH-AN-PersistentList ::=  SEQUENCE (SIZE (1..4)) OF INTEGER (0..2047)

-- ASN1STOP
```

2500

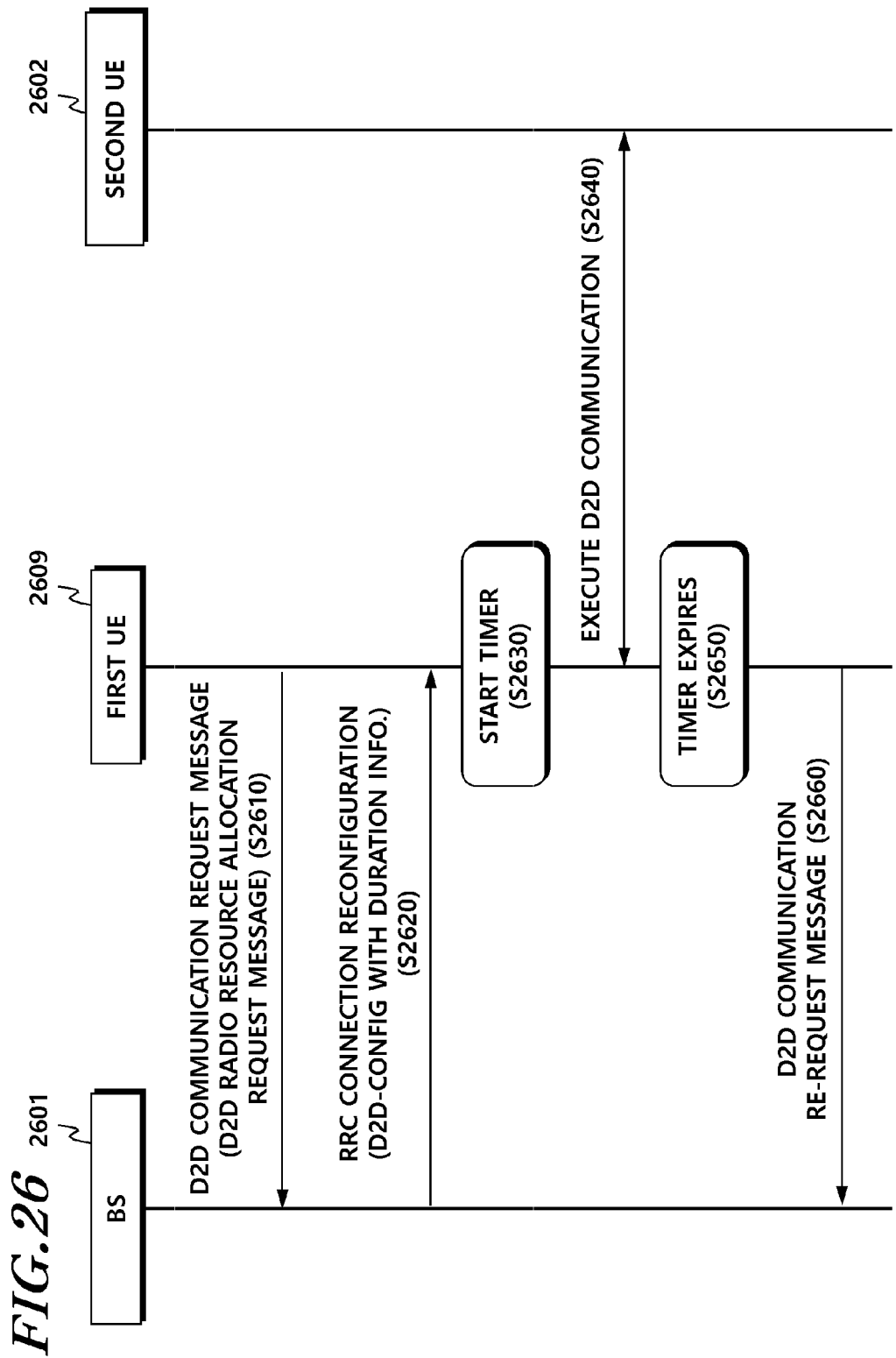

FIG. 27

SYSTEMINFORMATIONBLOCKTYPE1X INFORMATION ELEMENT                    2700

```
-- ASN1START

SystemInformationBlockType1x-r12 ::=    SEQUENCE {
    d2dDiscoveryFrequency               CHOICE {
        eutra-r9                            ARFCN-ValueEUTRA,
        utra-r9                             ARFCN-ValueUTRA,
        ...,
        eutra2-v9e0                         ARFCN-ValueEUTRA-v9e0
    },
    d2dFrequency                        CHOICE {
        eutra-r9                            ARFCN-ValueEUTRA,
        utra-r9                             ARFCN-ValueUTRA,
        ...,
        eutra2-v9e0                         ARFCN-ValueEUTRA-v9e0
    },
    D2DDuration                         ENUMERATED {
                                            min10, min20, min40, min60, min90, min120,
                                            spare2,     spare1},
    D2D-Priority                        ENUMERATED {true},          OPTIONAL,
    lateNonCriticalExtension            OCTET STRING                OPTIONAL,  -- Need OP
    ...
}

-- ASN1STOP
```

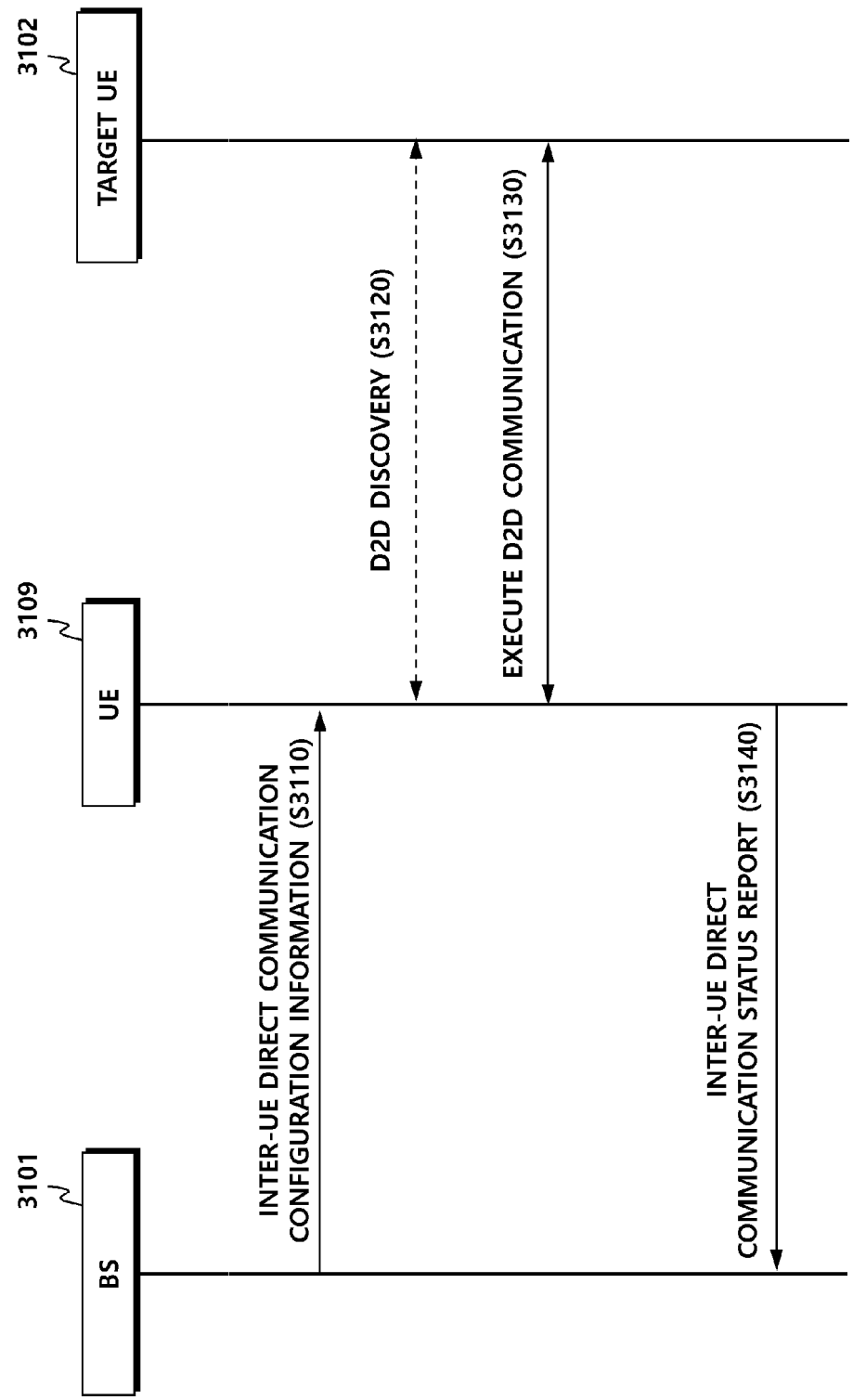

FIG.32

| CONFIGURATION FIELD | DESCRIPTIONS |
|---|---|
| D2D RADIO RESOURCE ALLOCATION INFORMATION | INFORMATION ASSOCIATED WITH RADIO RESOURCES THAT A BS ALLOCATES FOR D2D COMMUNICATION<br>- INFORMATION ASSOCIATED WITH RADIO RESOURCES ALLOCATED FOR D2D DISCOVERY TRANSMISSION<br>- INFORMATION ASSOCIATED WITH RADIO RESOURCES ALLOCATED FOR D2D DATA TRANSMISSION |
| D2D COMMUNICATION STATUS REPORT CONFIGURATION | CONFIGURATION INFORMATION ASSOCIATED WITH EVENT INFORMATION FOR REPORTING D2D, A REPORTING CYCLE, A REPORTING DURATION, OR THE LIKE<br>- EVENT: A TRIGGERING CONDITION THAT TRIGGERS REPORTING (E.G., PERIODIC, THE NUMBER OF TIMES OF FAILURE OF DISCOVERY TRANSMISSION, AND THE NUMBER OF TIMES OF FAILURE OF D2D DATA TRANSMISSION)<br>- CONTENTS OF THE REPORT<br>■ WHETHER D2D COMMUNICATION IS EXECUTED: INDICATION INDICATING WHETHER A UE CURRENTLY EXECUTES D2D COMMUNICATION. THE INDICATION INDICATES ONLY A UE THAT CURRENTLY EXECUTES D2D COMMUNICATION<br>■ DURATION OF D2D COMMUNICATION: A PERIOD OF TIME THAT A UE CONTINUES D2D COMMUNICATION (A PERIOD OF TIME FROM SUCCESSFUL D2D DISCOVERY TO THE PRESENT TIME)<br>■ AN AMOUNT OF DATA FOR D2D TRANSMISSION: AN AMOUNT OF DATA EXISTING IN THE BUFFER OF A UE FOR D2D TRANSMISSION<br>■ THE NUMBER OF TIMES OF FAILURE OF DISCOVERY TRANSMISSION OR SUCCESS RATE OF TRANSMISSION<br>: THE NUMBER OF TIMES OF FAILURE OF DISCOVERY TRANSMISSION OR SUCCESS RATE OF TRANSMISSION DURING A PREDETERMINED PERIOD OF TIME SET BY A BS OR A TIME PREDETERMINED IN SPEC<br>■ AN AVERAGE WAITING TIME FOR DATA TRANSMISSION: AN AVERAGE WAITING TIME FROM A POINT WHERE D2D DATA OF A UE ENTERS THE BUFFER OF A UE TO A POINT OF SUCCESSFUL TRANSMISSION<br>- REPORTING CYCLE: A PERIOD FOR REPORTING, WHEN REPORTING IS PERIODICALLY EXECUTED<br>- REPORTING DURATION: DURATION INFORMATION INDICATING A TIME THAT IS EXPENDED FOR REPORTING |

FIG.33

| CONFIGURATION FIELD | DESCRIPTIONS |
|---|---|
| WHETHER D2D COMMUNICATION IS EXECUTED | INDICATION INDICATING WHETHER A UE CURRENTLY EXECUTES D2D COMMUNICATION |
| TRIGGERING CONDITION | A CONDITION THAT TRIGGERS REPORTING FROM AMONG EVENTS SET IN ADVANCE, SUCH AS WHEN D2D COMMUNICATION STARTS, WHEN A PERIOD IS SATISFIED, OR THE LIKE |
| D2D COMMUNICATION GROUP ID | GROUP ID OF D2D COMMUNICATION WHERE A UE CURRENTLY BELONGS |
| D2D COMMUNICATION DURATION | THE NUMBER OF UES INCLUDED IN A GROUP THAT CURRENTLY EXECUTES D2D COMMUNICATION |
| AN AMOUNT OF DATA FOR D2D TRANSMISSION | A PERIOD OF TIME THAT A UE CONTINUES D2D COMMUNICATION (A PERIOD OF TIME FROM SUCCESSFUL D2D DISCOVERY TO THE PRESENT TIME) |
| D2D DURING A PREDETERMINED PERIOD OF TIME | AN AMOUNT OF DATA THAT A UE CURRENTLY STORES IN A BUFFER FOR D2D TRANSMISSION |
| THE NUMBER OF TIMES OF FAILURE OF DISCOVERY TRANSMISSION OR SUCCESS RATE OF TRANSMISSION | THE NUMBER OF TIMES OF FAILURE OF DISCOVERY TRANSMISSION OR SUCCESS RATE OF TRANSMISSION DURING A PREDETERMINED PERIOD OF TIME SET BY A BS OR A TIME PREDETERMINED IN SPEC |
| THE NUMBER OF TIMES OF FAILURE OF D2D DATA TRANSMISSION OR SUCCESS RATE OF TRANSMISSION DURING A PREDETERMINED PERIOD OF TIME | THE NUMBER OF TIMES OF FAILURE OF DATA TRANSMISSION OR SUCCESS RATE OF TRANSMISSION DURING A PREDETERMINED PERIOD OF TIME SET BY A BS OR A TIME PREDETERMINED IN SPEC |
| AVERAGE WAITING TIME FOR DATA TRANSMISSION | AVERAGE WAITING TIME EXPENDED FROM A POINT WHERE D2D DATA ENTERS THE BUFFER OF A UE TO A POINT WHERE D2D DATA IS SUCCESSFULLY TRANSMITTED |

METHOD FOR TRANSMITTING BUFFER STATUS REPORT IN DEVICE-TO-DEVICE COMMUNICATION, AND DEVICE THEREOF

CROSS REFERENCE TO RELATED APPLICATIONS

The present application is a Divisional of pending U.S. patent application Ser. No. 14/910,026 (filed on Feb. 4, 2016), which is a National Stage Patent Application of PCT International Patent Application No. PCT/KR2014/007081 (filed on Jul. 31, 2014) under 35 U.S.C. § 371, which claims priority to Korean Patent Application Nos. 10-2013-0094718 (filed on Aug. 9, 2013), 10-2013-0107593 (filed on Sep. 6, 2013), 10-2013-0131376 (filed on Oct. 31, 2013), 10-2014-0008556 (filed on Jan. 23, 2014), 10-2014-0017610 (filed on Feb. 17, 2014) and 10-2014-0059638 (filed on May 19, 2014), the teachings of which are incorporated herein in their entireties by reference.

TECHNICAL FIELD

The present disclosure relates to inter-User Equipment (UE) direct communication method and device thereof, and more particularly, to a method and a device of transmitting and receiving a Buffer Status Report (BSR) for effectively allocating radio resources used for inter-UE direct communication, for transmitting a status of inter-UE direct communication to a Base Station (BS), and for enabling a first User Equipment (UE) to execute inter-UE direct communication with a second UE.

BACKGROUND ART

As the distribution of mobile terminals such as a smart phone, a tablet Personal Computer (PC), or the like, have expanded, and demands for various services using the mobile terminals have risen, inter-User Equipment (UE) direct communication has drawn attention. The inter-UE direct communication enables directly transmitting and receiving data or signals between UEs without passing network infrastructures such as a Base Station (BS), an access point, or the like.

To provide users with various services, to secure the reliability of inter-UE direct communication, and to improve the capacity of communication by effectively using bands, there is a demand for a technology that supports inter-UE direct communication using radio resources of various mobile communication networks, such as existing communication networks, for example, a Long Term Evolution (LTE) network, an LTE-Advanced network, or the like.

However, the technology has not been developed yet, which efficiently supports inter-UE direct communication using the radio resources of mobile communication networks, such as the existing communication networks, for example, a Long Term Evolution (LTE) network, an LTE-Advanced network, or the like.

Also, since the radio resources of the existing mobile communication network are used to execute inter-UE direct communication, a method of effectively distributing radio resources is required. To this end, a BS needs to recognize accurate information associated with the inter-UE direct communication, and a BS should determine the distribution of the radio resources based on the recognized information.

In addition, to this end, the BS needs to accurately recognize buffer information that is used for inter-UE direct communication.

DETAILED DESCRIPTION OF THE INVENTION

Technical Problem

Therefore, to execute inter-User Equipment (UE) direct communication using the radio resources of a mobile communication network, it is required to perform a procedure of allocating the radio resources of the mobile communication network, which may be used for inter-UE direct communication.

Also, a Base Station (BS) or a radio resource allocation entity that is capable of allocating radio resources may need to obtain information associated with an amount of data for inter-UE direct communication, so as to effectively allocate the radio resources for the inter-UE direct communication.

Also, a procedure may be required for a User Equipment (UE) to transmit, to a BS, a Buffer Status Report (BSR), so as to be assigned with radio resources that may be used for inter-UE direct communication.

As described above, to effectively manage the radio resources of the mobile communication network, a method may be required for allocating the radio resources used for inter-UE direct communication.

Also, when a BS or a radio resource allocation entity allocates radio resources for inter-UE direct communication, the BS or the radio resource allocation entity may need to obtain information associated with whether an allocated radio resource is used, for effective allocation or distribution of radio resources.

As described above, a BS may need to receive the information associated with inter-UE direct communication executed within the coverage of the BS.

Also, a detailed and efficient procedure may be required for enabling a UE to transmit the information associated with inter-UE direct communication to a BS.

Technical Solution

To solve the problems, in accordance with at least one embodiment, a method may be provided for a first User Equipment (UE) to execute inter-UE direct communication with a second UE. The method may include: triggering a Buffer Status Report (BSR) for inter-UE direct communication with the second UE; transmitting the BSR to at least one of a Base Station (BS) and a radio resource allocation entity; and receiving, from at least one of the BS and the radio resource allocation entity, radio resource allocation information for inter-UE direct communication with the second UE.

The BSR is triggered upon occurrence of predetermined events. Such predetermined events may occur when the first UE initiates the inter-UE direct communication, when the inter-UE direct communication begins, when a radio resource request is received from the second UE that is to execute inter-UE direct communication with the first UE, when data for inter-UE direct communication, which has a higher priority, enters a buffer, when data for inter-UE direct communication enters the buffer, when data for inter-UE direct communication exists in the buffer, and a retransmission timer expires, and when a timer for transmitting the BSR expires.

The radio resource allocation entity executes at least one of a function of radio resource allocation for inter-UE direct communication with the second UE, a function of transmission of a sync channel, and a function of managing a UE group that executes inter-UE direct communication.

The BSR includes a logical channel identity index value for inter-UE direct communication, which is distinguished from a logical channel identity index value for communication with the BS.

The BSR includes an inter-UE direct communication connection identity index value for distinguishing at least one inter-UE direct communication.

The BSR includes buffer status information associated with a logical channel for communication with the BS and a logical channel for inter-UE direct communication, the logical channel for the inter-UE direct communication is allocated to a logical channel group that is distinguished from the logical channel for communication with the BS.

In accordance with at least one embodiment, a method may be provided for a Base Station (BS) to control inter-User Equipment (UE) direct communication, the method including: receiving a Buffer Status Report (BSR) from a first UE when the BSR of the first UE for inter-UE direct communication is triggered; and transmitting radio resource allocation information for the inter-UE direct communication, based on the BSR.

The BSR is triggered upon occurrence of predetermined events. Such predetermined events may occur when the first UE initiates the inter-UE direct communication, when the inter-UE direct communication begins, when a radio resource request is received from the second UE that is to execute inter-UE direct communication with the first UE, when data for inter-UE direct communication, which has a higher priority, enters a buffer, when data for inter-UE direct communication enters the buffer, when data for inter-UE direct communication exists in the buffer, and a retransmission timer expires, and when a timer for transmitting the BSR expires.

The BSR includes a logical channel identity index value for inter-UE direct communication, which is distinguished from a logical channel identity index value for communication with the BS.

The BSR includes an inter-UE direct communication connection identity index value for distinguishing at least one inter-UE direct communication.

The BSR includes buffer status information associated with a logical channel for communication with the BS and a logical channel for inter-UE direct communication; and the logical channel for inter-UE direct communication is allocated to a logical channel group which is distinguished from the logical channel for communication with the BS.

Before the receiving of the BSR, the method further includes: allocating a logical channel for inter-UE direct communication to a logical channel group that is distinguished from a logical channel for communication with the BS.

In accordance with at least one embodiment, a first User Equipment (UE) may be provided for performing inter-UE direct communication with a second UE. The first UE may include a controller configured to trigger a Buffer Status Report (BSR) for inter-UE direct communication with the second UE; a transmitting unit configured to transmit the BSR to at least one of a Base Station (BS) and a radio resource allocation entity; and a receiving unit that receives, from at least one of the BS and the radio resource allocation entity, radio resource allocation information for inter-UE direct communication with the second UE.

The BSR is triggered upon occurrence of predetermined events. Such predetermined events occur when the first UE initiates the inter-UE direct communication with the second UE, when the inter-UE direct communication begins, when a radio resource request is received from the second UE that is to execute inter-UE direct communication with the first UE, when data for inter-UE direct communication, which has a higher priority, enters a buffer, when data for inter-UE direct communication enters the buffer, when data for inter-UE direct communication exists in the buffer, and a retransmission timer expires, and when a timer for transmitting the BSR expires.

The radio resource allocation entity executes at least one function from among allocating radio resources for inter-UE direct communication with the second UE, transmitting a sync channel, and managing a UE group that executes inter-UE direct communication.

The BSR includes a logical channel identity index value for inter-UE direct communication, which is distinguished from a logical channel identity index value for communication with the BS.

The BSR includes an inter-UE direct communication connection identity index value for distinguishing at least one inter-UE direct communication.

The BSR includes buffer status information associated with a logical channel for communication with the BS and a logical channel for inter-UE direct communication; and the logical channel for inter-UE direct communication is allocated to a logical channel group which is distinguished from the logical channel for communication with the BS.

In accordance with at least one embodiment, a Base Station (BS) may be provided for controlling inter-User Equipment (UE) direct communication. The BS may include a receiving unit configured to receive a Buffer Status Report (BSR) from a first UE when the BSR of the first UE for inter-UE direct communication is triggered; and a transmitting unit configured to transmit radio resource allocation information for the inter-UE direct communication, based on the BSR.

The BSR is triggered upon occurrence of predetermined events. The predetermined events may occur when the first UE initiates the inter-UE direct communication, when the inter-UE direct communication begins, when a radio resource request is received from the second UE that is to execute inter-UE direct communication with the first UE, when data for inter-UE direct communication, which has a higher priority, enters a buffer, when data for inter-UE direct communication enters the buffer, when data for inter-UE direct communication exists in the buffer, and a retransmission timer expires, and when a timer for transmitting the BSR expires.

The BSR includes a logical channel identity index value for inter-UE direct communication, which is distinguished from a logical channel identity index value for communication with the BS.

The BSR includes an inter-UE direct communication connection identity index value for distinguishing at least one inter-UE direct communication.

The BSR includes buffer status information associated with a logical channel for communication with the BS and a logical channel for inter-UE direct communication; and the logical channel for inter-UE direct communication is allocated to a logical channel group which is distinguished from the logical channel for communication with the BS.

The BS further includes a controller configured to allocate the logical channel for inter-UE direct communication to a logical channel group that is distinguished from the logical channel for the communication with a BS.

In accordance with at least one embodiment, a method may be provided for a first User Equipment (UE) to execute inter-User Equipment (UE) direct communication with a second UE. The method may include transmitting, to at least one of a Base Station (BS) and a radio resource allocation entity, a first signal including radio resource allocation request information for inter-UE direct communication with the second UE; receiving, from at least one of the BS and the radio resource allocation entity, a second signal including radio resource allocation information; executing inter-UE direct communication with the second UE, based on the radio resource allocation information; and transmitting a third signal including information associated with a status of inter-UE direct communication with the second UE.

The third signal includes one or more pieces of information from among indication information indicating termination of inter-UE direct communication and buffer status information for inter-UE direct communication.

The second signal further includes available period information of the radio resource.

The third signal includes information that requests reallocation of the radio resource based on whether the available period of the radio resource expires.

The second signal further includes assistance information for inter-UE direct communication; and the assistance information includes one or more pieces of information from among discovery radio resource information for inter-UE direct communication, communication radio resource information for inter-UE direct communication, adjacent UE identification information for identifying a UE located within a predetermined distance from the first UE, location information associated with an adjacent UE, group identification information associated with a group that executes inter-UE direct communication, and information associated with a data radio bearer to be converted into inter-UE direct communication.

The second signal is transmitted by being included in a system information block, and includes one or more pieces of information from among available period information of the radio resource and priority information associated with inter-UE direct communication.

The radio resource allocation entity executes one or more functions from among allocating radio resources for inter-UE direct communication, transmitting a sync channel, and managing a group for inter-UE direct communication.

The present invention provides a method for a Base Station (BS) to control inter-UE direct communication, the method including: receiving, from a first UE, a first signal including radio resource allocation request information for inter-UE direct communication; transmitting a second signal including radio resource allocation information; and receiving, from the first UE, a third signal including information associated with a status of inter-UE direct communication.

The third signal includes one or more pieces of information from among indication information indicating termination of inter-UE direct communication and buffer status information for inter-UE direct communication.

The second signal further includes available period information of the radio resource, and the third signal includes information that requests reallocation of the radio resource based on whether the available period of the radio resource expires.

The second signal further includes assistance information for inter-UE direct communication; and the assistance information includes one or more pieces of information from among discovery radio resource information for inter-UE direct communication, communication radio resource information for inter-UE direct communication, adjacent UE identification information for identifying a UE located within a predetermined distance from the first UE, location information associated with an adjacent UE, group identification information associated with a group that executes inter-UE direct communication, and information associated with a data radio bearer to be converted into inter-UE direct communication.

The second signal is transmitted by being included in a system information block, and includes one or more pieces of information from among available period information of the radio resource and priority information associated with inter-UE direct communication.

In accordance with at least one embodiment, a first User Equipment (UE) may be provided for performing inter-User Equipment direct communication with a second UE. The first UE may include: a transmitting unit configured to transmit, to at least one of a Base Station (BS) and a radio resource allocation entity, a first signal including radio resource allocation request information for inter-UE direct communication with the second UE; a receiving unit configured to receive, from at least one of the BS and the radio resource allocation entity, a second signal including radio resource allocation information; and a controller configured to perform inter-UE direct communication with the second UE, based on the radio resource allocation information, wherein the transmitting unit further transmits a third signal including information associated with a status of inter-UE direct communication with the second UE.

The third signal includes one or more pieces of information from among indication information indicating termination of inter-UE direct communication and buffer status information for inter-UE direct communication.

The second signal further includes available period information of the radio resource.

The third signal includes information that requests reallocation of the radio resource based on whether the available period of the radio resource expires.

The second signal further includes assistance information for inter-UE direct communication; and the assistance information includes one or more pieces of information from among discovery radio resource information for inter-UE direct communication, communication radio resource information for inter-UE direct communication, adjacent UE identification information for identifying a UE located within a predetermined distance from the first UE, location information associated with an adjacent UE, group identification information associated with a group that executes inter-UE direct communication, and information associated with a data radio bearer to be converted into inter-UE direct communication.

The second signal is transmitted by being included in a system information block, and includes one or more pieces of information from among available period information of the radio resource and priority information associated with inter-UE direct communication.

The radio resource allocation entity executes one or more functions from among allocating radio resources for inter-UE direct communication, transmitting a sync channel, and managing a group for inter-UE direct communication.

In accordance with at least one embodiment, a BS may be provided for controlling inter-UE direct communication. The BS may include a receiving unit configured to receive, from a first UE, a first signal including radio resource allocation request information for inter-UE direct communication; a transmitting unit configured to transmit a second signal including radio resource allocation information, wherein the receiving unit further configured to receive, from the first UE, a third signal including information associated with a status of inter-UE direct communication.

The third signal includes one or more pieces of information from among indication information indicating termination of inter-UE direct communication and buffer status information for inter-UE direct communication.

The second signal further includes available period information of the radio resource, and the third signal includes information that requests reallocation of the radio resource based on whether the available period of the radio resource expires.

The second signal further includes assistance information for inter-UE direct communication; and the assistance information includes one or more pieces of information from among discovery radio resource information for inter-UE direct communication, communication radio resource information for inter-UE direct communication, adjacent UE identification information for identifying a UE located within a predetermined distance from the first UE, location information associated with an adjacent UE, group identification information associated with a group that executes inter-UE direct communication, and information associated with a data radio bearer to be converted into inter-UE direct communication.

The second signal is transmitted by being included in a system information block, and includes one or more pieces of information from among available period information of the radio resource and priority information associated with inter-UE direct communication.

Also, in accordance with at least one embodiment, a method may be provided for a UE to transmit a status report of inter-UE direct communication. The method may include: receiving a first signal including inter-UE direct communication configuration information from a BS or a radio resource allocating entity; determining whether the status report of the inter-UE direct communication is triggered based on triggering condition information; and transmitting a second signal including the status report of the inter-UE direct communication to a BS or a radio resource allocating entity.

The inter-UE direct communication configuration information includes one or more pieces of information from among radio resource allocation information for inter-UE direct communication and inter-UE direct communication status report configuration information.

The first signal is received through a system information block or a higher layer signaling.

The triggering condition information is included in the first signal or is set in advance in the UE.

The inter-UE direct communication status report includes inter-UE direct communication discovery failure information or inter-UE direct communication failure information.

The radio resource allocation entity is an entity that executes one or more functions from among allocating radio resources for inter-UE direct communication, transmitting a sync channel, and managing a UE group that executes inter-UE direct communication.

Also, in accordance with at least one embodiment, a method may be provided for a BS to receive an inter-UE direct communication status report. The method may include: generating a first signal including inter-UE direct communication configuration information; transmitting the first signal to a UE; and receiving a second signal including an inter-UE direct communication status report.

The inter-UE direct communication configuration information includes one or more pieces of information from among radio resource allocation information for inter-UE direct communication and inter-UE direct communication status report configuration information.

The first signal is transmitted through a system information block or a higher layer signaling.

The inter-UE direct communication status report includes inter-UE direct communication discovery failure information or inter-UE direct communication failure information.

Also, in accordance with at least one embodiment, a UE may be provided for transmitting a status report of inter-UE direct communication. The UE may include a receiving unit that receives a first signal including inter-UE direct communication configuration information from a BS or a radio resource allocating entity; a controller that determines whether the status report of the inter-UE direct communication is triggered based on triggering condition information; and a transmitting unit that transmits a second signal including the status report of the inter-UE direct communication to the BS or the radio resource allocating entity.

The inter-UE direct communication configuration information includes:

one or more pieces of information from among radio resource allocation information for inter-UE direct communication and inter-UE direct communication status report configuration information.

The first signal is received through a system information block or a higher layer signaling.

The controller determines whether an inter-UE direct communication status report is triggered based on the triggering condition information that is included in the first signal or that is set in advance in the UE.

The inter-UE direct communication status report includes inter-UE direct communication discovery failure information or inter-UE direct communication failure information.

The radio resource allocation entity is an entity that executes one or more functions from among allocating radio resources for inter-UE direct communication, transmitting a sync channel, and managing a UE group that executes inter-UE direct communication.

In accordance with at least one embodiment, a BS may be provided for receiving an inter-UE direct communication status report. The BS may include: a controller configured to generate a first signal including inter-UE direct communication configuration information; a transmitting unit configured to transmit the first signal to a UE; and a receiving unit configured to receive a second signal including an inter-UE direct communication status report from the UE.

The inter-UE direct communication configuration information includes one or more pieces of information from among radio resource allocation information for inter-UE direct communication and inter-UE direct communication status report configuration information.

The first signal is transmitted through a system information block or a higher layer signaling.

The inter-UE direct communication status report includes inter-UE direct communication discovery failure information or inter-UE direct communication failure information.

Advantageous Effects

According to at least one embodiment of the present disclosure, a first User Equipment (UE) may be assigned with a radio resource that may be used for inter-UE direct communication, from a Base Station (BS) or a radio resource allocation entity that is capable of allocating radio resources.

Also, the BS may recognize accurate information associated with inter-UE direct communication and determine the distribution of radio resources based on the recognized information.

Also, the first UE may be assigned with an accurate amount of radio resources by transmitting a Buffer Status Report (BSR) for inter-UE direct communication.

Also, the BS or the radio resource allocation entity that is capable of allocating radio resources may receive a separate BSR for inter-UE direct communication from the first UE, thereby reducing the waste of radio resources and effectively allocating radio resources for inter-UE direct communication.

BRIEF DESCRIPTION OF THE DRAWINGS

FIG. 8 is a diagram illustrating a configuration of a BSR according to another embodiment of the present disclosure.

FIG. 10 is a diagram illustrating exemplary values of a logical channel identifier field according to another embodiment of the present disclosure.

FIG. 18 is a diagram illustrating a signal flow according to an embodiment of the present disclosure.

FIG. 19 is a diagram illustrating a signal flow according to another embodiment of the present disclosure.

FIG. 20 is a diagram illustrating a RadioResourceConfigDedicated information element according to an embodiment of the present disclosure.

FIG. 21 is a diagram illustrating a D2D-Config information element according to an embodiment of the present disclosure.

FIG. 22 is a diagram illustrating a signal flow according to another embodiment of the present disclosure.

FIG. 23 is a diagram illustrating an SPS-Config information element according to another embodiment of the present disclosure.

FIG. 24 is a diagram illustrating an SPS-ConfigDL information element out of the SPS-Config information element according to another embodiment of the present disclosure.

FIG. 25 is a diagram illustrating an SPS-ConfigUL information element out of the SPS-Config information element according to another embodiment of the present disclosure.

FIG. 26 is a diagram illustrating a signal flow when a timer is used, according to another embodiment of the present disclosure.

FIG. 27 is a diagram illustrating a SystemInformationBlockType1x information element according to an embodiment of the present disclosure.

FIG. 31 is a diagram illustrating operations of a UE and a BS according to another embodiment of the present disclosure.

FIG. 32 is a table showing exemplary information, which is included in inter-UE direct communication configuration information, according to an embodiment of the present disclosure.

FIG. 33 is a table including exemplary information, which is included in inter-UE direct communication status report information, according to another embodiment of the present disclosure.

MODE FOR CARRYING OUT THE INVENTION

Figure 1:
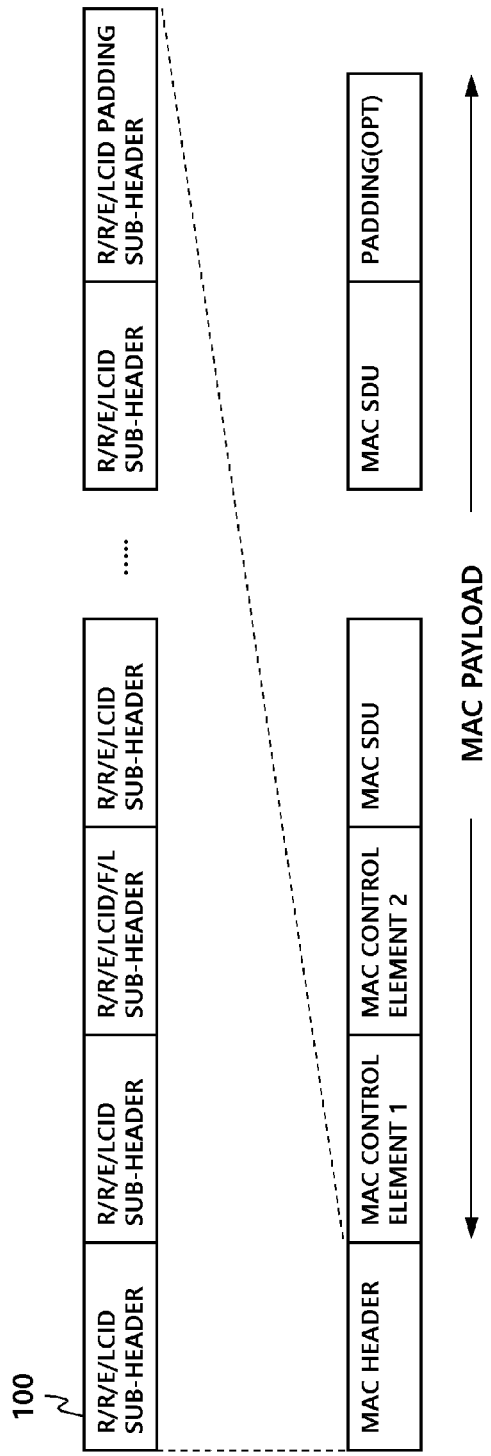
FIG. 1 is a diagram illustrating an exemplary configuration of a MAC PDU.

Hereinafter, embodiments of the present disclosure will be described with reference to the exemplary drawings. In the following description, the same elements will be designated by the same reference numerals although they are shown in different drawings. Further, in the following description of the present disclosure, a detailed description of known functions and configurations incorporated herein will be omitted when it may make the subject matter of the present disclosure rather unclear.

The wireless communication system may be widely installed so as to provide various communication services, such as a voice service, a packet data service, and the like. The wireless communication system may include a User Equipment (UE) and a Base Station (BS or an eNB). Throughout the specifications, the user equipment may be an inclusive concept indicating a terminal utilized in wireless communication, including a UE (User Equipment) in wideband code division multiple access (WCDMA), long term evolution (LTE), high speed packet access (HSPA), and the like, and an MS (Mobile station), a UT (User Terminal), an SS (Subscriber Station), a wireless device, and the like in global systems for mobile communications (GSM).

A base station or a cell may generally refer to a station where communication with a User Equipment (UE) is performed, and may also be referred to as a Node-B, an evolved Node-B (eNB), a Sector, a Site, a Base Transceiver System (BTS), an Access Point, a Relay Node, a Remote Radio Head (RRH), a Radio Unit (RU), and the like.

That is, in the specification, the base station or the cell may be construed to be an inclusive concept indicating a portion of an area or function covered by a BSC (Base Station Controller) in CDMA, a NodeB in WCDMA, an eNB or a sector (site) in LTE, and the like, and this concept may include various coverage areas, such as a megacell, a macrocell, a microcell, a picocell, a femtocell, a communication range of a relay node, an remote radio unit (RRU), and an radio unit (RU), and the like.

Each of the above mentioned various cells has a base station that controls a corresponding cell, and thus, the base station may be construed in two ways: i) the base station may be a device itself that provides a megacell, a macrocell, a microcell, a picocell, a femtocell, and a small cell in association with a wireless area, or ii) the base station may indicate as a wireless area itself. In i), a base station may include all devices that interact with one another so as to enable the devices that provide a predetermined wireless area to be controlled by an identical entity or to cooperatively configure the wireless area. Based on a configuration type of a wireless area, an eNB, an RRH, an antenna, an RU, a Low Power Node (LPN), a point, a transmission/reception point, a transmission point, a reception point, and the like may be embodiments of a base station. A wireless area itself that receives or transmits a signal from the perspective of a UE or a neighboring base station, may be indicated as a base station.

Therefore, a megacell, a macrocell, a microcell, a picocell, a femtocell, a small cell, an RRH, an antenna, an RU, an LPN, a point, an eNB, a transmission/reception point, a transmission point, and a reception point are commonly referred to as a base station.

In the specifications, the user equipment and the base station are used as two inclusive transceiving subjects to embody the technology and technical concepts described in the specifications. However, the user equipment and the base station may not be limited to a predetermined term or word. The user equipment and the base station are used as two inclusive transceiving subjects (Uplink and Downlink) to embody the technology and technical concepts described in the specifications. However, the user equipment and the base station may not be limited to a predetermined term or word. Here, Uplink (UL) refers to a scheme for a UE to transmit and receive data to/from a base station, and Downlink (DL) refers to a scheme for a base station to transmit and receive data to/from a UE.

Multiple access schemes may be unrestrictedly applied to the wireless communication system. The wireless communication system may utilize varied multiple access schemes, such as CDMA (Code Division Multiple Access), TDMA (Time Division Multiple Access), FDMA (Frequency Division Multiple Access), OFDMA (Orthogonal Frequency Division Multiple Access), OFDM-FDMA, OFDM-TDMA, OFDM-CDMA, and the like. Embodiments of the present disclosure may be applicable to resource allocation in an asynchronous wireless communication scheme that is advanced through GSM, WCDMA, and HSPA, to be LTE and LTE-advanced. The embodiments of the present disclosure may be applicable to resource allocation in a synchronous wireless communication scheme that is advanced through CDMA and CDMA-2000, to be UMB. The embodiments of the present disclosure may not be limited to a specific wireless communication field and may include all technical fields to which the technical idea of the present disclosure is applicable.

Uplink transmission and downlink transmission may be performed based on a TDD (Time Division Duplex) scheme that performs transmission based on different times, or based on an FDD (Frequency Division Duplex) scheme that performs transmission based on different frequencies.

Further, in a system such as LTE and LTE-A, a standard may be developed by configuring an uplink and a downlink based on a single carrier or a pair of carriers. The uplink and the downlink may transmit control information through a control channel, such as a PDCCH (Physical Downlink Control CHannel), PCFICH (Physical Control Format Indicator CHannel), PHICH (Physical Hybrid ARQ Indicator CHannel), PUCCH (Physical Uplink Control CHannel), EDCCH (Enhanced Physical Downlink Control Channel, and the like, and may be configured as a data channel, such as PDSCH (Physical Downlink Shared CHannel), PUSCH (Physical Uplink Shared CHannel), and the like, so as to transmit data.

Meanwhile, Control information may be transmitted using an EPDCCH (enhanced PDCCH or extended PDCCH).

In the present specification, a cell may refer to the coverage of a signal transmitted from a transmission/reception point, a component carrier having the coverage of the signal transmitted from the transmission/reception point (transmission point or transmission/reception point), or the transmission/reception point itself.

A wireless communication system according to embodiments refers to a Coordinated Multi-point transmission/reception (CoMP) system where two or more transmission/reception points cooperatively transmit a signal, a coordinated multi-antenna transmission system, or a coordinated multi-cell communication system. A CoMP system may include at least two multi-transmission/reception points and UEs.

A multiple transmission/reception points (or a transmission/reception communication system) may be a base station or a macro cell (hereinafter, referred to as an 'eNB') and at least one RRH that is connected to an eNB through an optical cable or an optical fiber and is wiredly controlled, and has a high transmission power or a low transmission power within a macrocell.

Hereinafter, a downlink refers to as communication or a communication path from a multiple transmission/reception points to a UE, and an uplink refers to as communication or a communication path from a UE to multiple transmission/reception points. In a downlink, a transmitter may be a part of multiple transmission/reception points and a receiver may be a part of a UE. In an uplink, a transmitter may be a part of a UE and a receiver may be a part of multiple transmission/reception points.

Hereinafter, the situation in which a signal is transmitted and received through a PUCCH, a PUSCH, a PDCCH, a PDSCH, or the like may be described through the expression, "a PUCCH, a PUSCH, a PDCCH, or a PDSCH is transmitted or received".

In addition, hereinafter, the expression "a PDCCH is transmitted or received or a signal is transmitted or received through a PDCCH" includes "an EPDCCH is transmitted or received or a signal is transmitted or received through an EPDCCH".

That is, a downlink control channel used herein may indicate a PDCCH or an EPDCCH and may indicate a meaning including both a PDCCH and an EPDCCH.

In addition, for ease of description, a PDCCH, which corresponds to an embodiment of the present disclosure, may be applied to the part described using a EPDCCH.

Further, high layer signaling as used herein includes RRC signaling for transmitting RRC information including RRC parameters.

An eNB executes downlink transmission to UEs. An eNB 110 may transmit a Physical Downlink Shared Channel (PDSCH) which is a primary physical channel for unicast transmission. The eNB 110 may transmit a Physical Downlink Control Channel (PDCCH) for transmitting downlink control information, such as scheduling required for reception of a PDSCH, and scheduling grant information for transmission of an uplink data channel (for example, a Physical Uplink Shared Channel (PUSCH)). Hereinafter, transmission and reception of a signal through each channel will be described as transmission and reception of a corresponding channel.

FIG. 1 is a diagram illustrating an exemplary configuration of a MAC PDU.

With reference to the configuration information of a MAC (Medium Access Control) PDU (Protocol Data Unit) of FIG. 1, a PDU is formed of a MAC header and a MAC payload. The MAC header is formed of a plurality of sub-headers 100, and the MAC payload is formed of MAC Control Elements (CEs), Media Access Control Service Data Units (MAC SDUs), and a padding. Generally, the sub-headers 100 sequentially correspond to the MAC CEs, the MAC SDUs, and the padding of the MAC payload.

Each MAC sub-header 100 may be formed of the fields of Table 1 as shown below.

TABLE 1

| Field | Descriptions |
| --- | --- |
| Logical Channel ID (LCID) | Logical channel ID of a corresponding MAC SDU or MAC CE, or type information of a padding |
| Length (L) | Length information of a corresponding MAC SDU or MAC CE |
| Format (F) | Size information of length field (0 indicates 7 bits and 1 indicates 15 bits.) |
| Extension (E) | Information indicating whether a MAC header is continued (That is, 0 indicates that a corresponding sub-header itself is the last sub-header, and a MAC CE, a MAC SDU, or a padding will follow the sub-header. 1 indicates that another sub-header exists.) |
| Reserved bit (R) | Residual bit to be used later |

As described in Table 1, each MAC sub-header 100 may be formed of one or more fields out of the LCID, L, F, E, and R fields.

Particularly, the LCID field may be configured as various values. For example, the values of the LCID field for an uplink shared channel (UL-SCH) and indices are listed in Table 2, as below.

TABLE 2

| Index | LCID values |
| --- | --- |
| 00000 | CCCH |
| 00001-01010 | Identity of the logical channel |
| 01011-11000 | Reserved |
| 11001 | Extended Power Ieadroom Report |
| 11010 | Power Ieadroom Report |
| 11011 | C-RNTI |
| 11100 | Truncated BSP |
| 11101 | Short BSR |
| 11110 | Long BSR |
| 11111 | Padding |

As shown in Table 2, when the index is 11100, it indicates that the value is Truncated BSR. As described above, based on the LCID index, the value of the LCID may be variously configured.

A UE may transmit a Buffer Status Report (BSR) to a BS. To transmit data in an uplink, the UE needs to request a required radio resource, so as to receive the radio resource from the BS. The UE may transmit, to the BS, a Buffer Status Report (BSR) indicating an amount of data which is presently stored in a buffer for transmission. The BS may allocate an appropriate amount of uplink radio resource based on the received BSR.

Particularly, for example, the BSR may be configured as two formats, which are a long BSR and a short BSR.

Figure 2:
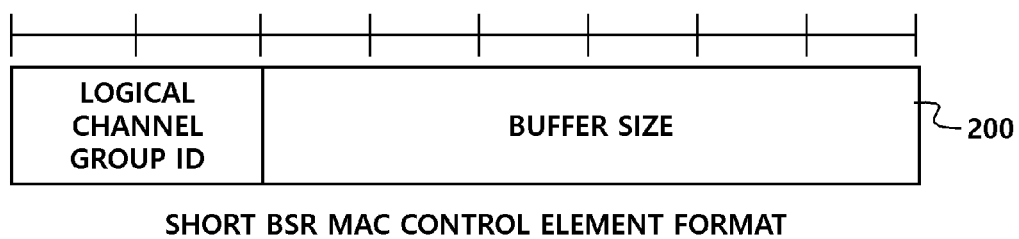
FIG. 2 is a diagram illustrating an exemplary format for a short Buffer Status Report (BSR) MAC control element.

FIG. 2 is a diagram illustrating an exemplary format of a short BSR MAC control element.

Referring to FIG. 2, the short BSR may include buffer status information associated with a single Logical Channel Group (LCG). The LCG is a bundle of logical channels which have similar QoS (Quality of Service) requirements or similar characteristics, and a maximum of 4 LCGs may exist for a single UE. The short BSR is formed of an LCG ID and a buffer size, and the LCG ID indicates the ID of the LCG of the reported buffer size. That is, the short BSR includes the buffer size information of a single LCG.

Figure 3:
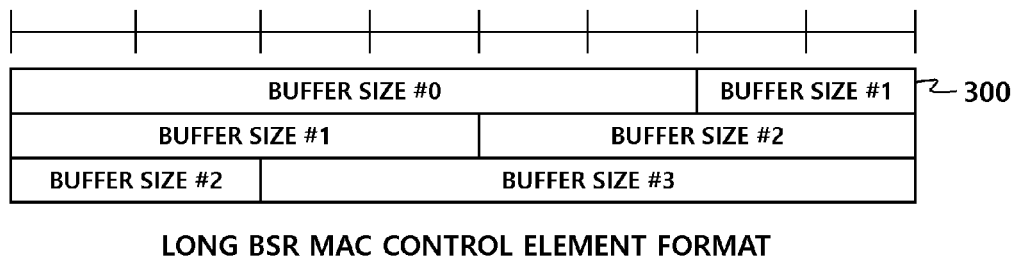
FIG. 3 is a diagram illustrating an exemplary format for a long BSR MAC control element.

FIG. 3 is a diagram illustrating an exemplary format of a long BSR MAC control element.

The Long BSR may include buffer status information associated with all (four) Logical Channel Groups (LCGs). The LCG is a bundle of logical channels having similar QoS or characteristics.

Referring to FIG. 3, a long BSR MAC control element format 300 does not include LCG ID information. That is, the long BSR is formed of four buffer sizes without an LCG ID field, and the buffer sizes sequentially indicate the buffer sizes from LCG ID #0 to LCG ID #3. The buffer size information associated with a maximum of four LCGs may be included sequentially. For example, the buffer size information of LCG #0 may be included in buffer size #0, and the buffer size information of LCG#1 may be included in buffer size #1. Buffer size #2 and buffer size #3 are also allocated as described above.

One of the two formats of a BSR is determined and transmitted based on a condition that triggers a BSR, a size of a residual space which can include a BSR, or the like.

The BSR configured as described above may be transmitted when a triggering condition is satisfied. For example, a condition that triggers a BSR is as follows.
    condition that triggers a regular BSR
        when data of a logical channel having a higher priority enters buffer
        when new data to be transmitted enters an empty buffer
        when data to be transmitted exists in a buffer, and a retransmission timer expires condition that triggers a periodic BSR
when a period timer expires
condition that triggers a padding BSR In the case in which a residual space which can include a BSR exists when a MAC PDU to be transmitted is configured, a long BSR or a short BSR is included based on the size of the space.

Particularly, when there are data to be transmitted to two or more LCGs and when a regular BSR is triggered, a long BSR is included and transmitted. When data to be transmitted to a single LCG exists, a short BSR is included and transmitted.

However, when there is not an uplink radio resource for new transmission although the regular BSR is triggered, a UE may be assigned with an uplink radio resource. For example, when a Scheduling Request (SR) resource is configured in a PUCCH, the UE may be assigned with an uplink radio resource by transmitting a Scheduling Request (SR).

As another example, when the SR resource is not configured in the PUCCH, the UE may be assigned with a radio resource through a random access process. When the UE is assigned with the radio resource, the UE may transmit a BSR to the BS. The BS may allocate an appropriate amount of uplink radio resources to a corresponding UE, based on the received BSR.

As another example, when a periodic BSR or a padding BSR is triggered instead of the regular BSR, an SR or a random access process is not triggered.

The inter-UE direct communication in the present specification may indicate device to device (D2D) communication and may indicate various communications executed between UEs using radio resources without a BS. Hereinafter, as an example of the inter-UE direction communication of embodiments of the present disclosure, D2D communication will be described with reference to drawings. However, descriptions using the D2D communication as an example are merely to help understanding. That is, embodiments of the present disclosure may be applied to any inter-UE direction communication that directly transmits and receives data and signals between UEs without a BS, by utilizing the radio resources of a mobile communication network, such as D2D communication.

Recently, in the 3GPP LTE/LTE-Advanced system, inter-UE direct communication that directly exchanges data between adjacent UEs, without a BS, for example, a method of providing a proximity service through D2D communication, has been described.

Figure 4:
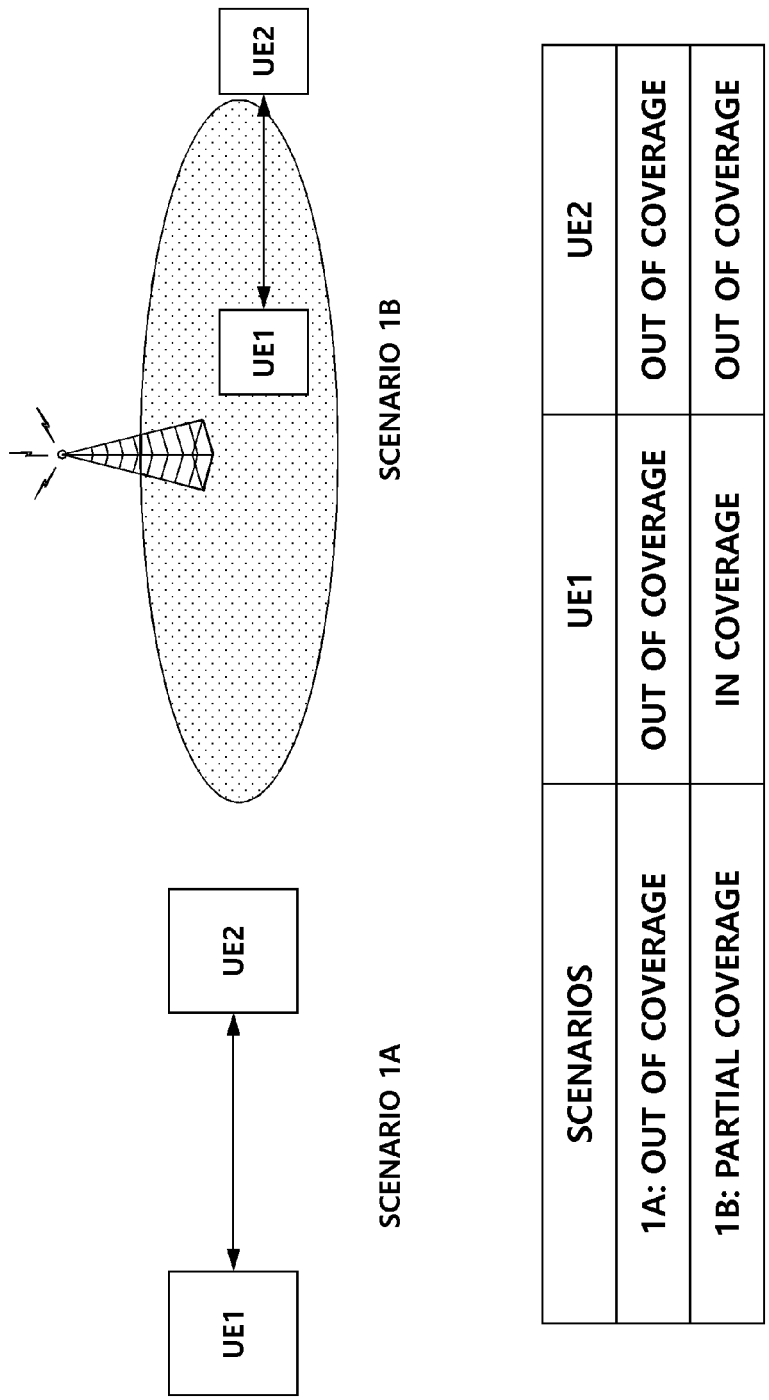
FIG. 4 is a diagram illustrating exemplary scenarios of inter-User Equipment (UE) direct communication to which embodiments of the present disclosure are applied.
Figure 5:
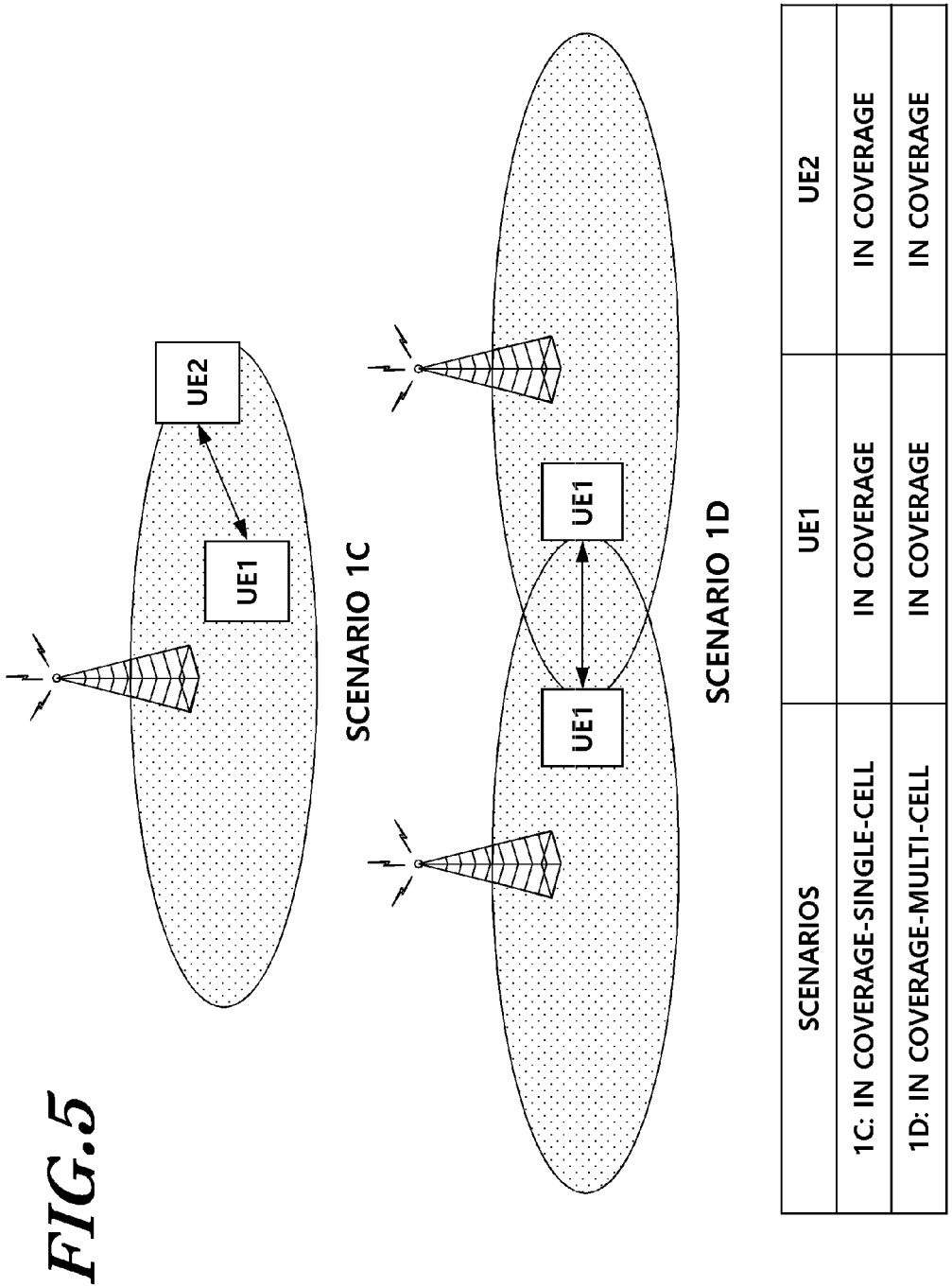
FIG. 5 is a diagram illustrating another exemplary scenario of inter-UE direct communication to which embodiments of the present disclosure are applied.

As the D2D communication, exemplary scenarios of FIGS. 4 and 5 may be considered.

FIG. 4 is a diagram illustrating exemplary scenarios of inter-UE direct communication to which embodiments of the present disclosure are applied.

Referring to FIG. 4, scenario 1A indicates D2D communication performed when all of UE 1 and UE2 are located outside the coverage of a mobile communication BS. That is, according to the scenario, although both UE1 and UE2 are located outside the coverage of the mobile communication BS, they may execute D2D communication and transmit and receive data and signals.

According to scenario 1B, UE1 that executes D2D communication is located inside the coverage of the mobile communication BS, and UE2 is located outside the coverage. In this instance, UE1 and UE2 may be capable of transmitting and receiving data and signals.

FIG. 5 is a diagram illustrating another exemplary scenarios of inter-UE direct communication to which embodiments of the present disclosure are applied.

Referring to FIG. 5, scenario 1C indicates D2D communication performed when all of UE 1 and UE2 are located inside the coverage of a mobile communication BS. In this instance, UE1 and UE2 may be capable of transmitting and receiving data and signals, without a BS.

According to scenario 1D, although both UE1 and UE2 are located inside the coverage of the mobile communication BS, each UE is located in the coverages of different cells. That is, UE1 is located in the coverage of a first BS, and UE2 is located in the coverage of a second BS. In this instance, UE1 and UE2 may be capable of transmitting and receiving data and signals, without a BS.

Hereinafter, a buffer status reporting method, a radio resource allocating method, and a communication status reporting method when the inter-UE direct communication is executed in accordance with at least one embodiment, will be described. In the descriptions of each method, a first signal to a third signal are used as identical meanings in a corresponding method, but may be used as different meanings in another method. That is, a first signal used in the buffer status reporting method and a first signal used in the radio resource allocating method may be used as different meanings. In each method, a corresponding signal will be defined and described.

1. Method of Reporting the Buffer Status of D2D UE

A UE for executing D2D communication may need to inform a BS or an entity that has the right or a function to allocate radio resources (for example, a radio resource allocation entity) of information associated with an amount of data for D2D communication, so as to be assigned with the radio resource of the mobile communication network.

Therefore, a UE that currently executes D2D communication or has a D2D communication function may transmit a Buffer Status Report (BSR) to a BS or a radio resource allocation entity. When the UE transmits a BSR, the BS or the radio resource allocation entity is incapable of determining whether the BSR is information associated with an amount of data to be transmitted to another D2D UE or information associated with an amount of data to be transmitted through the BS. Therefore, the BS may be incapable of determining an amount of radio resources to be allocated to the communication through the BS and an amount of radio resources to be allocated to the D2D communication.

To solve the above drawbacks, embodiments of the present disclosure enable the BS or the radio resource allocation entity to allocate an appropriate amount of radio resources for D2D communication, thereby preventing the waste of radio resources and enabling the smooth execution of D2D communication.

Figure 6:
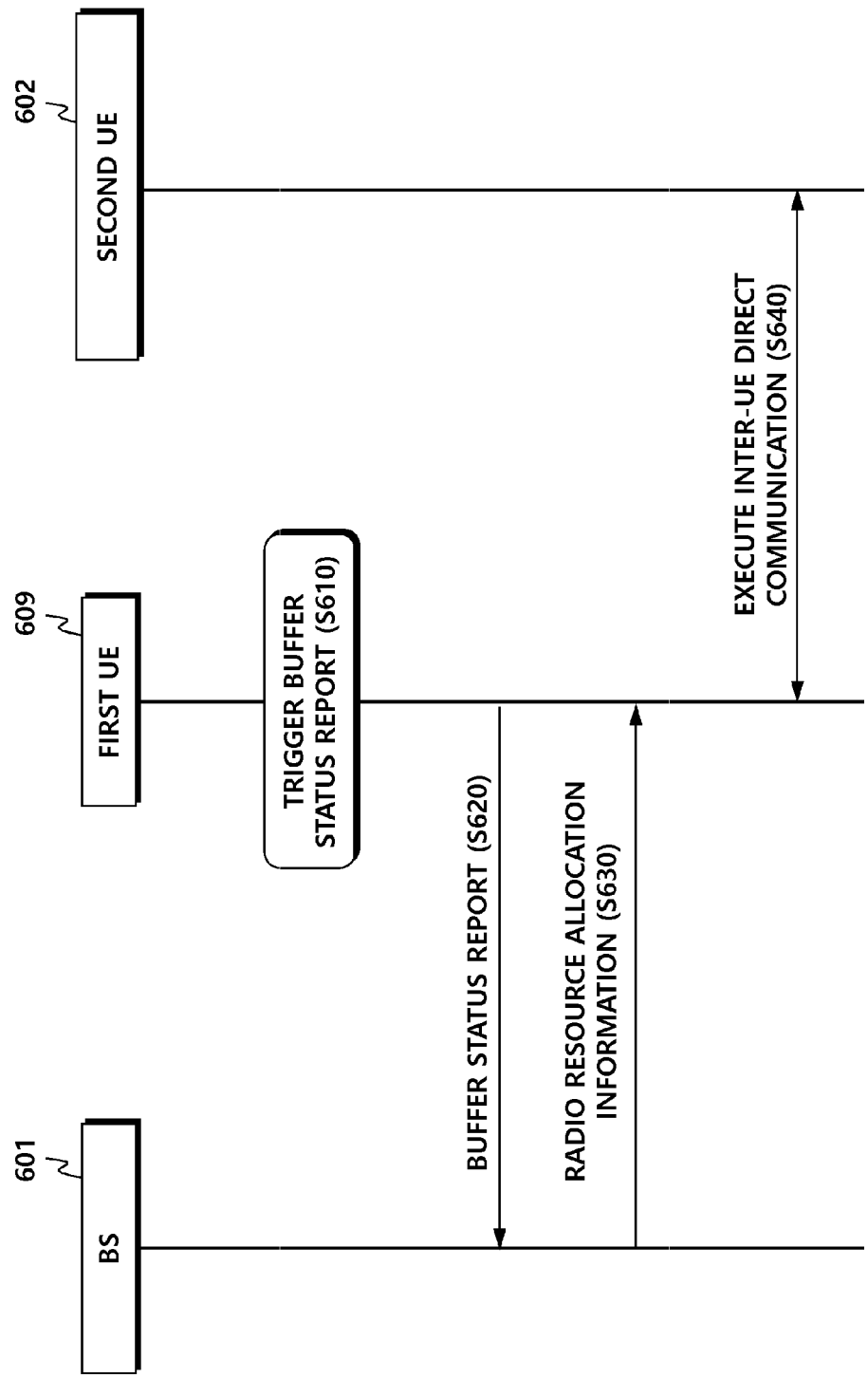
FIG. 6 is a diagram illustrating a signal flow between a UE and a Base Station (BS) according to an embodiment of the present disclosure.

FIG. 6 is a diagram illustrating a signal flow between a UE and a BS according to an embodiment of the present disclosure.

Referring to FIG. 6, embodiments of the present disclosure will be described through examples. Hereinafter, for ease of description, although it is described that a first UE transmits a BSR to a BS, the first UE may transmit a BSR to a radio resource allocation entity that has a radio resource allocating function, in addition to the BS. Even when the first UE transmits a BSR to a radio resource allocation entity, the detailed operations of the present embodiment that are described below, may be equally applied.

A method for a first UE to execute inter-UE direct communication with a second UE, according to an embodiment of the present disclosure, may include: triggering a Buffer Status Report (BSR) for the inter-UE direct communication with the second UE; transmitting the BSR to a BS or a radio resource allocation entity; and receiving radio resource allocation information for inter-UE direct communication with the second UE from the BS or the radio resource allocation entity.

Particularly, for example, when a first UE 609 currently executes D2D communication or plans to execute D2D communication, the first UE 609 detects a trigger of a BSR for D2D communication in operation S610.

When the BSR is triggered, the first UE 609 reports, to a BS 601, a Buffer Stats Report (BSR) associated with an amount of data to be transmitted through D2D communication, in operation S620. That is, when the first UE configures a MAC PDU for D2D transmission, the first UE may not include a BSR in the corresponding MAC PDU when the BSR is triggered, but may include the corresponding BSR in a MAC PDU for BS transmission. In this instance, according to an embodiment of the present disclosure, a BSR may be independently configured for D2D communication, or the BSR may be coupled with an existing BSR and may be transmitted as a single BSR.

When the BS 601 receives the BSR, the BS 601 transmits radio resource allocation information (D2D Grant) for D2D communication, based on the received BSR, in operation S630. The first UE 609 executes D2D communication with a second UE 602 based on the radio resource allocation information (D2D Grant) allocated from the BS 601, in operation S640. Based on the received BSR associated with an amount of data to be transmitted through D2D communication, the BS 601 may allocate radio resources based on dynamic scheduling or semi-persistent scheduling (SPS). The second UE may refer to an entity that executes communication with the first UE using the radio resources of the mobile communication network, without a BS. Also, the second UE may be at least one entity that executes inter-UE direct communication with the first UE of the present embodiment. Therefore, the second UE specified in the present specification may be an object that executes inter-UE direct communication (for example, D2D communication) with the first UE, which may be at least one entity or may be a group that executes inter-UE direct communication.

Hereinafter, each embodiment in which the first UE configures and transmits a BSR including information associated with an amount of data in a buffer for inter-UE direct communication, will be described. That is, a method of distinguishing a BSR for communication through a BS and a BSR for inter-UE direct communication when the first UE transmits a BSR, will be described through embodiments, with reference to drawings.

First Embodiment: A Method of Using a Dedicated BSR Associated with an Amount of Data to be Transmitted Through Inter-UE Direct Communication (for Example, D2D Communication)

A first UE according to the present embodiment may not include a BSR in D2D transmission when the communication using D2D is executed. When a BSR is triggered in the D2D communication, the first UE may transmit the corresponding BSR to at least one of a BS and a radio resource allocation entity having a radio resource allocating function.

For example, the first UE may detect whether the BSR for D2D communication is triggered. When the data for D2D communication enters a buffer or the like, the BSR of the first UE may be triggered. When the BSR for D2D communication is triggered, the first UE may not transmit the corresponding BSR to a second UE that executes D2D communication, and the first UE may transmit the same to a BS or a radio resource allocation entity having the radio resource allocating function.

Through the above, at least one of the BS and the radio resource allocation entity may obtain the information associated with the D2D data of the first UE, and the at least one of the BS and the radio resource allocation entity may execute efficient distribution and allocation of radio resources.

Particularly, the BSR transmitted to the BS may be a dedicated BSR which is distinguished from an existing BSR that is used for communication through a BS.

Figure 7:
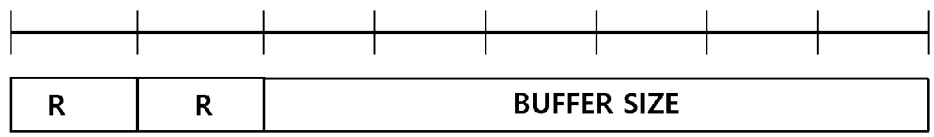
FIG. 7 is a diagram illustrating a configuration of a BSR according to an embodiment of the present disclosure.

FIG. 7 is a diagram illustrating a configuration of a BSR according to an embodiment of the present disclosure.

Referring to FIG. 7, a D2D BSR may be configured as illustrated in FIG. 7. For example, when a single logical channel exists for D2D communication, a first UE may configure and transmit a dedicated BSR for D2D communication. That is, in the configuration of a BSR including buffer information of a single logical channel, R indicates a reserved bit, and a buffer size indicates a value including information associated with an amount of data stored in a buffer for D2D communication.

FIG. 8 is a diagram illustrating a configuration of a BSR according to another embodiment of the present disclosure.

Referring to FIGS. 8(*a*) and 8(*b*), when a plurality of logical channels exists in a D2D connection of a first UE, the first UE may transmit information associated with an amount of data for D2D communication using an existing BSR format. That is, as described with reference to FIG. 2 and FIG. 3, a BSR may be configured in a format that is identical to a format of a BSR, which is used in the communication through a BS.

Particularly, the first UE that is capable of executing D2D communication may establish a D2D connection with at least one UE. Also, in each D2D connection, at least one logical channel may be configured.

As an example, the first UE may establish a D2D connection with at least one UE. That is, the first UE may establish a D2D connection with a second UE, and the first UE may also establish a D2D connection with a third UE. Also, when the first UE establishes a D2D connection with the second UE, at least one logical channel may exist. In the same manner, when the first UE establishes a D2D connection with the third UE, at least one logical channel may exist.

Therefore, the first UE may establish at least one D2D connection for inter-UE direct communication, and a logical channel for at least one D2D communication may exist in each connection for D2D communication.

More particularly, for example, when a BSR for D2D communication is transmitted in a short BSR format (a), it may be configured by including a logical channel group identifier (ID) and/or a D2D connection identifier (ID), and buffer size information. When a BSR for D2D communication is transmitted in a long BSR format (b), buffer sizes may be sequentially configured based on the order of logical channel groups or the order of D2D connections. That is, buffer size #0 may include the buffer size information of logical channel group #0, and buffer size #1 may include the buffer size information of logical channel group #1. That is, when there are two or more logical channels for D2D communication, a D2D BSR may be configured and transmitted. Also, when it is required, D2D connection identifier information is included and thus, information associated which UE's D2D connection is associated with each buffer size information out of the at least one D2D connection, may be transferred.

As described above, when the first UE transmits a BSR, the first UE configures a D2D BSR and transmits the same to a BS. The BS may distinguish an existing BSR of the first UE that executes communication through a BS and a D2D BSR, so as to efficiently manage D2D radio resources.

Figure 9:
FIG. 9 is a table illustrating exemplary values of a logical channel identifier field according to an embodiment of the present disclosure.

FIG. 9 and FIG. 10 are Tables indicating logical channel identifier values and indices for distinguishing a D2D BSR and an existing BSR.

FIG. 9 is a table illustrating exemplary values of a logical channel identifier field according to an embodiment of the present disclosure.

In the present disclosure, a D2D-dedicated logical channel may be newly defined to configure a D2D BSR which has been described in FIG. 7 and FIG. 8.

For example, a predetermined index 900 out of the reserved logical channel identifier (LCID) index values may be allocated as an index indicating a D2D BSR.

For example, the D2D BSR includes index information 900 including, in a reserved bit, a logical channel identifier value (or a D2D connection identifier value) indicating that it is a D2D BSR. That is, when a D2D BSR associated with a single logical channel is transmitted as illustrated in FIG. 7, a D2D-dedicated logical channel identity index (or D2D connection identity index) 900 may be used instead of a reserved bit.

Particularly, a logical channel identity index value (or D2D connection identity index value) '11000' may be defined as an index indicating a D2D BSR. Subsequently, the first UE may transmit, to a BS, the dedicated-BSR for D2D communication by including the corresponding index value '11000'. The BS may determine that the index value of the received BSR is '11000' and determines that the received BSR is a D2D BSR.

Also, as described with reference to FIG. 8, when the UE establishes D2D connections with a plurality of UEs, index information indicating which UE's D2D connection is associated with a transmitted D2D BSR, out of the plurality of UEs, may be included. That is, information indicating that the BSR is a D2D BSR and a BSR associated with a logical channel configured with a predetermined UE, may be transmitted by including index information including the described D2D connection identification value.

Also, a UE may configure D2D connections with a plurality of UEs by defining an index that may include both the described logical channel identifier value and the D2D connection identifier value, and such a UE may equally transmit the information when a plurality of logical channels exist in each D2D connection.

Hereinafter, for ease of description, although the present embodiment is described through the case in which a first UE establishes a single D2D connection with a second UE, the present embodiment may be equally applied when the first UE establishes D2D connections with a plurality of UEs as described above and a plurality of logical channels exist in each D2D connection. That is, concrete information associated with each BSR may be transferred through the described logical channel identifier value and/or D2D connection identifier value.

FIG. 10 is a table illustrating another exemplary values of a logical channel identifier field according to another embodiment of the present disclosure.

As an example, when a single logical channel identity index (LCID index) is allocated to a D2D BSR, the D2D BSR may indicate a predetermined one from among a long BSR format and a short BSR format.

An index reserved for a D2D BSR may be allocated as each BSR format as illustrated in FIG. 10.

For example, referring to FIG. 10, when an index associated with a D2D BSR is allocated, each index may be allocated based on a format of each BSR.

That is, '10110' may be allocated to a D2D Truncated BSR, and '10111' may be allocated to a D2D short BSR, to be correspondent to the indices 1010 allocated to an existing BSR format. Also, '11000' may be allocated to a D2D long BSR. Therefore, the first UE may include an index value appropriate for each BSR format, when transmitting a D2D BSR.

A BS may determine a D2D BSR based on an index, and such a BS may determine whether a BSR is a long BSR or a short BSR when each index is allocated as shown in FIG. 10. Therefore, for example, when one or more logical channels for D2D communication exist and data for D2D communication existing in a buffer of each logical channel satisfies a triggering condition, the first UE may transmit a D2D BSR including an index '11000', to the BS. Buffer size information associated with the order of logical channels may be included in the order of buffers of the buffer configuration of FIG. 8(b).

The first UE may transmit a D2D BSR when the D2D BSR is triggered.

For example, the D2D BSR may be triggered when the following condition is satisfied.

Regular BSR

The D2D BSR is triggered when a first UE, itself, is about to initiate or has initiated D2D communication (UE Initiated D2D Communication).

The D2D BSR is triggered when BSR information is transferred from another UE (for example, a second UE) that currently executes D2D communication, or a radio resource request is transferred from another UE (for example, the second UE). For example, when the UE that currently executes D2D communication (for example, the second UE) is outside the coverage of a BS, and requests radio resources for D2D communication from the BS through the first UE that is located inside the coverage, the D2D BSR may be triggered.

The D2D BSR is triggered when data of a D2D-dedicated logical channel having a higher priority enters a buffer.

The D2D BSR is triggered when new data for D2D transmission, which is to be transmitted, enters an empty buffer.

The D2D BSR is triggered when data for D2D transmission to be transmitted exists in a buffer, and a retransmission timer expires.

Periodic BSR

The D2D BSR is triggered when a period timer expires. For example, as the period timer, an existing BSR timer may be used or a new timer for a D2D BSR may be used. When the new timer is used, a relevant value may be set through a higher layer signaling (for example, an RRC message).

padding BSR

In the case in which a residual space which can include a BSR exists when a MAC PDU to be transmitted is configured, a long BSR or a short BSR may be included based on the size of the space.

In the case in which both an existing BSR for communication through a BS and a D2D BSR are triggered, when it is the case of a regular BSR, both may be included in a MAC CE and may be transmitted.

Based on the received D2D BSR, the BS may allocate radio resources based on dynamic scheduling or semi-persistent scheduling (SPS).

Second Embodiment: A Method of Using a Single BSR to Request Radio Resources for the Communication with a BS and D2D Communication A first UE may transmit, through a single BSR, an existing BSR for the communication through a BS and a BSR for D2D communication.

For example, when the first UE currently executes D2D communication or plans to communicate through D2D and when a BSR is triggered in D2D communication, the first UE may not include a BSR in the D2D transmission, may incorporate the corresponding BSR and the BSR of the BS, and may transmit the same to the BS. In this instance, the transmitted BSR may be configured to include both information associated with an amount of data for the existing BS communication and information associated with an amount of data for D2D transmission.

Figure 11:
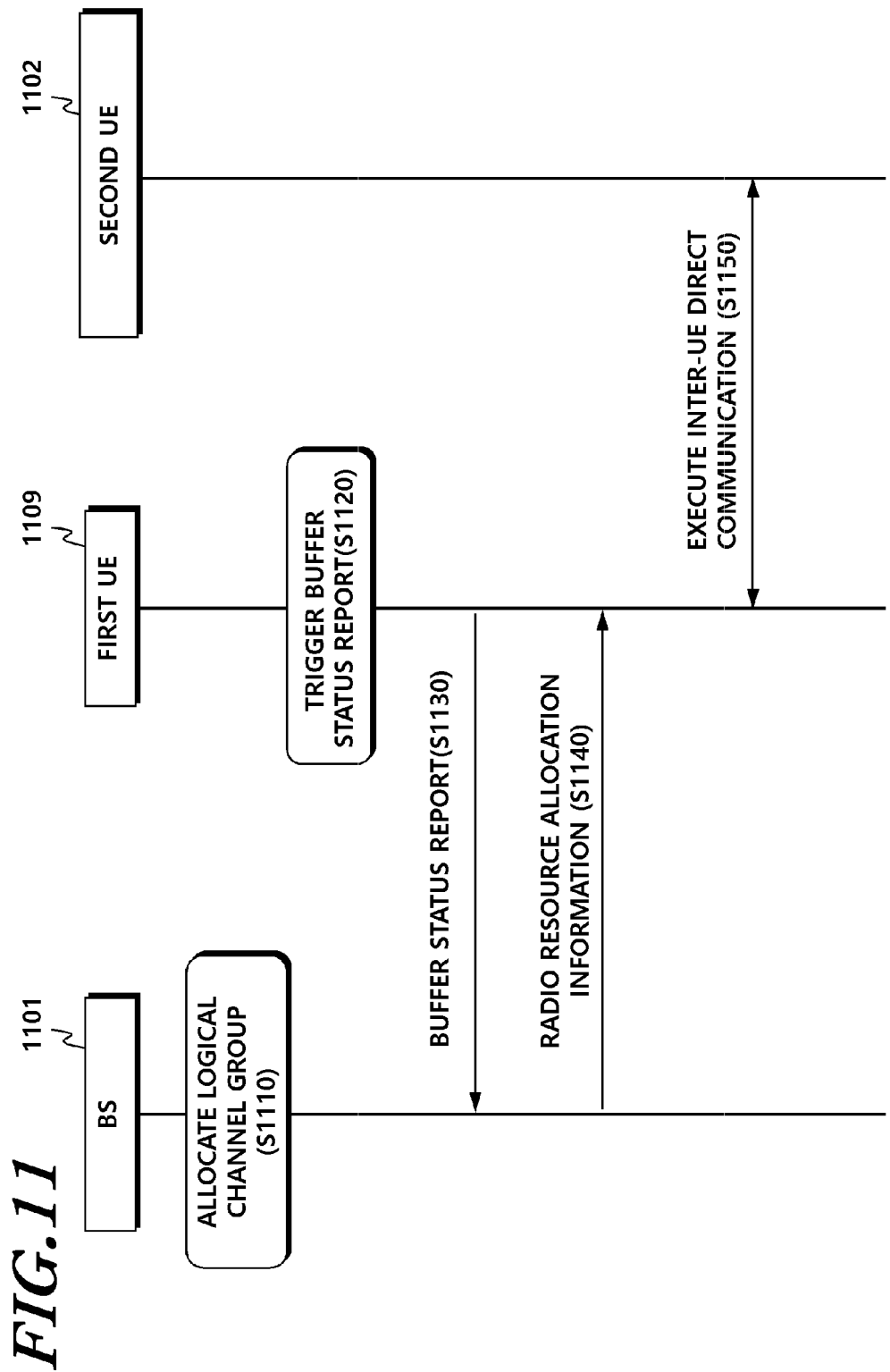
FIG. 11 is a diagram illustrating a signal flow between a UE and a BS according to another embodiment of the present disclosure.

FIG. 11 is a diagram illustrating a signal flow between a UE and a BS according to another embodiment of the present disclosure.

Referring to FIG. 11, a BS 1101 allocates each logical channel (Logical Channel Identity) of a first UE 1109 to a logical channel group. The BS 1101 allocates logical channels to logical channel groups, by distinguishing a logical channel group for the communication through a BS and a logical channel group for D2D communication, in operation S1110.

When allocating logical channels to logical channel groups, the BS of the present embodiment may not allocate the logical channels of the BS and the D2D communication into a single logical channel group, so as to distinguish a logical channel for D2D communication. That is, the BS may not allocate a logical channel (Logical Channel Identity) for the transmission through a BS and a logical channel (Logical Channel Identity) for D2D together, into a single logical channel group (LCG).

Subsequently, when a BSR for D2D communication with a second UE 1102 is triggered in operation S1120, the first UE 1109 transmits the corresponding BSR to the BS 1101 in operation S1130. The BS 1101 may transmit radio resource allocation information to the first UE 1109 based on the BSR received from the first UE 1109. The first UE 1109 executes D2D communication with the second UE 1102 which is to execute inter-UE direct communication, based on the received radio resource allocation information, in operation 1150.

In this instance, the BS allocates a D2D-dedicated logical channel to a logical channel group that is different from a logical channel group of a logical channel for the communication through a BS, thereby determining that the information included in the BSR is buffer status information for D2D communication.

Figure 12:
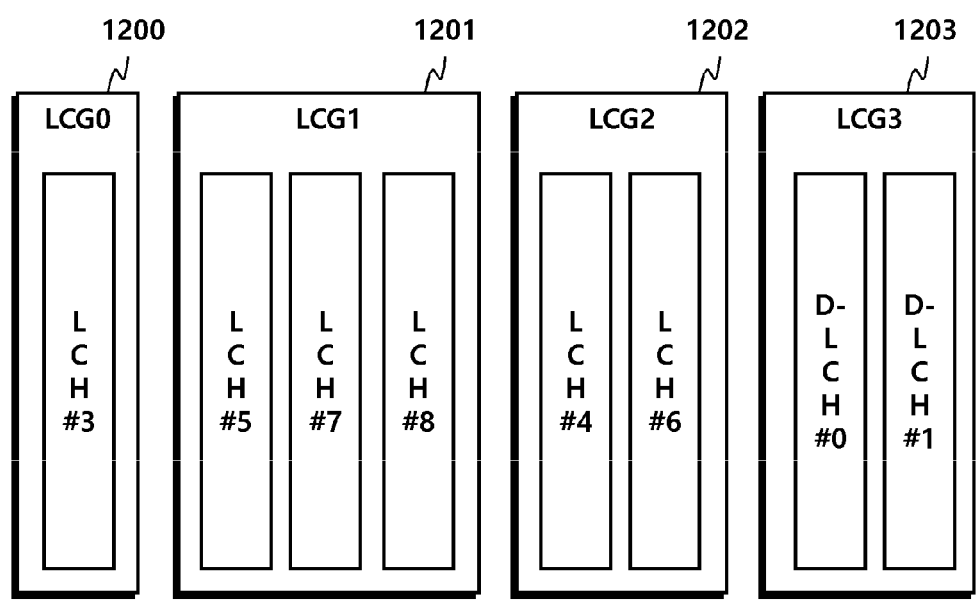
FIG. 12 is a diagram illustrating a logical channel group based on an allocation method according to an embodiment of the present disclosure.

FIG. 12 is a diagram illustrating a logical channel group based on an allocation method according to an embodiment of the present disclosure.

Referring to FIG. 12, an embodiment in which a BS distinguishes a logical channel when allocating the logical channel to a logical channel group, will be described in detail.

The logical channel group indicates a bundle of logical channels that have similar QoS requirements or similar characteristics. For example, a maximum of four logical channel groups may exist for a first UE. Therefore, an example in which four logical channel groups exist will be described.

In FIG. 12, D2D-Logical CHannel (D-LCH) is a logical channel for D2D communication. That is, two logical channels for D2D communication, D-LCH #0 and D-LCH #1, may exist for the first UE.

In this instance, a BS may allocate logical channels for general communication through a BS to logical channel groups 0 to 2 (LCG0~2) 1200, 1201, and 1202. For example, based on the characteristic of a corresponding logical channel, LCH #3 may be allocated to LCG 0 1200, LCH #5, LCH #7, and LCH #8 may be allocated to LCG 1 1201, and LCH #4 and LCH #6 may be allocated to LCG 2 1202.

Also, the BS may allocate only logical channels for D2D communication to LCG 3 1203. For example, D-LCH #0 and D-LCH #1 may be allocated to LCG 3 1203.

Based on the BSR configured as described above, the BS may distinguish the communication through a BS and D2D communication and may efficiently allocate a radio resource based on corresponding BSR information.

When a BSR is triggered, the first UE may configure a BSR format and transmit the same based on buffer information of a logical channel allocated to each logical channel group. For example, when a long BSR is triggered, the first UE may sequentially configure buffer size information of the logical channel groups 1200 to 1203 and transmit the same. The BS may determine the buffer size of LCG 3 1203 based on the received corresponding BSR.

Also, when the BSR is provided in a short BSR format and only a predetermined LCG is transmitted, a BSR may be transmitted for only an LCG having the highest priority or a BSR may be transmitted for only LCG 1203 associated with D2D transmission. That is, when the short BSR is transmitted, information associated with only a single LCG may be included, which is determined based on set priority.

When at least one of an existing BSR triggering condition and BSR triggering condition for D2D communication is satisfied, the first UE may transmit a BSR. Particularly, for example, a BSR in an embodiment of the present disclosure may be triggered when the following condition is satisfied.

Regular BSR

The BSR is triggered when the first UE, itself, is about to initiate D2D communication or has initiated D2D communication (UE Initiated D2D Communication).

The BSR is triggered when BSR information is transferred from another UE (for example, a second UE) that currently executes D2D communication, or a radio resource request is transferred from another UE (for example, a second UE). For example, when the UE that currently executes D2D communication (for example, the second UE) is outside the coverage of a BS, and requests radio resources for D2D communication from the BS through the first UE that is located inside the coverage, the BSR may be triggered.

The BSR is triggered when data of a D2D-dedicated logical channel having a higher priority enters a buffer.

The BSR is triggered when new data for D2D transmission, which is to be transmitted, enters an empty buffer.

The BSR is triggered when data for D2D transmission to be transmitted exists in a buffer, and a retransmission timer expires.

The BSR is triggered when data of a logical channel having a higher priority enters a buffer.

The BSR is triggered when new data to be transmitted enters an empty buffer.

The BSR is triggered when data to be transmitted exists in a buffer, and a retransmission timer expires.

Periodic BSR

The BSR is triggered when a D2D-dedicated period timer expires. For example, the D2D period timer may be identical to an existing BSR timer, or a new timer for a D2D BSR may be defined and used. When the new timer is used, a relevant value may be set through a higher layer signaling (for example, an RRC message).

The BSR is triggered when an existing period timer expires. For example, although a D2D-dedicated period timer is separately defined, when a BSR transmission-dedicated period timer, which may be used for communication through a BS, expires, the BSR may be triggered.

padding BSR

In the case in which a residual space which can include a BSR exists when a MAC PDU to be transmitted is configured, a long BSR or a short BSR may be included based on the size of the space.

Through the embodiments described above, the BS recognizes an amount of data for D2D transmission of the first UE, thereby providing an appropriate size of a radio resource to the corresponding first UE. Also, the first UE may manage to enable smooth D2D communication and appropriately distribute a radio resource used for the communication through a BS and a radio resource for D2D communication. Through the above, the BS may improve the whole system performance.

The operations of a first UE and the BS, through which the present embodiment may be executed, will be described with reference to FIG. 13 to FIG. 15.

Figure 13:
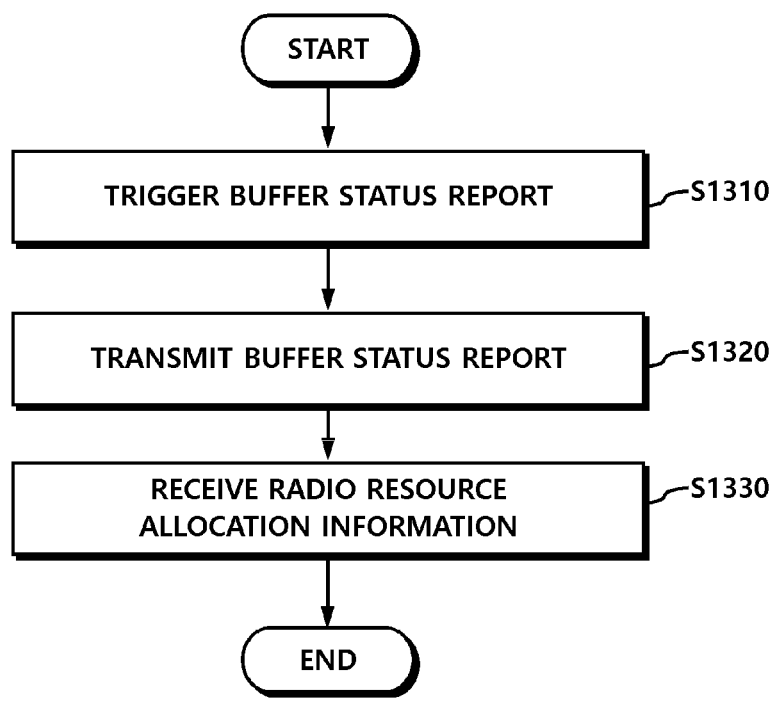
FIG. 13 is a diagram illustrating operations of a first UE according to an embodiment of the present disclosure.

FIG. 13 is a diagram illustrating operations of a first UE according to an embodiment of the present disclosure.

A method for the first UE to execute inter-UE direct communication, according to an embodiment of the present disclosure, may include triggering a Buffer Status Report (BSR) for inter-UE direct communication, transmitting the BSR to at least one of a BS and a radio resource allocation entity, and receiving radio resource allocation information for inter-UE direct communication from the at least one of BS and the radio resource allocation entity.

Referring to FIG. 13, the first UE of the present embodiment triggers a buffer status report (BSR) for inter-UE direct communication, in operation S1310. For example, the BSR may be triggered, upon the generation of at least one of predetermined events, where the predetermined events are generated i) when the first UE initiates the inter-UE direct communication, ii) when the inter-UE direct communication begins, iii) when a radio resource request is received from a second UE that is to execute inter-UE direct communication with the first UE, iv) when data for inter-UE direct communication, which has a higher priority, enters a buffer, v) when data for inter-UE direct communication enters the buffer, vi) when data for inter-UE direct communication exists in the buffer, and a retransmission timer expires, and vii) when a timer for transmitting the BSR expires. Also, in addition to the above conditions, a triggering condition that has been described in the above described embodiments of the present disclosure is satisfied, the BSR may be triggered.

Also, when the BSR is triggered, the first UE transmits the BSR to at least one of a BS and a radio resource allocation entity in operation S1320. For example, the radio resource allocation entity indicates a terminal that executes at least one function from among allocating radio resources for inter-UE direct communication, transmitting a sync channel, and managing a UE group that executes inter-UE direct communication. Therefore, the radio resource allocation entity may be a radio resource allocation entity. In the case of D2D communication, the radio resource allocation entity may be referred to as various terms, such as, a cluster head, a central control entity, a central entity, and the like.

The BSR that the first UE transmits to the BS may be configured to be different in the first embodiment and the second embodiment.

For example, as described in the first embodiment, a dedicated BSR for inter-UE direct communication may be configured and transmitted. For example, the BSR may include a logical channel identity index value (or a D2D connection index value) for inter-UE direct communication, which is distinguished from a logical channel identifier (Logical Channel Identity) index value for the communication with a BS. Based on a format of the BSR, a plurality of index values may be defined and included, or only a single index value may be defined and included. Also, as described above, when the UE configures D2D connections with a plurality of UEs, the BSR may include a D2D connection identity index value. Alternatively, both a logical channel identity index value and a D2D connection identity index value may be included, or a separate index value for defining the two values may be included.

Alternatively, as described in the second embodiment, logical channels for inter-UE direct communication may be allocated to a predetermined logical channel group. For example, the BSR may include buffer status information associated with a logical channel for the communication with a BS and a logical channel for inter-UE direct communication, and the logical channel for the inter-UE direct communication may be allocated to a logical channel group that is distinguished from a logical channel for the communication with a BS.

The first UE receives radio resource allocation information for inter-UE direct communication from a BS in operation S1330. The first UE may execute inter-UE direct communication based on the received radio resource allocation information.

Figure 14:
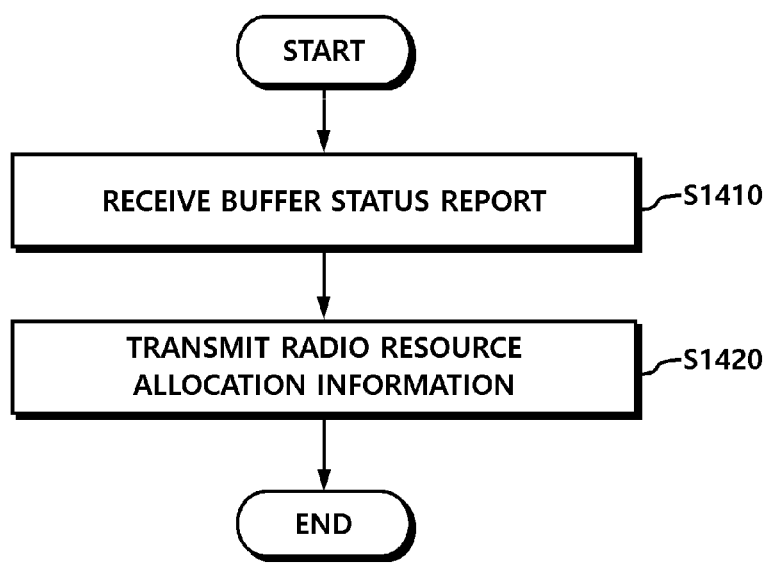
FIG. 14 is a diagram illustrating operations of a BS according to an embodiment of the present disclosure.

FIG. 14 is a diagram illustrating operations of a BS according to an embodiment of the present disclosure.

A method for a BS to control inter-UE direct communication, according to an embodiment of the present disclosure, may include receiving a Buffer Status Report (BSR) from a first UE when the BSR of a first UE for inter-UE direct communication is triggered, and transmitting radio resource allocation information for inter-UE direct communication based on the BSR.

Referring to FIG. 14, the BS receives a BSR for inter-UE direct communication from the first UE in operation S1410. For example, when the first UE detects a trigger of a BSR, the BS may receive a BSR including information associated with an amount of data for the corresponding inter-UE direct communication.

For example, the BSR may be triggered upon the generation of at least one of predetermined events, where the at least one of the predetermined events is generated i) when the first UE initiates the inter-UE direct communication, ii) when the inter-UE direct communication begins, iii) when a radio resource request is received from a second UE that is to execute inter-UE direct communication with the first UE, iv) when data for inter-UE direct communication, which has a higher priority, enters a buffer, v) when data for inter-UE direct communication enters the buffer, vi) when data for inter-UE direct communication exists in the buffer, and a retransmission timer expires, and vii) when a timer for transmitting the BSR expires. Also, in addition to the above conditions, a triggering condition that has been described in the above described embodiments of the present disclosure is satisfied, the BSR may be triggered.

The BSR that the BS receives may be configured to be different for each above described embodiment of the present disclosure.

For example, as described in the first embodiment, a dedicated BSR for inter-UE direct communication may be configured and received. For example, the BSR may include a logical channel identity index value for inter-UE direct communication, which is distinguished from a logical channel identifier (Logical Channel Identity) index value for the communication with a BS. Based on a format of the BSR, a plurality of index values may be defined and included, or only a single index value may be defined and included. Also, as described above, when the UE configures D2D connections with a plurality of UEs, the BSR may include a D2D connection identity index value. Alternatively, both a logical channel identity index value and a D2D connection identity index value may be included, or a separate index value for defining the two values may be included.

The BS allocates a radio resource for inter-UE direct communication, based on the received BSR, and transmits radio resource allocation information in operation S1420.

Figure 15:
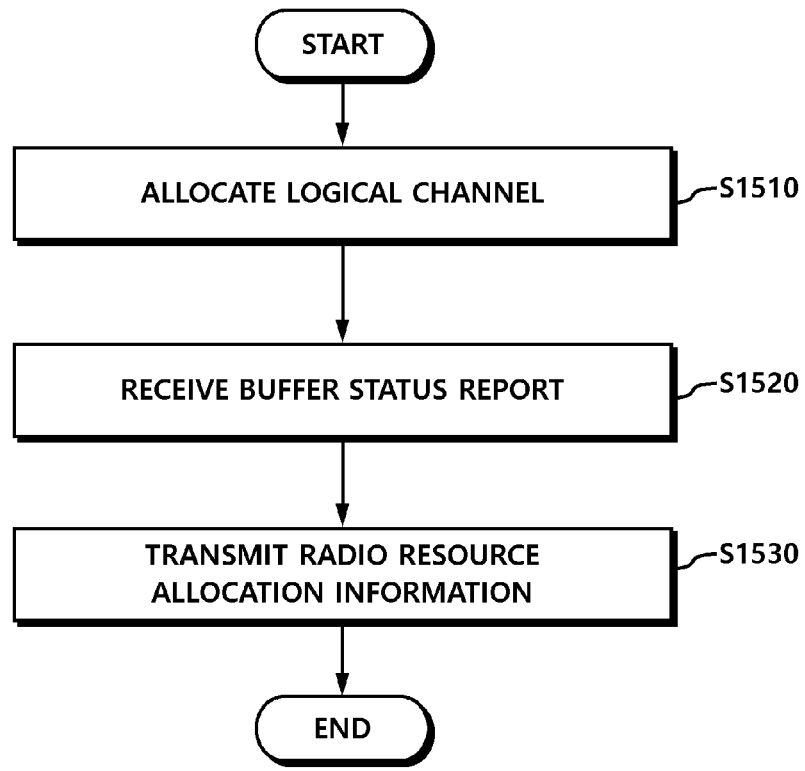
FIG. 15 is a diagram illustrating operations of a BS according to another embodiment of the present disclosure.

FIG. 15 is a diagram illustrating exemplary operations of a BS according to another embodiment of the present disclosure.

Referring to FIG. 15, a BS allocates logical channels for inter-UE direct communication to a predetermined logical channel group in operation S1510. For example, the BSR may include buffer status information associated with a logical channel for the communication with a BS and a logical channel for inter-UE direct communication, and the logical channel for inter-UE direct communication may be allocated to a logical channel group that is distinguished from a logical channel for the communication with a BS.

Particularly, the BS may allocate at least one logical channel for inter-UE direct communication to a predetermined logical channel group. That is, a logical channel for the communication through a BS and a logical channel for inter-UE direct communication are not allocated to an identical logical group. Such a logical channel may be allocated to different logical channel groups.

The BS receives a BSR including buffer information for inter-UE direct communication from the first UE in operation S1520. As described above, the BSR may incorporate and include a buffer status associated with a logical channel for the communication with a BS and a buffer stats associated with a logical channel for inter-UE direct communication. Also, in the incorporated BSR, a logical channel group to which the logical channel(s) for the inter-UE direct communication is allocated may be configured to be distinguished from a logical channel group for the communication through a BS.

The BS may allocate a radio resource for the inter-UE direct communication based on the received BSR. The BS transmits radio resource allocation information for inter-UE direct communication to the first UE in operation S1530.

According to the present embodiment as described above, the first UE may be assigned with a radio resource that may be used for inter-UE direct communication, from a BS or a radio resource allocation entity that is capable of allocating radio resources.

Also, the first UE may be assigned with an accurate amount of radio resources by transmitting a BSR for inter-UE direct communication.

Also, the BS or the radio resource allocation entity that is capable of allocating radio resources may receive, from the first UE, a separate BSR for inter-UE direct communication, thereby reducing the waste of radio resources and effectively allocating radio resources for inter-UE direct communication.

2. Method of Distributing Radio Resources in D2D Communication

A BS may allocate radio resources for data transmission and reception of a UE. Based on BSR information as described above, the BS may allocate uplink radio resources and may allocate radio resources for transmitting downlink data and signals.

Various allocation schemes may be used when the BS allocates radio resources. For example, such allocation schemes may include a method of dynamically allocating a radio resource, a method of allocating a radio resource during a predetermined period of time, or the like. Hereinafter, as an example in which a BS allocates a radio resource, a Semi-Persistent Scheduling (SPS) scheme will be described.

The SPS scheme may be a scheduling scheme for a service for a small size of data transmission, such as Voice over Internet Protocol (VoIP), repeatedly occurs based on a short period. For example, when a UE transmits or receives data for a voice call, a similar size of a voice packet is generated based on a regular period and transmitted. That is, to enable the UE to transmit a corresponding packet, the BS needs to allocate a similar amount of radio resources based on a regular period. When a dynamic scheduling scheme is used for VoIP service, a large number of PDCCHs may be used to continuously transmit downlink assignment and uplink grant (UL grant) information. The number of PDCCHs is limited and thus, when a single UE uses a large number of PDCCHs, the number of UEs that the BS may provide a service in a cell may be reduced. Therefore, a scheme that schedules at once that a predetermined size of a resource is periodically used during a long period of time, so as to minimize the load on the PDCCH, may be referred to as Semi-Persistent Scheduling (SPS) scheme.

Figure 16:
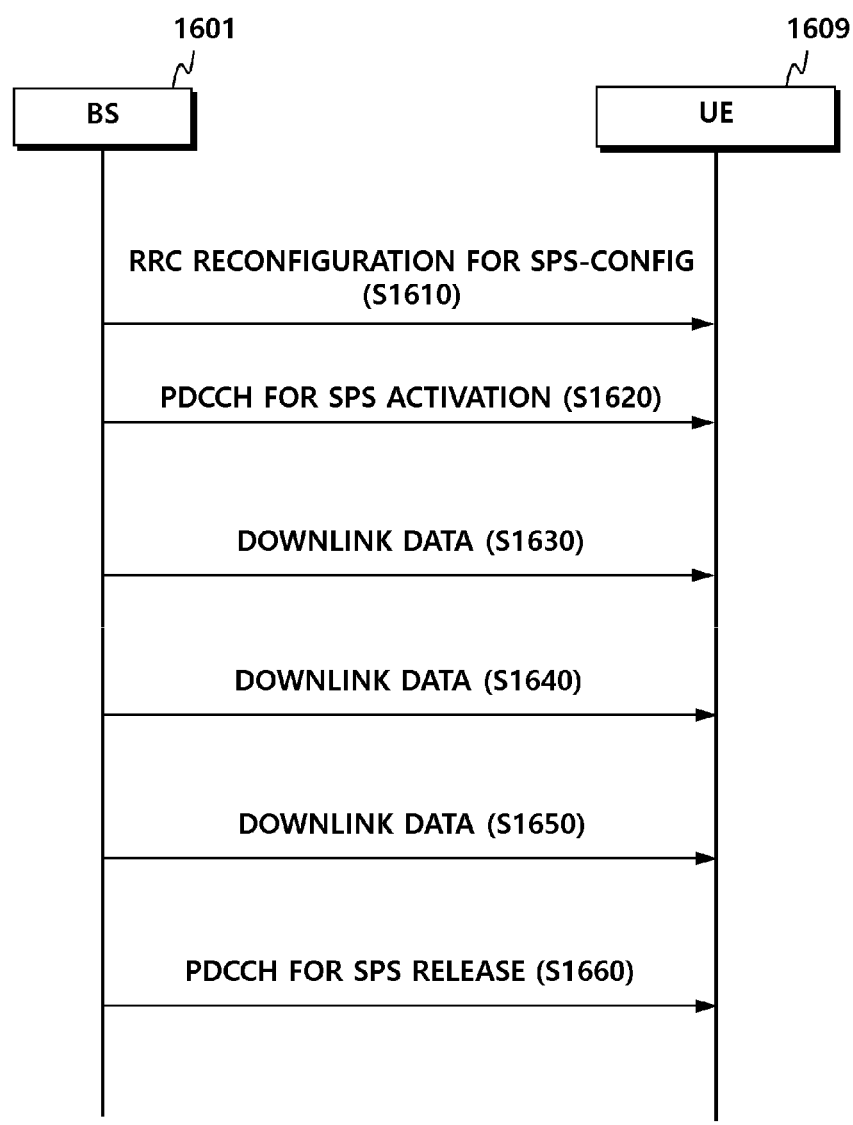
FIG. 16 is a diagram illustrating semi-persistent scheduling in downlink data transmission.

FIG. 16 is a diagram illustrating an exemplary operation of semi-persistent scheduling for downlink data transmission.

A BS 1601 may schedule a radio resource for downlink data transmission to a UE 1609.

Referring to FIG. 16, for example, the BS 1601 transmits a higher layer signaling including SPS configuration information (SPS-config) to the UE 1609 in operation 1610. For example, the higher layer signaling may be an RRC Reconfiguration message.

Subsequently, the BS 1601 transmits, to the UE 1609, a PDCCH for the activation of SPS in operation S1620. When the UE 1609 receives a PDCCH, the BS 1601 transmits downlink data in operation S1630, S1640, and S1650.

The BS 1601 transmits a PDCCH that terminates SPS scheduling, upon the completion of the downlink data transmission in operation S1660. Through the above procedure, the BS may transmit a small amount of data that is periodically generated, to the UE through the scheduling executed once. Therefore, PDCCH resources consumed for each transmission of downlink data may be reduced.

Figure 17:
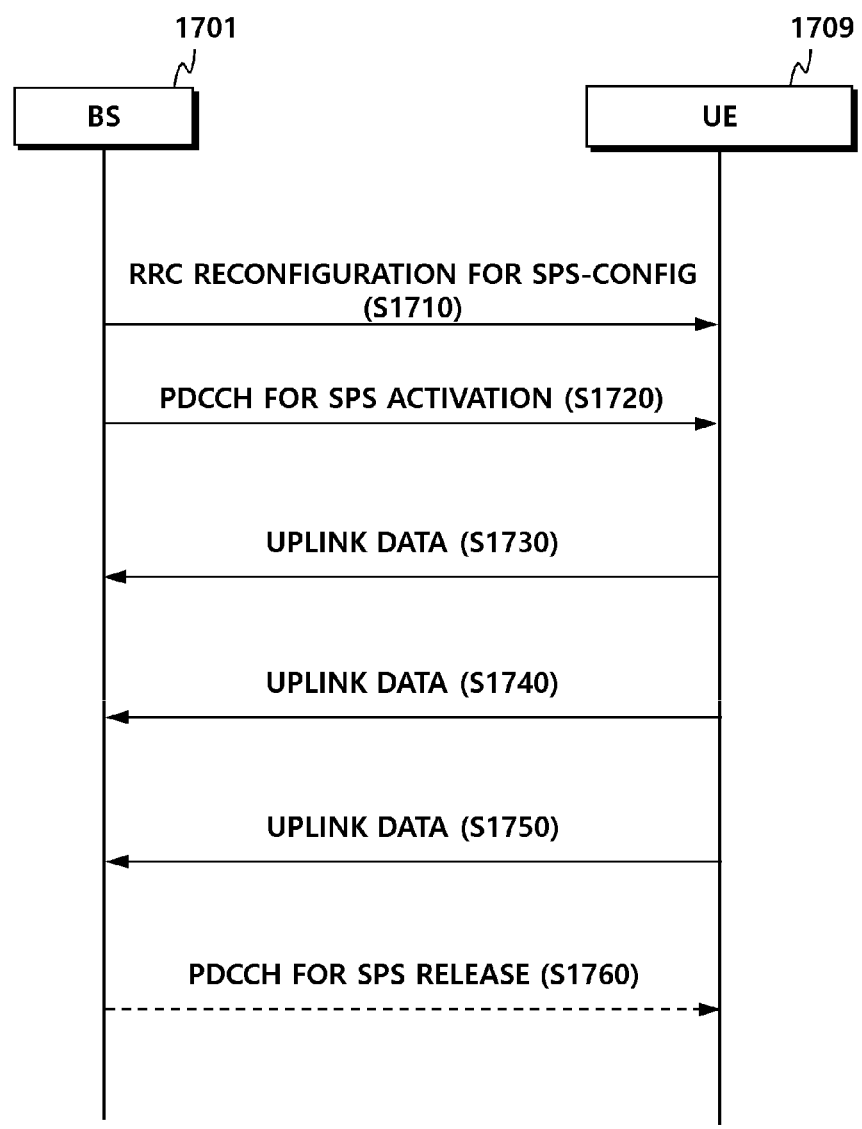
FIG. 17 is a diagram illustrating semi-persistent scheduling in uplink data transmission.

FIG. 17 is a diagram illustrating an exemplary operation of semi-persistent scheduling for uplink data transmission.

A BS 1701 may schedule a radio resource for uplink data reception from a UE 1709.

Referring to FIG. 17, for example, the BS 1701 transmits a higher layer signaling including SPS configuration information (SPS-config) to the UE 1709 in operation S1710. For example, the higher layer signaling may be an RRC Reconfiguration message.

Subsequently, the BS 1701 transmits, to the UE 1709, a PDCCH for the activation of SPS in operation S1720. When a PDCCH including SPS activation information is received, the UE 1709 transmits uplink data to the BS 1701 in operation S1730, S1740, and S1750.

The BS 1701 transmits a PDCCH that terminates SPS scheduling, upon the completion of the uplink data transmission in operation S1760. As another example, the BS 1701 may not transmit a PDCCH that terminates SPS scheduling. In this instance, when uplink data is not received during a predetermined period of time or at least a predetermined number of times, the SPS scheduling may be terminated. Through the above procedure, the UE may transmit a small amount of data that is periodically generated, to the BS through the scheduling executed once. Therefore, PDCCH resources consumed for each transmission of uplink data may be reduced.

However, when a UE that currently executes D2D communication (or including a D2D communication function) terminates D2D transmission, the BS may fail to recognize whether the corresponding D2D communication is terminated.

Therefore, when the BS allocates, to the corresponding UE, a predetermined amount of radio resources for D2D communication, the BS may not determine when to release the corresponding resources since the BS may not be aware of when the D2D communication of the UE is terminated. Therefore, the D2D-dedicated radio resource which is not used may be continuously and unnecessarily wasted and thus, the corresponding resource may be wasted when the BS executes scheduling.

To solve the drawback, embodiments of the present disclosure enable the BS to recognize whether the D2D communication of a UE is terminated, and thus, the radio resources may be prevented from being unnecessarily allocated to the terminated D2D communication. Through the above, the BS may efficiently manage the radio resources.

Hereinafter, each embodiment of the present disclosure to solve the above drawback will be described in detail.

FIG. 18 is a diagram illustrating a signal flow according to an embodiment of the present disclosure. A method for a first UE to execute inter-UE direct communication with a second UE according to an embodiment of the present disclosure, may include: transmitting, to at least one of a BS and a radio resource allocation entity, a first signal including radio resource allocation request information for inter-UE direct communication with a second UE, receiving a second signal including radio resource allocation information from the at least one of the BS and the radio resource allocation entity, executing inter-UE direct communication with the second UE based on the radio resource allocation information, and transmitting a third signal including information associated with a status of inter-UE direct communication with the second UE.

For example, referring to FIG. 18, a first UE 1809 transmits, to a BS 1801, a first signal including information that requests radio resource allocation required for executing inter-UE direct communication with a second UE in operation S1810. As another example, the first UE 1809 transmits the first signal to an entity that allocates radio resources. For example, the radio resource allocation entity indicates an entity that executes at least one function from among allocating radio resources for inter-UE direct communication, transmitting a sync channel, and managing a UE group that executes inter-UE direct communication. That is, in the case of D2D communication, the radio resource allocation entity may be referred to as various terms, such as, a cluster head, a central control entity, a central entity, and the like. From the perspective of the function, the radio resource allocation entity refers to an entity that executes some of the functions of a BS, such as allocating radio resources when UEs are located outside the coverage of the D2D communication scenario, transmitting a sync channel, managing a D2D group, or the like. Hereinafter, although, for ease of description, the descriptions will be provided through a BS, the operation including the radio resource allocation entity instead of the BS may be included in the scope of the present embodiment.

The BS 1801 or the radio resource allocation entity allocates a radio resource for inter-UE direct communication to the first UE 1809 and transmits a second signal including the corresponding allocation information in operation S1820.

The first UE 1809 executes inter-UE direct communication with a second UE using a radio resource allocated after receiving the radio resource allocation information in operation S1830.

Subsequently, the first UE 1809 transmits a third signal including information associated with the status of the inter-UE direct communication with the second UE to the BS 1801 in operation S1840.

The second UE refers to an entity that is capable of transmitting and receiving, to/from a UE of the present embodiment, data and signals using the radio resources of the mobile communication network, without a BS. The second UE may be at least one entity, and although, for ease of description, the present invention specifies the second UE as a single entity, a plurality of entities may be used.

The communication status of inter-UE direct communication with the second UE will be defined to be different for each embodiment described below. For example, inter-UE direct communication termination information, radio resource allocation re-request information, or the like may be used, and hereinafter, each case will be described in detail.

First Embodiment: A Method in which a First UE Transmits an Inter-UE Direct Communication Termination Message Associated with the Inter-UE Direct Communication (for Example, D2D) with a Second UE This is a method of releasing allocated radio resources, through an explicit message, such as an inter-UE direct communication termination message (Explicit release).

When the first UE that currently executes inter-UE direct communication with the second UE does not have data to be transmitted through the inter-UE direct communication (for example, when D2D communication is terminated), the first UE may transmit the inter-UE direct communication termination message to a BS or a radio resource allocation entity. For example, a D2D communication UE may transmit a D2D communication termination message.

FIG. 19 is a diagram illustrating a signal flow according to another embodiment of the present disclosure.

Referring to FIG. 19, an embodiment in which a UE explicitly reports the termination of the inter-UE direct communication with a second UE will be described in detail. For ease of description, D2D communication will be used as an example. An overall procedure is as follows.

1. A first UE 1909 that desires D2D communication transmits, to a BS 1901, a request message for D2D communication in operation S1910. The corresponding request message may include radio resource allocation request information. The request message may be an RRC message or may be a higher layer signaling. The transmission of the request message may further include assistance information for D2D communication. For example, the assistance information may include information required for a UE to be assigned with radio resources for executing D2D communication, such as, information associated with an amount of data to be transmitted through D2D communication, information associated with a type of data for D2D communication, ID information of an adjacent UE that desires D2D communication, information associated with a DRB to be transmitted through D2D communication, or the like. Also, as another example, an amount of D2D data may be buffer status information of a UE for D2D communication.

2. The BS 1901 that receives the request message allocates, to the first UE 1909 that transmits the message, a radio resource to be used for D2D communication in operation S1920. The radio resource allocation message that the BS 1901 transmits to the first UE 1909 may additionally include assistance information for D2D communication. For example, the assistance information that the BS transmits to the first UE may include D2D discovery radio resource information, D2D communication radio resource information, adjacent UE ID information, adjacent UE location information, information associated with a DRB to be converted into D2D communication, or the like.

The D2D assistance information that the BS transmits to the first UE may be transmitted through an RRC message or a PDCCH. Alternatively, the D2D assistance information may be broadcasted through a System Information Block (SIB). In this instance, a D2D request process in operation S1910, which is procedure #1, may be omitted.

3. The first UE 1909 that is assigned with the radio resource for D2D, executes D2D communication with at least one second UE 1902 using the corresponding radio resource in operation S1930.

4. The first UE 1909 transmits, to the BS 1901, a D2D communication termination message when D2D communication is terminated, in operation S1940. That is, the first UE 1909 may transmit the D2D communication termination message as the third signal that has been described in FIG. 18. The BS 1901 receives the termination message and recognizes that the D2D communication of the first UE 1909 is terminated.

The BS 1901 that receives the D2D communication termination message uses the corresponding radio resource to execute another communication. That is, the BS 1901 may allocate a radio resource, which was allocated for D2D communication, for another communication, thereby effectively managing the radio resources.

FIG. 20 is a diagram illustrating a RadioResourceConfigDedicated information element according to an embodiment of the present disclosure.

The inter-UE (D2D) direct communication assistance information, which may be transmitted and received in operation S1910 and S1920, may include one or more pieces of information from among the following information. For example, the assistance information may include one or more pieces of information from among D2D discovery radio resource information, D2D communication radio resource information, group ID information to be used for D2D communication, information associated with an amount of data to be transmitted through D2D communication, information associated with a type of data for D2D communication, ID information of an adjacent UE that desires D2D communication, information associated with a DRB to be transmitted through D2D communication, and HARQ process information to be used for D2D communication.

For example, the described inter-UE (D2D) direct communication assistance information may be formed of D2D configuration information element. Particularly, for example, the described D2D configuration information element may be included in an RRC reconfiguration message, or may be formed as a new RRC message.

For example, this may be configured as an RRC message illustrated in FIG. 20.

Referring to FIG. 20, a d2d-config field 2010 may be added to a RadioResourceConfigDedicated information element and the above described assistance information or the like may be transferred. In addition, various fields may be included in the RadioResourceConfigDedicated information element. For example, the included various fields and corresponding information may be listed in the table provided below.

TABLE 3

RadioResourceConficDedicated field descriptions logicalChannelConfig
For SRBs a choice is used to indicate whether the logical configuration is signalled explicitly or set to the default logical channel configuration for SRB1 as specified in 9.2.1.1 or for SRB2 as specified in 9.2.1.2.
logicalChannelIdentity
The logical channel identity for both UL and DL.
mac-MainConfig
Although the ASN.1 includes a choice that is used to indicate whether the mac-MainConfig is signalled explicity or set to the default MAC main configuration as specified in 9.2.2, EUTRAN does not apply "defaultValue".
measSubframePatternPCell
Time domain measurement resource restriction pattern for the PCell measurements (RSRP, RSRQ and the radio link monitoring).
neighCellsCRS-Info
This field contains assistance information, concerning the primary frequency, used by the UE to mitigate interference from CRS while performing RRM/RLM/CSI measurement or data demodulation. When the received CRS assistance information is for a cell with CRS colliding with that of the CRS of the cell to measure, the UE may use the CRS assistance information to mitigate CRS interference (as specified in TS 36 101 [42]) on the subframes indicated by measSubframePatternPCal, measSubframePatternConfigNeigh and csi-MeasSubframeSet1. Furthermore, the UE may use CRS assistance information to mitigate CRS interference from the cells in the IE for the demodulation purpose as specified in TS 36.101 [42].
physicalConfigDedicated
The default dedicated physical configuration is specified in 9.2.4.
ric-Config
For SRBs a choice is used to indicate whether the RLC configuration is signailed explicitly or set to the values defined in the default RLC configuration for SRB1 in 9.2.1.1 or for SRB2 in 9.2.1.2. RLC AM is the only applicable RLC mode for SRB1 and SRB2. E-UTRAN does not reconfigure the RLC mode of DRBs except when a full configuration option is used, and may reconfigure the UM RLC SN field size only upon handover within E-UTRA or upon the first reconfiguration after RRC connection re-establishment.
sps-Config
The default SPS configuration is specified in 9.2.3. Except for handover or releasing SPS, E-UTRAN does not reconfigure sps-Config when there is a configured downlink assignment or a configured uplink grant (see 36.321 [6]).
srb-identity
Value 1 is applicable for SRB1 only.
Value 2 is applicable for SRB2 only.

FIG. 21 is a diagram illustrating a D2D-Config information element according to an embodiment of the present disclosure.

Each information element included in a D2D-config field 2100 of FIG. 20 is as shown in FIG. 21.

For example, one or more pieces of information may be included from among ID information of a group that executes D2D communication, discovery frequency information, D2D frequency information, information associated with a D2D scheduling scheme (for example, interval information of D2D semi-persist scheduling), information associated with the number of Conf SPS-Processes, duration information, drb-ToAddModList information, and d2dUE-Identity information.

The method in which a D2D communication UE according to an embodiment of the present disclosure explicitly transmits a D2D communication termination message to a BS, has been described. Also, the detailed example of each signal has been described.

As described, there may be various methods for a BS to allocate radio resources. As an example, such methods may include a method of fixedly allocating radio resources, a method of dynamically allocating radio resources, a method of scheduling based on a Semi-Persistent Scheduling (SPS) scheme, or the like.

In embodiments of the present disclosure, the scheme may be applied. Particularly, for example, the operations of the present disclosure will be described in association with the method of allocating radio resources based on the SPS scheme from among the various methods.

For example, when the SPS scheme is used, the present embodiment may operate as follows.

1. A first UE that desires D2D communication according to the present embodiment transmits, to a BS, a D2D communication start message as a first signal. The start message may include one or more pieces of information from among indication information indicating D2D communication, resource request information that requests resources required for D2D communication, and assistance information including information associated with an amount of data to be transmitted through D2D.

2. The BS receives the communication start message and may allocate, to the first UE that transmits the communication start message, radio resources to be used for D2D communication through a second signal. For example, the BS may set an SPS configuration for D2D communication of the first UE through an RRC connection reconfiguration procedure. The BS may activate a corresponding D2D-dedicated SPS using a D2D-RNTI through a PDCCH. As another example, the BS may set a D2D-dedicated SPS configuration, and the first UE that receives a corresponding message may configure an SPS and immediately activate the SPS.

3. The first UE that is assigned with the resources may execute D2D communication with the second UE, for D2D communication, using the corresponding radio resource.

4. When D2D communication is terminated or when the first UE or the second UE does not have data to be transmitted or received through D2D communication during a predetermined period of time, the first UE may transmit a D2D communication termination message to the BS as a third signal. The termination message may include one or more pieces of information from among indication information indicating the termination of D2D communication and buffer information of the first UE associated with the data transmitted through D2D. Also, the termination of D2D communication may be determined based on the radio resource information required for D2D communication or information associated with data to be transmitted, which the BS receives from the first UE.

5. The BS that receives the termination message may collect a corresponding radio resource and allocate the radio resource for another communication, thereby effectively managing radio resources.

Second Embodiment: A Method of Setting an Available Period Associated with Radio Resource Allocation (for Example, D2D Duration Setting Method)

This is a method of implicitly indicating the release of a radio resource by setting a duration for the radio resource allocation for inter-UE direct communication. Hereinafter, the descriptions will be provided by using the D2D communication as an example of the inter-UE direct communication.

When providing a first UE with the described D2D assistance information or allocating a radio resource for D2D communication, the BS may provide duration information which is the available period of the D2D communication. As an example, the D2D assistance information may further include one or more pieces of information from among D2D discovery radio resource information, D2D communication radio resource information, ID information associated with an adjacent UE, and location information of an adjacent UE.

The first UE that receives a message including the available period information may start a timer based on a duration value. When the timer expires, the corresponding assistance information may be released and the D2D communication may be terminated.

Therefore, the first UE that desires to continue the D2D communication may transmit a re-request message to the BS before or after the timer expires.

First Example of the Second Embodiment: A Method of Setting an Available Period (Duration) when an SPS is Configured The implicit release method of the present embodiment may be applied to the radio resource allocation executed based on the SPS scheme.

FIG. 22 is a diagram illustrating a signal flow according to another embodiment of the present disclosure.

A BS may transmit, to a first UE, SPS configuration information for allocating radio resources for D2D communication. The SPS configuration may include the available period (duration) information of the corresponding SPS information. The first UE that receives the SPS configuration information may start a timer based on an available period (duration) value when the configuration information is received or an SPS activation message is received. When the timer expires, the corresponding SPS configuration information may be deactivated or released. Therefore, the first UE that desires to continue the D2D communication may transmit, to the BS, a re-request message for re-requesting a radio resource, before or after the timer expires.

The operations of the first example of the second embodiment will be described in detail using an example, with reference to FIG. 22. Each procedure is as follows.

1. A first UE 2209 transmits, to a BS 2201, a request message for D2D communication with a second UE in operation S2210. The corresponding request message may include radio resource allocation request information. Also, this may further include assistance information for D2D communication. For example, the assistance information may include one or more pieces of information from among information associated with an amount of data to be transmitted through D2D communication, information associated with a type of data for D2D communication, ID information of an adjacent UE that desires D2D communication, information associated with a DRB to be transmitted through D2D communication, and a desired available period (duration) value. As another example, an amount of D2D data may be buffer status information of the first UE for D2D communication.

The D2D assistance information may be configured as an RRC connection reconfiguration message.

2. The BS 2201 transmits, to the first UE 2209, SPS configuration information by including available period (duration) information, based on the received information in operation S2220. For example, the SPS configuration information may be existing SPS-config information, or may be D2D-SPS-config information that is newly defined for D2D.

Also, the SPS configuration information may further include assistance information for D2D communication. For example, the assistance information may include one or more pieces of information from among D2D discovery channel information, D2D frequency information, D2D radio resource allocation information, ID information of an adjacent UE, location information of an adjacent UE, information associated with a DRB to be converted into D2D communication, HARQ process information to be used for D2D communication, and ID information associated with a group to be used for D2D communication.

3. The first UE 2209 that receives the SPS configuration starts a timer based on the available period (duration) value in operation S2230. That is, the first UE 2209 that receives a signal including the SPS configuration information, the radio resource allocation information, and the available period information, may start an internal timer based on the available period information. As another example, the timer may start when the BS 2201 transmits indication information that indicates starting the corresponding timer. That is, the BS transmits the SPS configuration information and the available period information first, and starts the timer through the indication information.

4. The first UE 2209 executes D2D communication with the second UE 2202 using the radio resources allocated based on the received signal in operation S2240.

5. When the timer expires, the corresponding SPS configuration information is deactivated or released in operation S2250.

6. Therefore, the first UE 2209 that desires to continue the D2D communication transmits a re-request message before or after the timer expires in operation S2260. That is, the D2D communication is not terminated yet according to the information associated with the D2D communication status, and thus, a re-request message that re-requests a radio resource may be transmitted. The re-request message may be the request message, or may be a message including a Buffer Status Report (BSR) associated with an amount of data to be transmitted through D2D (an amount of data enters the buffer of the first UE). Although FIG. 22 illustrates that operation S2260 is executed after operation S2250, operation S2260 may be executed before operation S2250 as described above. Alternatively, the operations may be executed in parallel.

As another example, FIG. 22 illustrates that the first UE 2209 starts a timer and determines the expiration. However, the BS 2201 may start a timer and determine the expiration. In this instance, the BS 2201 reallocates a radio resource when a re-request message is received from the first UE before or after the timer expires, and restarts the timer. Alternatively, both the first UE 2209 and the BS 2201 may be capable of starting a timer.

FIG. 23 is a diagram illustrating an SPS-Config information element according to another embodiment of the present disclosure.

Referring to FIG. 23, SPS configuration information 2300 that a BS transmits to a first UE may include a semiPersistSchedC-RNTI field, a sps-ConfigDL field, an sps-ConfigUL field, a D2DsemiPersistSchedC-RNTI field, and the like. That is, a C-RNTI field based on a D2D-dedicated SPS scheme may be included, and SPS configuration information in an uplink and a downlink may be included.

Referring to FIGS. 24 and 25, an information element associated with sps-ConfigDL and sps-ConfigUL will be described using examples.

FIG. 24 is a diagram illustrating an SPS-ConfigDL information element out of the SPS-Config information element according to another embodiment of the present disclosure.

Referring to FIG. 24, an SPS-ConfigDL field may include one or more pieces of information from among SPS interval information of a downlink, downlink SPS available period (duration) information, and group ID information.

FIG. 25 is a diagram illustrating an SPS-ConfigUL information element out of the SPS-Config information element according to another embodiment of the present disclosure.

Referring to FIG. 25, an SPS-ConfigUL field may include one or more pieces of information from among SPS interval information, implicitReleaseAfter information, twoIntervalsConfig information, and uplink SPS available period (duration) information.

The first UE may receive a signal including information of FIGS. 23 to 25, and operate a timer. Also, based on the expiration of the timer, the first UE may transmit a re-request message, when re-requesting is needed before or after the expiration. When re-requesting is not needed, the first UE terminates D2D communication without the transmission of a termination message, and the BS may collect the corresponding radio resource and use the same for another purpose. Therefore, the BS may efficiently manage radio resources.

Each field or information element that may be included in the SPS configuration information described in FIG. 23 to FIG. 25 may include various pieces of information, as shown in Table 4 provided below.

TABLE 4

| SPS-Config field descriptions |
|---|
| semiPersistSchedC-RNTI |
| Semi-persistent Scheduling C-RNTI, see TS 36.321 [6]. |
| semiPersistSchedIntervalDL |
| Semi-persistent scheduling interval in downlink, see TS 36.321 [6]. |
| Value in number of sub-frames. Value sf10 corresponds to 10 sub-frames, sf20 corresponds to 20 sub-frames and so on. For TDD, the UE shall round this parameter down to the nearest integer (of 10 sub-frames), e.g. sf10 corresponds to 10 sub-frames, sf32 corresponds to 30 sub-frames, sf128, corresponds to 120 sub-frames. |
| numberOfConfSPS-Processes |
| The number of configured HARQ processes for Semi-Persistent Scheduling. see TS 36.321 [6]. |
| n1-PUCCH-AN-PersistentList |
| List of parameter: $n_{PUCCH}^{(1,p)}$ for antenna port P0, see TS 36.213, [23, 10.1]. |
| twoAntennaPortActivated |
| Parameter and reference tbd. |
| n1-PUCCH-AN-PersistentListP1 |
| List of parameter: $n_{PUCCH}^{(1,p)}$ for antenna port P1, see TS 36.213, [23, 10.1]. |

TABLE 4-continued

SPS-Config field descriptions semiPersistSchedIntervalUL
Semi-persistent scheduling interval in uplink, see TS 36.321 [6].
Value in number of sub-frames. Value sf10 corresponds to 10
sub-frames, sf20 corresponds to 20 sub-frames and so on. For TDD,
the UE shall round this parameter down to the nearest integer
(of 10 sub-frames), e.g. sf10 corresponds to 10 sub-frames,
sf32 corresponds to 30 sub-frames, sf128 corresponds to 120
sub-frames.
ImplicitReleaseAfter
Number of empty transmissions before implicit release, see TS
36.321 [6, 5.10.2]. Value e2 corresponds to 2 transmissions,
e3 corresponds to 3 transmissions and so on.
p0-NominalPUSCH-Persistent
Parameter: $P_{O\_NOMINAL\_PUSCH}(0)$. See TS 36.213 [23, 5.1.1.1], unit
dBm step 1. This field is applicable for persistent scheudling,
only. If choice 'setup' is used and p0-Persistent is absent,
apply the value of p0-NominalPUSCH for p0-
NominalPUSCH-Persistent.
p0-UE-PUSCH-Persistent
Parameter: $P_{O\_UE\_PUSCH}(0)$. See TS 36.213 [23, 5.1.1.1], unit dB.
This field is applicable for persistent scheduling, only.
If choice 'setup' is used and p0-Persistent is absent,
apply the value of p0-UE-PUSCH for p0-UE-PUSCH-Persistent.
twoIntervalsConfig
Trigger of two-intervals-Semi-Persistent. Scheduling in uplink.
See TS 36.321 [6, 5.10]. If this field is persent, two-intervals-SPS is
enabled for uplink. Otherwise, two-intervals-SPS is disabled.

Second Example of the Second Embodiment: A Method of Setting Available Period when a Radio Resource for Inter-UE Direct Communication is Allocated For example, when D2D communication is executed as the inter-UE direct communication, an available period (duration) may be set when radio resource allocation (resource allocation configuration) is configured.

FIG. 26 is a diagram illustrating a signal flow when a timer is used, according to an embodiment of the present disclosure.

Referring to FIG. 26, a first UE 2609 requests a BS 2601 to allocate a radio resource for D2D communication with a second UE or to start D2D communication in operation S2610. In operation S2610, the first UE 2609 transmits a communication request message or a radio resource allocation message by including available period (duration) information therein.

The BS 2601 transmits, to the first UE 2609, D2D assistance information or radio resource allocation information for D2D communication by including available period information therein in operation S2620. As another example, the BS 2601 may transmit, to the first UE 2609, the radio resource allocation information and the D2D assistance information together. In this instance, the BS 2601 may execute transmission by including the available period information. For example, the D2D assistance information may include one or more pieces of information from among D2D discovery channel information, D2D frequency information, D2D radio resource allocation information, ID information associated with an adjacent UE, and location information of an adjacent UE. In this instance, the transmitted available period information may be identical to or different from the available period information that the first UE 2609 transmits to the BS 2601 in operation S2610. The BS 2601 may set the available period information based on the available period information transmitted from the first UE 2609, and may transmit the same.

The first UE 2609 that receives the message of operation S2620 starts a timer based on an available period (duration) value included in the message in operation S2630. Subsequently, the first UE 2609 executes communication with a second UE 2602 using the allocated radio resource in operation S2640.

When the available period of the timer expires in operation S2650, the D2D assistance information and/or radio resource allocation information may be released. Therefore, the D2D communication of the first UE 2609 may be terminated.

Accordingly, the first UE 2609 transmits a message for re-requesting D2D communication to the BS 2601 when it is needed to continue the D2D communication in operation S2660. For example, the first UE 2609 may transmit a re-request message before or after the timer expires. Although FIG. 26 illustrates that operation S2660 is executed after operation S2650, operation S2650 may be executed after operation S2660 or the operations may be executed in parallel.

As another example, FIG. 26 illustrates the first UE 2609 starting a timer and determining the expiration. However, the BS 2601 may start a timer and determine the expiration. In this instance, the BS 2601 reallocates a radio resource when a re-request message is received from the first UE before or after the timer expires, and restarts the timer. Alternatively, both the first UE 2609 and the BS 2601 may be capable of starting a timer.

When the first UE 2609 terminates the D2D communication before the timer expires, the first UE 2609 may not transmit a separate re-request message. When the timer expires, the BS 2601 collects the corresponding radio resource and uses the same for another purpose.

As another example, the BS may broadcast a System Information Block (SIB) by including radio resource allocation information and/or available period information for inter-UE direct communication.

For example, the BS may include, in the SIB, the available period (duration) information or information associated with a maximum quantity of radio resources for each session of inter-UE direct communication, and the like, and may broadcast the same. As another example, the BS may execute broadcasting by further including priority information of the inter-UE direct communication. The first UE may determine whether to execute D2D communication based on the priority information included in the SIB, or to execute general mobile communication through a BS.

FIG. 27 is a diagram illustrating a SystemInformationBlockType1x information element according to an embodiment of the present disclosure.

An information element included in the SIB will be described by using the case of D2D as an example, which may be configured as shown in FIG. 27. Referring to FIG. 27, the SIB includes one or more pieces of information from among D2D discovery frequency information, D2D frequency information, available period (duration) information of a D2D radio resource, and D2D priority information. In addition, information for the D2D communication of the first UE may be further included.

The first UE may receive the D2D discovery frequency information through the SIB, the available period information, the priority information, or the like, and execute the D2D communication with a second UE based on the corresponding information.

Although embodiments of the present disclosure have been described with reference to drawings using a BS as an example, embodiments of the present disclosure may be equally applied to a radio resource allocation entity that is capable of managing the corresponding D2D communication in addition to the BS. As described above, the radio resource allocation entity may refer to an entity or a predetermined terminal that has one or more functions from among allocating radio resources for D2D communication, transmitting a sync channel, and managing a D2D communication group.

The operations of the present embodiment, which have been described using an example for each embodiment, will be described from the perspective of a first UE and a BS.

Figure 28:
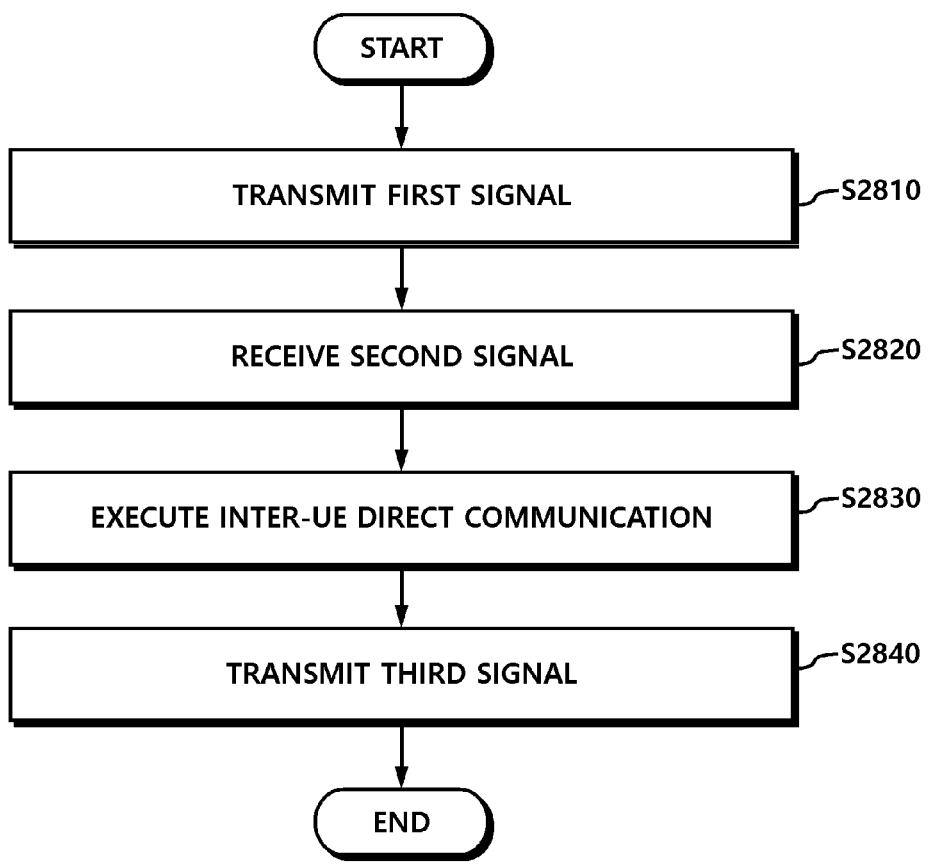
FIG. 28 is a flowchart illustrating operations of a first UE according to an embodiment of the present disclosure.

FIG. 28 is a flowchart illustrating operations of a first UE according to an embodiment of the present disclosure.

A method for a first UE to execute inter-UE direct communication with a second UE according to an embodiment of the present disclosure may include: transmitting, to at least one of a BS and a radio resource allocation entity, a first signal including radio resource allocation request information for inter-UE direct communication with the second UE in operation S2810.

According to the above described embodiments of the present disclosure, the first signal may include at least one piece of information from among radio resource allocation request information for inter-UE direct communication with the second UE, assistance information for inter-UE direct communication, indication information indicating inter-UE direct communication, information associated with an amount of data to be transmitted through inter-UE direct communication, buffer status information of inter-UE-direct communication, and available period information of a timer. For example, the assistance information may include information required for the first UE to be assigned with a radio resource for executing the inter-UE direct communication, such as information associated with an amount of data to be transmitted through inter-UE direct communication, information associated with a type of data for inter-UE direct communication, ID information of an adjacent UE that desires inter-UE direct communication, and information associated with a DRB to be transmitted through inter-UE direct communication.

The method of the first UE includes receiving a second signal including radio resource allocation information from the BS or the radio resource allocation entity in operation S2820.

According to the above described embodiments of the present disclosure, the second signal may include radio resource allocation information. As another example, the second signal may further include the available period information of a radio resource.

As another example, the second signal may further include assistance information for inter-UE direct communication. For example, the assistance information may include one or more pieces of information from among discovery radio resource information for inter-UE direct communication, communication radio resource information for inter-UE direct communication, identification information of an adjacent UE located within a predetermined distance from the first UE, location information of an adjacent UE, identification information of a group that executes inter-UE direct communication, and information associated with a data radio bearer to be converted into the inter-UE direct communication.

As another example, the second signal may be received by being included in the system information block, and the second signal may further include one or more pieces of information from among available period information of the radio resource and priority information of the inter-UE direct communication.

The plurality of pieces of information included in the second signal may be separately transmitted, or one or more pieces of information may be transmitted together.

The method of the first UE includes executing the inter-UE direct communication with the second UE based on the radio resource allocation information in operation S2830. That is, the first UE may execute inter-UE direct communication based on the information received through the second signal. Executing the inter-UE direct communication may refer to executing, with at least one second UE, transmission or reception of data and signals using radio resources.

The method of the first UE includes transmitting a third signal including information associated with the status of inter-UE direct communication with the second UE in operation S2840.

According to the above described embodiments of the present disclosure, the third signal may include various information.

For example, in the first embodiment, the third signal may include one or more pieces of information from among indication information indicating the termination of inter-UE direct communication and buffer status information for inter-UE direct communication. That is, a termination message indicating the termination of the inter-UE direct communication may be included, and residual buffer status information may be included. The BS may receive the same, and may allocate a radio resource for another purpose.

As another example, in the second embodiment, the third signal may include information that requests reallocation of a radio resource based on whether the available period of the radio resource expires. That is, the third signal may include re-request message information. Also, in the second embodiment, when the first UE no longer needs the radio resource, the third signal may not be transmitted.

Also, the radio resource allocation entity refers to an entity that executes at least one function from among allocating radio resources for inter-UE direct communication, transmitting a sync channel, and managing a UE group for inter-UE direct communication.

In addition, the first UE may execute all the operations required when each embodiment of the present invention is executed.

Figure 29:
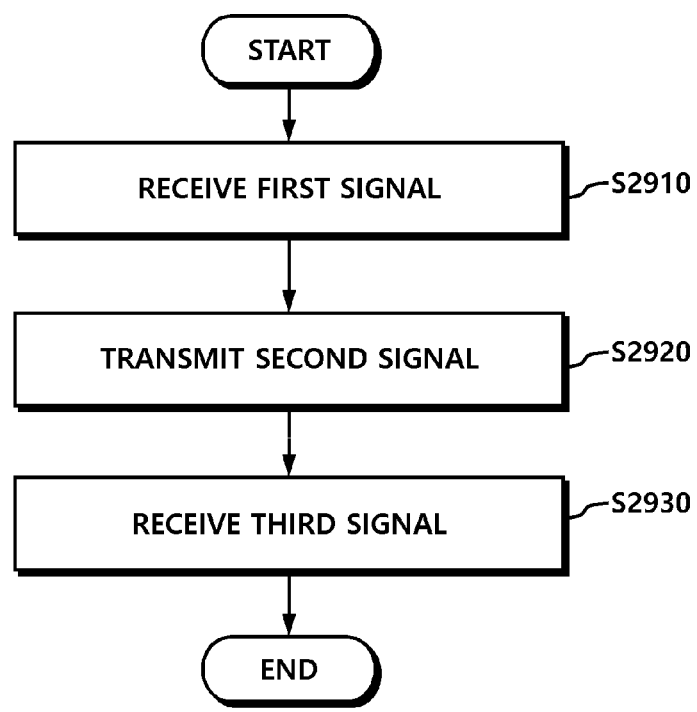
FIG. 29 is a flowchart illustrating the operations of a BS according to an embodiment of the present disclosure.

FIG. 29 is a flowchart illustrating operations of a BS according to an embodiment of the present disclosure.

A method for a BS to control inter-UE direct communication according to another embodiment of the present disclosure includes receiving, from a first UE, a first signal including radio resource allocation request information for inter-UE direct communication in operation S2910.

The first signal according to the above described embodiments of the present disclosure may include at least one piece of information from among radio resource allocation request information for inter-UE direct communication, assistance information for inter-UE direct communication, and available period information of a timer. For example, the assistance information may include information required for the first UE to be assigned with a radio resource for executing the inter-UE direct communication, such as information associated with an amount of data to be transmitted through inter-UE direct communication, information associated with a type of data for inter-UE direct communication, ID information of an adjacent UE that desires inter-UE direct communication, and information associated with a DRB to be transmitted through inter-UE direct communication.

The method of the BS includes transmitting a second signal including radio resource allocation information in operation S2920.

According to the above described embodiments of the present disclosure the second signal may include radio resource allocation information. As another example, the second signal may further include available period information of the radio resource.

As another example, the second signal may further include assistance information for inter-UE direct communication. For example, the assistance information may include one or more pieces of information from among discovery radio resource information for inter-UE direct communication, communication radio resource information for inter-UE direct communication, identification information of an adjacent UE located within a predetermined distance from the first UE, location information of an adjacent UE, identification information of a group that executes inter-UE direct communication, and information associated with a data radio bearer to be converted into the inter-UE direct communication.

As another example, the second signal may be transmitted by being included in the system information block, and may further include one or more pieces of information from among available period information of the radio resource and priority information of the inter-UE direct communication.

The plurality of pieces of information included in the second signal may be separately transmitted, or one or more pieces of information may be transmitted together.

The method of the BS includes receiving, from the first UE, a third signal including information associated with the status of inter-UE direct communication in operation S2930.

According to the above described embodiments of the present invention, the third signal may include various information.

For example, in the first embodiment, the third signal may include one or more pieces of information from among indication information indicating the termination of inter-UE direct communication and buffer status information for inter-UE direct communication. That is, a termination message indicating the termination of the inter-UE direct communication may be included, and residual buffer status information may be included. The BS may receive the same, and may allocate a radio resource for another purpose.

As another example, in the second embodiment, the third signal may include information that requests reallocation of a radio resource based on whether the available period of the radio resource expires. That is, the third signal may include re-request message information. Also, in the second embodiment, when the first UE no longer needs the radio resource, the third signal may not be received.

In addition, the BS may execute all the operations required when each embodiment of the present invention is executed. For example, in an embodiment of the present invention, the method of the BS may further include operating an expiration timer of allocated SPS configuration information, radio resource allocation information, or the like. Also, in another embodiment of the present invention, the BS may further include SPS configuration information in the second signal as radio resource allocation information.

Among the operations of the first UE and the BS that have been described above, a few operations may be combined as a single operation and a single operation may be separated into two or more operations and may be executed. Also, the operations may be executed in different orders. Also, one or more of the operations may be omitted.

Also, the above described embodiments of the present disclosure may configure an embodiment by combining predetermined configurations or predetermined embodiments, and each embodiment may be executed as an embodiment.

According to the present embodiments as described above, a BS or a radio resource allocation entity may efficiently allocate radio resources used for inter-UE direct communication, so as to efficiently manage the radio resources of the mobile communication network.

Also, when a BS or a radio resource allocation entity allocates radio resources for inter-UE direct communication, the BS or the radio resource may obtain information whether an allocated radio resource is used, for effective allocation or distribution of radio resources.

Also, according to the present embodiments, the BS may recognize whether the first UE executes inter-UE direct communication, and may dynamically control a radio resource that is allocated to the first UE for the inter-UE direct communication.

3. Method of Reporting the Status of Inter-UE Direct Communication

In the inter-UE direct communication, a UE may execute communication with a target UE using a radio resource. Therefore, it requires allocation of a radio resource used when the UE executes the inter-UE direct communication. Also, the UE is required to detect a target UE, which is a target of the inter-UE direct communication. To this end, when a discovery procedure for inter-UE direct communication is required, it is required to allocate a radio resource for the discovery. As an example, as a method of allocating a radio resource for the discovery of inter-UE direct communication, the following scheme may be used. As an example, a method of commonly allocating a radio resource to a UE group or all UEs for inter-UE direct communication may be considered. As another example, a method of allocating a radio resource for each UE for inter-UE direct communication may be considered. Particularly, the method of allocating a radio resource for each UE may be a method of allocating a radio resource every time that a request for transmission is generated. Also, the method may be a radio resource allocating method based on a semi-persistent scheme.

Also, the radio resource allocation entity refers to an entity that executes at least one function from among allocating radio resources for inter-UE direct communication, transmitting a sync channel, and managing a group that executes inter-UE direct communication. That is, in the case of D2D communication, the radio resource allocation entity may be referred to as various terms, such as, a cluster head, a central control entity, a central entity, and the like. From the perspective of the function, the radio resource allocation entity refers to an entity that executes some of the functions of a BS, such as allocating radio resources when UEs are located outside the coverage of the D2D communication scenario, transmitting a sync channel, managing a D2D group, or the like. Hereinafter, although, for ease of description, the descriptions will be provided using a BS as an example, the operation including the radio resource allocation entity instead of the BS may be included in the scope of the present embodiment.

As described above, the BS may have difficulty in recognizing how many inter-UE direct communications are currently executed in its coverage or how many UEs currently execute the inter-UE direct communication. Therefore, it is difficult to accurately recognize whether an amount of radio resources which have been allocated for inter-UE direct communication is insufficient or excessive. This may cause the drawback in that a limited amount of radio resources may be inefficiently used.

Accordingly, the BS may need to recognize the status of inter-UE direct communication that is currently executed among UEs in its coverage. Through the above, based on the information associated with the status of the inter-UE direct communication, the BS may adjust an amount of radio resources and execute allocation. That is, the BS may efficiently manage a limited amount of resources, and a UE may be assigned with an appropriate amount of radio resources for the inter-UE direct communication, and thus, the inter-UE direct communication may be efficiently managed.

Hereinafter, each embodiment of the present disclosure for efficient radio resource allocation will be exemplified with a detailed example.

Figure 30:
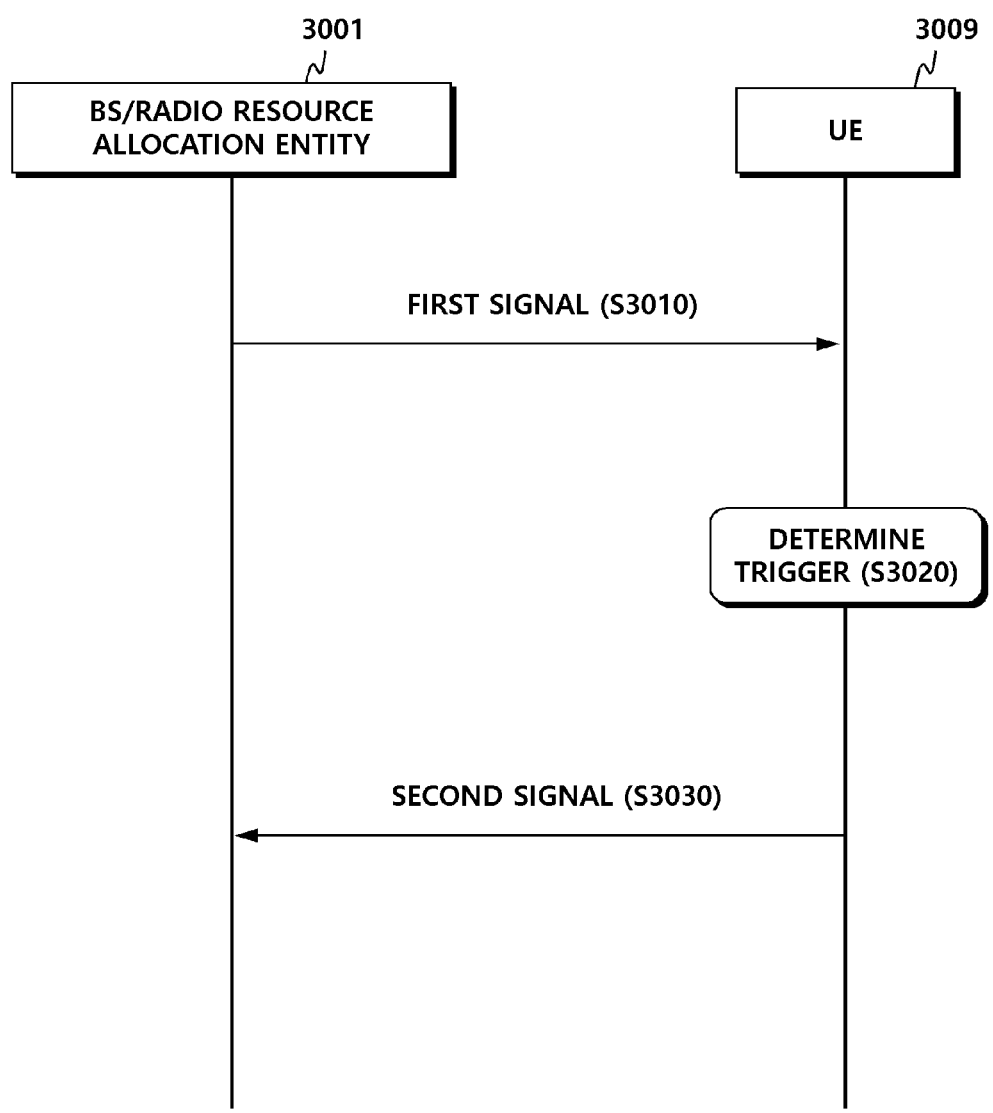
FIG. 30 is a diagram illustrating operations of a UE and a BS according to an embodiment of the present disclosure.

FIG. 30 is a diagram illustrating operations of a UE and a BS according to an embodiment of the present disclosure.

A method for a UE to transmit a status report of inter-UE direct communication according to an embodiment of the present disclosure may include: receiving a first signal including inter-UE direct communication configuration information from a BS or a radio resource allocation entity; determining whether the status report of the inter-UE direct communication is triggered based on triggering condition information; and transmitting a second signal including the status report of the inter-UE direct communication to a BS or a radio resource allocation entity.

For example, referring to FIG. 30, a BS or a radio resource allocation entity 3001 transmits, to a UE 3009, a first signal including inter-UE direct communication configuration information, in operation S3010. The inter-UE direct communication configuration information may include configuration information which is required when the UE executes inter-UE direct communication and reports the status of the inter-UE direct communication. For example, the inter-UE direct communication configuration information may include radio resource allocation information for inter-UE direct communication. As another example, the inter-UE direct communication configuration information may include configuration information for the status report of the inter-UE direct communication. As another example, the inter-UE direct communication configuration information may include both the radio resource allocation information for the inter-UE direct communication and the inter-UE direct communication status report configuration information.

A first signal that the BS or the radio resource allocation entity 3001 transmits to the UE 3009 may be transmitted through a system information block (SIB) or a higher layer signaling. For example, the higher layer signaling may be an RRC signaling.

The UE 3009 that receives the first signal may determine whether the inter-UE direct communication status report is triggered, based on triggering condition information in operation S3020. The triggering condition information may be transmitted by being included in the first signal. Alternatively, the triggering condition information may be set in advance in the UE 3009. For example, in the case where the UE 3009 receives the first signal and executes inter-UE direct communication, when the transmission of the inter-UE direct communication fails, the inter-UE direct communication status report may be triggered. Alternatively, the inter-UE direct communication status report may be triggered based on a predetermined number of times or a predetermined period of time. Alternatively, the triggering condition information may be set based on a predetermined period. The triggering condition information may be included in the inter-UE direct communication configuration information of the first signal and may be received by the UE 3009, or may be set in advance in the UE 3009. Alternatively, parameter information associated with a standard for reporting a status may be transmitted to the UE 3009, and the UE 3009 may determine whether reporting is triggered based on the corresponding parameter information.

When the determined triggering condition is satisfied in operation S3020, the UE 3009 transmits a second signal including the inter-UE direct communication status report to the BS or the radio resource allocation entity 3001. The inter-UE direct communication status report may include inter-UE direct communication discovery failure information or inter-UE direct communication failure information. Also, the second signal may include one or more pieces of information from among information associated with a target UE when the UE executes inter-UE direct communication, information associated with an amount of data to be transmitted or received through inter-UE direct communication, data transmission success rate information, and information associated with group communication. In addition, various pieces of information may be included, such as information associated with a time and a location where the UE executes inter-UE direct communication, or the like. Particularly, for example, the second signal may include a report indicating whether inter-UE direct communication exists, a report associated with the number of inter-UE direct communication UEs, a report associated with the number of inter-UE direct communication sessions, a report associated with the number of times of failure of the transmission of inter-UE direct communication discovery message, a report of the number of times of failure of the transmission of inter-UE direct communication data, a report associated with throughput of a UE that executes inter-UE direct communication, and a buffer status report of a UE, or the like. The corresponding information may be included in the inter-UE direct communication status report.

The BS or the radio resource allocation entity 3001 may receive the second signal from the UE 3009, and may adjust an amount of radio resources to be allocated based on the inter-UE direct communication status report information.

First Embodiment: a Case when Inter-UE Direct Communication is Successfully Executed FIG. 31 is a diagram illustrating operations of a UE and a BS according to an embodiment of the present disclosure.

Referring to FIG. 31, each operation for transmitting an inter-UE direct communication status report when a UE successfully executes inter-UE direct communication, will be described.

A BS 3101 transmits inter-UE direct communication configuration information to recognize an inter-UE direct communication status in operation S3110. Corresponding inter-UE direct communication configuration information may be transmitted through an SIB or a higher layer signaling. Inter-UE direct communication status report configuration information, for example, the number of inter-UE direct communication UEs, the number of inter-UE direct communication sessions, the number of times of failure of inter-UE direct communication, or the like, may be transmitted through the SIB. Alternatively, the BS 3101 may transmit inter-UE direct communication discovery radio resource allocation information together with status report configuration information, to a UE 3109 that desires inter-UE direct communication, through an RRC message.

FIG. 32 is a diagram illustrating an example of information, which may be included in inter-UE direct communication configuration information, according to another embodiment of the present disclosure.

The inter-UE direct communication configuration information that the BS 3101 transmits to the UE 3109 may include information associated with D2D radio resource allocation information and information associated with D2D communication status report configuration information, as illustrated in FIG. 7. Although the descriptions have been provided using D2D as an example in FIG. 7, this may be applied to any case that executes inter-UE direct communication.

Subsequently, the UE 3109 executes, with a target UE 3102, the transmission or reception of an inter-UE direct communication discovery message based on the inter-UE direct communication configuration information in operation S3120. The discovery message executes preparation required to search for the target UE 3102 and to execute communication before the UE 3109 executes the inter-UE direct communication.

When the UE 3109 successfully executes transmission and reception of an inter-UE direct communication discovery message, the UE 3109 executes inter-UE direct communication using radio resources allocated from the BS 3101 in operation S3130.

Subsequently, the UE 3109 that currently executes inter-UE direct communication may determine whether an inter-UE direct communication status report is triggered based on the inter-UE direct communication configuration information. Alternatively, based on triggering condition information that is set in advance in the UE 3109, whether it is triggered may be determined. When the triggering condition is satisfied, the UE 3109 transmits the inter-UE direct communication status report to the BS 3101 in operation S3140.

As another example, the UE 3109 may transmit the inter-UE direct communication status report when a report request message that requests reporting the status of inter-UE direct communication is received from the BS 3101. That is, the UE may transmit the inter-UE direct communication status report by request from the BS. In this instance, the triggering condition information may indicate whether a request message that a BS transmits to a UE is received.

FIG. 33 is a diagram illustrating exemplary information, which may be included in inter-UE direct communication status report information, according to an embodiment of the present disclosure.

In the inter-UE direct communication status report, a plurality of pieces of information associated with inter-UE direct communication may be included as illustrated in FIG. 33. FIG. 33 illustrates exemplary information included in an inter-UE direct communication status report, in the case of D2D as an example of the inter-UE direct communication. Therefore, the inter-UE direct communication status report may include various information required when a BS allocates radio resources, such as location information associated with inter-UE direct communication or the like.

A BS may adjust the allocation of radio resources for a UE based on a received inter-UE direct communication status report. For example, the BS may execute terminating the allocation of radio resources or additionally allocating radio resources.

Figure 34:
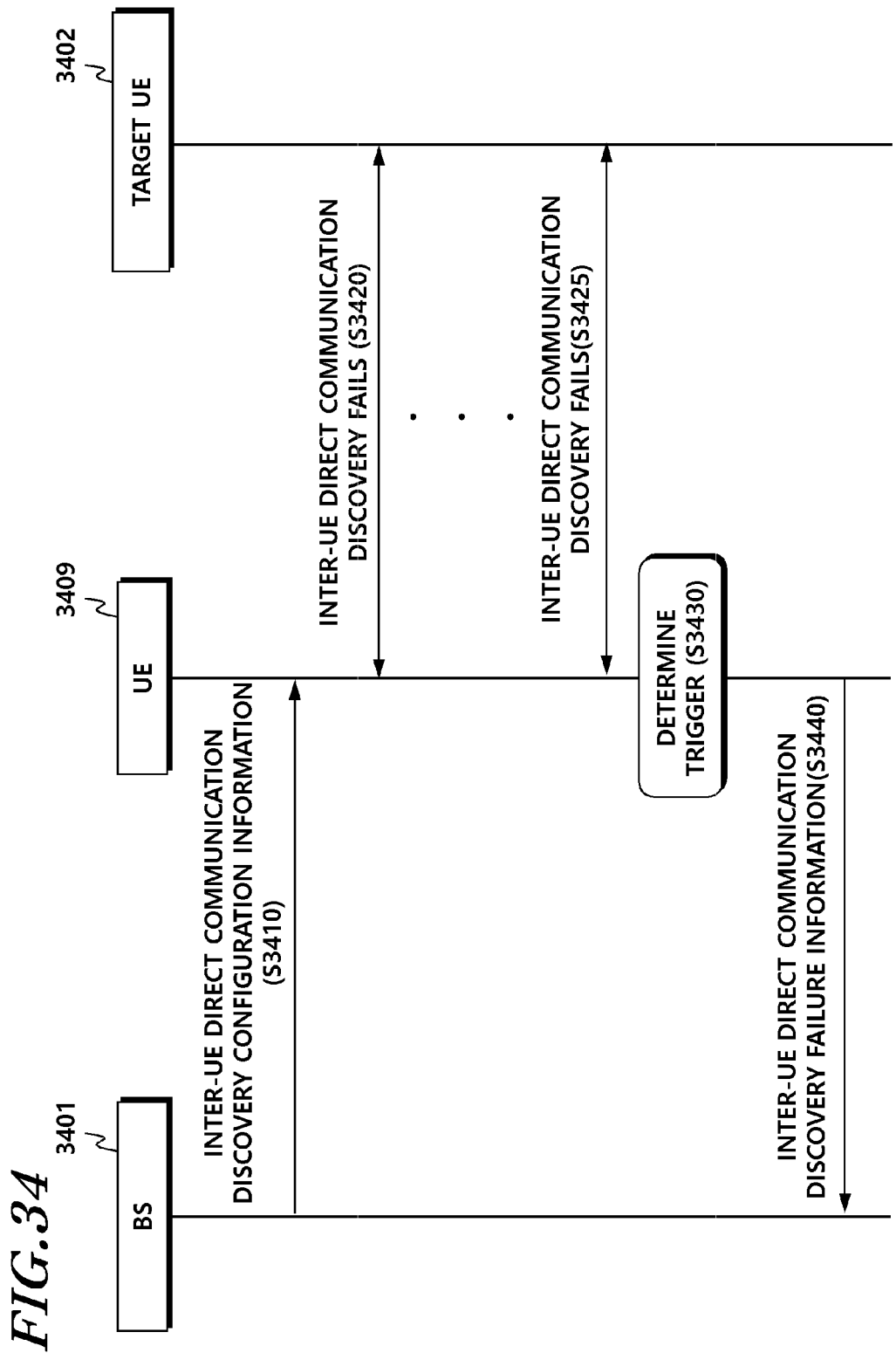
FIG. 34 is a diagram illustrating operations of a UE and a BS when inter-UE direct communication discovery fails according to an embodiment of the present disclosure.

Second Embodiment: A Case in which Transmission of an Inter-UE Direct Communication Discovery Message Fails FIG. 34 is a diagram illustrating operations of a UE and a BS when inter-UE direct communication discovery fails according to an embodiment of the present disclosure.

When the transmission of an inter-UE direct communication discovery message fails during a predetermined period of time or a predetermined number of times, a UE 3409 suspends the transmission of the discovery message and reports, to a BS, a failure report including information associated with the number of times of failure, failure time (duration) or the like.

Each operation will be described using an example. A BS 3401 may transmit discovery message transmission configuration information for inter-UE direct communication to the UE 3409. For example, the discovery message transmission configuration information may include one or more pieces of information from among radio resource allocation information, information associated with a maximum number of times that the transmission of a discovery message is attempted, and information associated with a maximum time that the transmission of a discovery message is attempted. Also, the discovery message transmission configuration information may be included in the inter-UE direct communication configuration information that has been described with reference to FIG. 30. Therefore, this may be transmitted through an SIB or an RRC message.

The UE 3409 may attempt the transmission of the discovery message using a corresponding radio resource, based on the discovery message transmission configuration information which may be included in the inter-UE direct communication configuration information received from the BS 3401. In this instance, the transmission of the discovery message, executed by the UE 3409, may fail. For example, when the transmission of the discovery message is attempted by a plurality of UEs using an identical radio resource, the corresponding discovery message transmission fails in operation S3420.

The UE 3409 that fails the transmission of the discovery message may retransmit a discovery signal after a predetermined period of time, using an identical or another radio resource. When the UE 3409 retransmits the discovery message, the information associated with a predetermined period of time or the number of times of retransmissions may be included in the discovery message transmission configuration information. Alternatively, this may be set in advance in a UE.

Although the UE 3409 transmits the discovery message during a predetermined number of times or a predetermined period of time, the transmission may fail in operation S3425.

In this instance, the UE 3409 determines a triggering condition to transmit discovery failure information to the BS 3401 in operation S3430. For example, the triggering condition may be included in inter-UE direct communication configuration information or may be set in advance in a UE. As an example, the triggering condition may include one or more cases including i) a case in which the transmission of a discovery message, executed by a UE, fails at least a predetermined number of times, ii) a case in which the transmission fails during a predetermined period of time, iii)

a case in which a period that is set for periodic reporting is satisfied, and iv) a case in which a report request message is received from a BS.

When the triggering condition is satisfied, the UE 3409 transmits, to the BS 3401, the inter-UE direct communication discovery failure information in operation S3440. The discovery failure information may be transmitted by being included in the inter-UE direct communication status report that has been described in FIG. 30.

The discovery failure information may include various pieces of information, such as information associated with causes of failure of discovery or the like. As an example, the information associated with the failure of discovery may include one or more pieces of information from among the following information.

- the number of times of failure of the transmission of a discovery message: Information associated with the number of times of failure of the transmission of a discovery message during a predetermined period of time set by a BS or a predetermined period of time set in advance in a UE may be included.
- a period of time (duration) of failure of the transmission of a discovery message: Information associated with a period of time from the first failure of the transmission of a discovery message to the present time or information associated with a period of time from the first failure to a point immediately before the first successful transmission may be included.
- location information of a UE: The current location information of a UE may be included. The current location information of the UE may be obtained from a positioning system such as a GPS or a GNSS. Alternatively, a serving cell and/or neighboring cell measurement information or the like, which is measured based on a measuring operation of a UE, may be included.
- identification information of an inter-UE direct communication group where a UE belongs: Identification information that a UE uses for communication of a group (for example, D2D group) that currently executes inter-UE direct communication may be included. As an example, the identification information may be a predetermined value used to distinguish a group, such as an identifier or an index.
- an amount of data for inter-UE direct communication transmission: Buffer information associated with inter-UE direct communication or the like may be included.

The BS 3401 reallocates a radio resource or executes allocation by changing a radio resource, based on the received discovery failure information.

Figure 35:
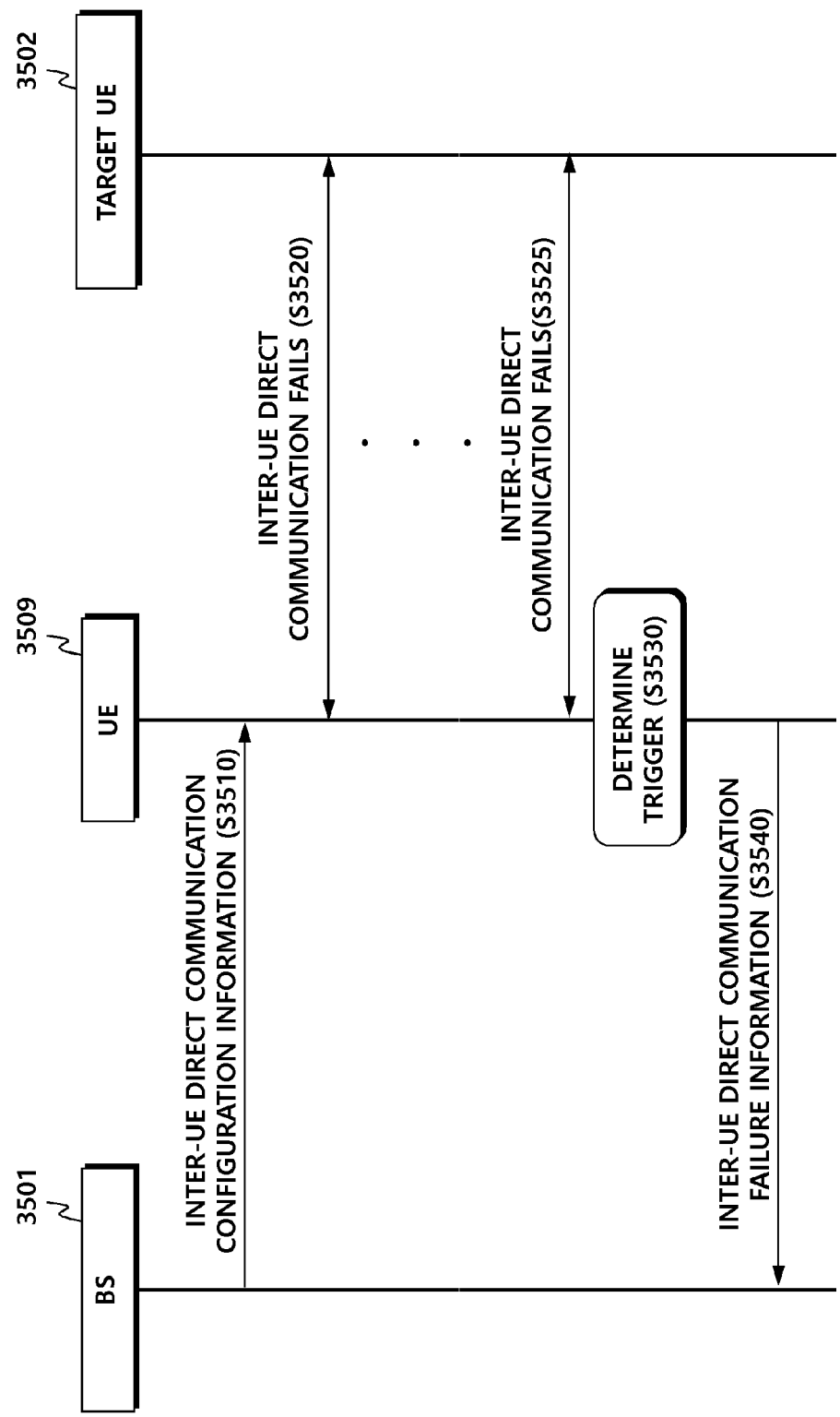
FIG. 35 is a diagram illustrating operations of a UE and a BS when the execution of inter-UE direct communication fails according to another embodiment of the present disclosure.

Third Embodiment: A Case when the Transmission of Inter-UE Direct Communication Data Fails FIG. 35 is a diagram illustrating operations of a UE and a BS when the execution of inter-UE direct communication fails according to another embodiment of the present disclosure. FIG. 35 is a diagram illustrating an example in which a UE successfully executes the transmission or reception of a discovery message and fails to transmit data. In this instance, the UE transmits, to a BS, inter-UE direct communication failure information which is associated with the failure of the transmission of data.

Each operation will be described in detail with reference to FIG. 35.

A UE 3509 that desires inter-UE direct communication transmission receives inter-UE direct communication configuration information from a BS 3501, in operation S3510.

The inter-UE direct communication configuration information may include radio resource allocation information for inter-UE direct communication, the described discovery message transmission configuration information, and the like. The UE 3509 may attempt the transmission or reception of data by selecting some or all of the radio resources allocated for inter-UE direct communication. The radio resource information may be included in the inter-UE direct communication discovery message transmitted or received by the UE 3509. Also, as described above, the radio resource information may be included in the inter-UE direct communication configuration information that is received from the BS 3501 through an SIB or a higher layer signaling.

The UE 3509 attempts transmission or reception of data for inter-UE direct communication. In this instance, the UE 3509 may fail the transmission or reception of data, in operation S3520. When the transmission or reception of data fails, the UE 3509 attempts transmission again by selecting a radio resource after a predetermined period of time in operation S3525. Information associated with the predetermined period of time that the UE 3509 uses for the retransmission of data may be included in the inter-UE direct communication configuration information or may be set in advance in the UE.

When data transmission or reception fails in the inter-UE direct communication, the UE 3509 determines whether a triggering condition is satisfied. For example, the transmission of inter-UE direct communication failure information may be triggered upon the generation of predetermined events. Such predetermined events may be generated i) when the transmission of data fails at least a predetermined number of times, ii) when the transmission fails during a predetermined period of time, iii) when the information is periodically reported and a period condition is satisfied, and iv) when a BS request message is received.

When the transmission of inter-UE direct communication failure information is triggered, the UE 3509 transmits, to the BS 3501, the corresponding information in operation S3540. The inter-UE direct communication failure information may be transmitted by being included in an inter-UE direct communication status report.

For example, the inter-UE direct communication failure information may include the following information.

- the number of times of failure of the transmission of inter-UE direct communication data: Information associated with the number of times of failure of the transmission during a predetermined period of time set by a BS or a predetermined period of time set in advance may be included.
- the period of time (duration) of failure of the transmission of inter-UE direct communication data: Information associated with a period of time from the first failure of the transmission of inter-UE direct communication data up to the present time or information associated with a period of time from the first failure to a point immediately before the first successful transmission may be included.
- location information of a UE: The current location information of a UE may be included. The current location information of the UE may be obtained from a positioning system such as a GPS or a GNSS. Also, a serving cell and/or neighbor cell measurement information or the like, which is measured by a UE, may be included.
- identification information of an inter-UE direct communication group where a UE belongs: Identification information that a UE uses for the communication of an inter-UE direct communication group that currently executes communication may be included. As an example, the identification information may be a predetermined value used to distinguish a group, such as an identifier or an index.

an amount of data for inter-UE direct communication transmission: Buffer information associated with inter-UE direct communication or the like may be included.

The BS 3501 reallocates a radio resource or executes allocation by changing a radio resource, based on the received inter-UE direct communication failure information.

As described above, according to the present embodiment, a BS receives an inter-UE direct communication status report from a UE, and efficiently allocates radio resources. That is, the BS may allocate radio resources for inter-UE direct communication, based on the necessity of inter-UE direct communication executed in the coverage of the BS, status information, or the like. Therefore, the BS may efficiently allocate and manage radio resources. Also, from the perspective of the UE, the UE may accurately receive radio resources required for inter-UE direct communication and may increase the success rate of the inter-UE direct communication.

Hereinafter, operations of a UE and a BS in accordance with embodiments of the present disclosure will be described with reference to drawings.

Figure 36:
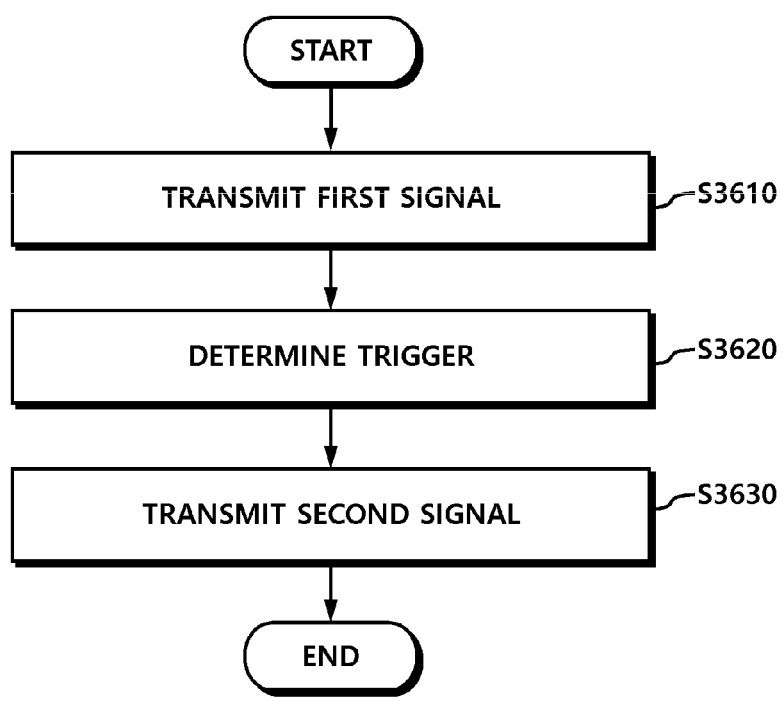
FIG. 36 is a flowchart illustrating operations of a UE according to an embodiment of the present disclosure.

FIG. 36 is a flowchart illustrating operations of a UE according to an embodiment of the present disclosure.

A method for a UE to transmit a status report of inter-UE direct communication according to an embodiment of the present disclosure may include: receiving a first signal including inter-UE direct communication configuration information from at least one of a BS and a radio resource allocation entity; determining whether the status report of the inter-UE direct communication is triggered based on triggering condition information; and transmitting a second signal including the status report of the inter-UE direct communication to at least one of a BS and a radio resource allocation entity.

Referring to FIG. 36, a UE receives a first signal from at least one of a BS and a radio resource allocation entity in operation S3610. The first signal may include inter-UE direct communication configuration information. For example, the first signal may include radio resource allocation information required when the UE executes inter-UE direct communication. The first signal may include configuration information for an inter-UE direct communication status report. Additionally, the first signal may include the described discovery message transmission configuration information.

Also, the first signal may be received through an SIB or a higher layer signaling. For example, the higher layer signaling may be an RRC signaling.

The UE may receive the first signal and may attempt inter-UE direct communication. That is, the UE may transmit a discovery message for inter-UE direct communication, or may transmit data.

The UE monitors whether an inter-UE direct communication status report is triggered based on triggering condition information in operation S3620. As described above, the triggering condition may be received by being included in the first signal. Alternatively, this may be set in advance in the UE. Alternatively, whether the triggering condition is satisfied may be determined based on whether a request message is received from the BS.

When the triggering condition is satisfied, the UE transmits a second signal including an inter-UE direct communication status report to at least one of the BS and the radio resource allocation entity in operation S3630. As described above, the UE may transmit a second signal based on whether inter-UE direct communication is successfully executed, whether the transmission or reception of a discovery message fails, or whether the transmission of data fails. The second signal may include information associated with the inter-UE direct communication information, as described in FIG. 33. Alternatively, like the case of the second embodiment and the third embodiment, the second signal may include discovery failure information or inter-UE direct communication failure information. Alternatively, the second signal may include all the three types of information or two or more pieces of information.

The above described radio resource allocation entity may include a BS. The radio resource allocation entity may refer to an entity that executes at least one of a function of allocating radio resources for inter-UE direct communication, a function of transmitting a sync channel, and a function of managing a UE group that executes inter-UE direct communication.

Figure 37:
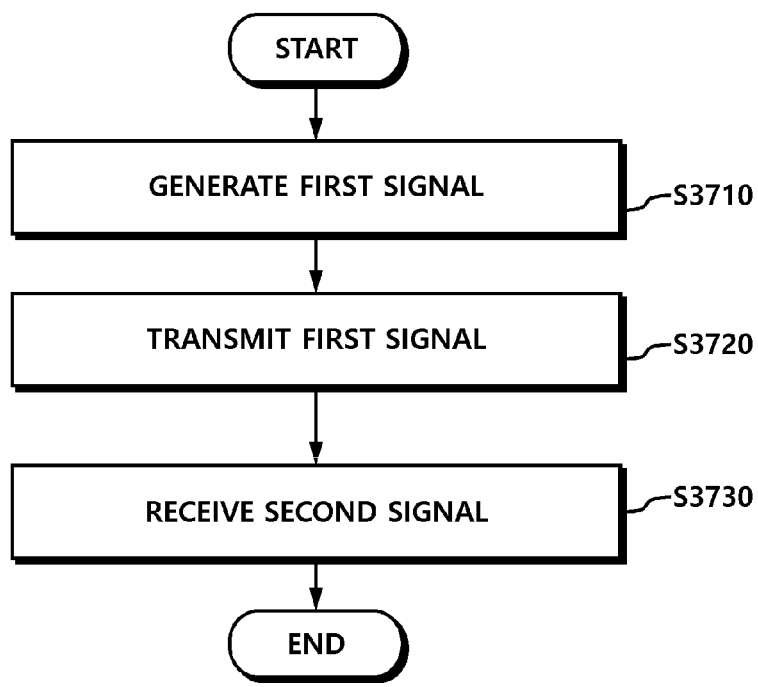
FIG. 37 is a flowchart illustrating operations of a BS according to an embodiment of the present disclosure.

FIG. 37 is a flowchart illustrating operations of a BS according to an embodiment of the present disclosure.

A method for a BS to receive an inter-UE direct communication status report according to an embodiment of the present disclosure may include: generating a first signal including inter-UE direct communication configuration information; transmitting the first signal to a UE; and receiving, from the UE, a second signal including an inter-UE direct communication status report.

Referring to FIG. 37, the BS generates a first signal including inter-UE direct communication configuration information, to be transmitted to a UE, in operation 3710. For example, the first signal may include radio resource allocation information required when the UE executes inter-UE direct communication, and may include configuration information for an inter-UE direct communication status report. Additionally, the first signal may include the described discovery message transmission configuration information.

The BS transmits the generated first signal to the UE in operation S3720. As an example, the first signal may be transmitted through an SIB or a higher layer signaling. Also, the higher layer signaling may be an RRC signaling.

When an inter-UE direct communication status report of the UE is triggered, the BS receives a second signal in operation S3730. The BS may transmit triggering condition information by including the same in the first signal. Alternatively, the BS may transmit, to the UE, a request message that requests the transmission of the inter-UE direct communication status report. When the request message is received, the UE may determine that the triggering condition is satisfied and may transmit the second signal.

The second signal may include various information based on whether inter-UE direct communication is successfully executed, whether the transmission or reception of a discovery message fails, or whether the transmission of data fails. For example, the second signal may include information associated with the inter-UE direct communication, as described in FIG. 33. Alternatively, like the case of the second embodiment and the third embodiment, the second signal may include the discovery failure information or inter-UE direct communication failure information. Alternatively, the second signal may include all the three types of information or two or more pieces of information.

The BS may receive the second signal including the inter-UE direct communication status report, and may determine the allocation of radio resources. Alternatively, the BS may determine whether to change an allocated radio resource.

The UE and the BS may implement the embodiments of the present disclosure through the above described operations.

The configurations of the first UE and the BS, which may implement the above described embodiments of the present invention, will be described with reference to drawings.

Figure 38:
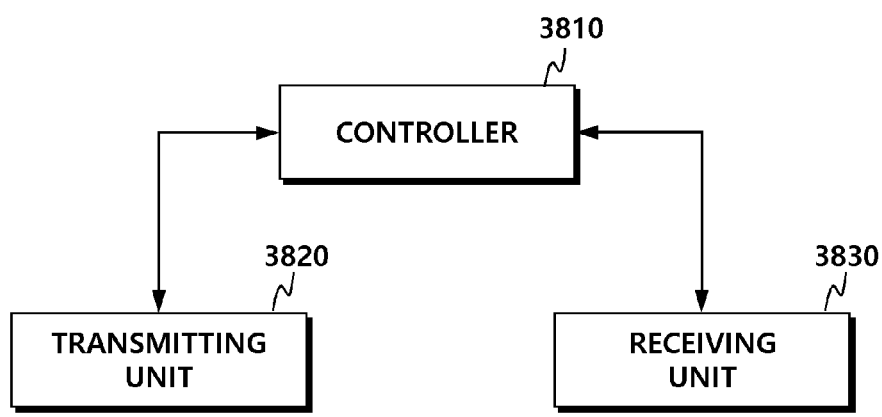
FIG. 38 is a diagram illustrating a configuration of a first UE according to an embodiment of the present disclosure.

FIG. 38 is a diagram illustrating configuration of a first UE according to an embodiment of the present disclosure.

In association with a buffer status reporting method of the present disclosure, the configuration of a first UE will be described first.

A first UE 3800 according to an embodiment of the present disclosure may include: a controller 3810 configured to trigger a Buffer Status Report (BSR) for inter-UE direct communication with a second UE; a transmitting unit 3820 configured to transmit a BSR to a BS or a radio resource allocation entity; and a receiving unit 3830 configured to receive radio resource allocation information for the inter-UE direct communication with the second UE from a BS or a radio resource allocation entity.

Referring to FIG. 38, the controller 3810 may control the operations of the first UE in association with triggering a BSR required to receive the allocation of radio resources used for executing the inter-UE direct communication with the second UE, configuring and transmitting the BSR, which are needed to implement the above described embodiments of the present invention.

Also, the controller 3810 may trigger the BSR upon occurrence of predetermined events. Such predetermined events occurs i) when the first UE initiates the inter-UE direct communication with the second UE, ii) when the inter-UE direct communication begins, iii) when a radio resource request is received from the second UE that is to execute inter-UE direct communication with the first UE, iv) when data for inter-UE direct communication, which has a higher priority, enters a buffer, v) when data for inter-UE direct communication enters the buffer, vi) when data for inter-UE direct communication exists in the buffer, and a retransmission timer expires, and vii) when a timer for transmitting the BSR expires.

Also, when configuring the BSR to be transmitted to a BS or a radio resource allocation entity, the controller 3810 may execute a control to include a logical channel identity index value for inter-UE direct communication, which is distinguished from a logical channel identity index value for the communication with a BS. Also, as described above, when the UE configures D2D connections with a plurality of UEs, the controller 3810 may execute a control to include a D2D connection identity index value in the BSR. Alternatively, both a logical channel identity index value and a D2D connection identity index value may be included, or a separate index value for defining the two values may be included.

Also, the controller 3810 may perform control operation so as to include buffer status information associated with a logical channel for the communication with a BS and a logical channel for inter-UE direct communication. In this instance, the logical channel for inter-UE direct communication may be allocated to a logical channel group, which is distinguished from the logical channel for the communication with the BS.

The transmitting unit 3820 may transmit the BSR to the BS or the radio resource allocation entity. That is, as described above, when inter-UE direct communication with the second UE is executed, the BSR may be transmitted to the BS or the radio resource allocation entity, instead of the second UE.

The receiving unit 3830 may receive a signal including radio resource allocation information for executing inter-UE direct communication with the second UE, from the BS or the radio resource allocation entity.

In addition, the transmitting unit 3820 and the receiving unit 3830 may transmit or receive signals, data, and messages to/from the BS. Further, the transmitting unit 3820 and the receiving unit 3830 may transmit or receive signals, data, or the like to/from the second UE through inter-UE direct communication.

In order to perform the radio resource allocating method in accordance with the present embodiment, the first UE has configuration as follows.

The first UE 3800 according to an embodiment of the present disclosure includes the controller 3810, the transmitting unit 3820, and the receiving unit 3830.

The controller 3810 may control the general operations of the first UE, in association with an operation of reporting, to the BS, whether to request or terminate radio resources required for executing inter-UE direct communication with the second UE, or the like, which is required to implement the above described present invention.

Particularly, for example, the first UE 3800 that executes inter-UE direct communication may include: a transmitting unit 3820 that transmits, to at least one of the BS and the radio resource allocation entity, a first signal including radio resource allocation request information for inter-UE direct communication with the second UE; a receiving unit 3830 that receives a second signal including radio resource allocation information from at least one of the BS and the radio resource allocation entity; and a controller 3810 that executes inter-UE direct communication with the second UE based on the radio resource allocation information.

Also, the transmitting unit 3820 may further transmit a third signal including information associated with the status of the inter-UE direct communication with the second UE.

In addition, the transmitting unit 3820 and the receiving unit 3830 may be used for transmitting and receiving signals, messages, or data which are required to implement the above described present invention, to/from the BS, the radio resource allocation entity, or the second UE which is a target of the inter-UE direct communication.

According to the above described embodiments of the present disclosure, the transmitting unit 3830 may transmit the first signal that includes at least one piece of information from among radio resource allocation request information for inter-UE direct communication with the second UE, assistance information for inter-UE direct communication, indication information indicating inter-UE direct communication, information associated with an amount of data to be transmitted through inter-UE direct communication, buffer status information of inter-UE-direct communication, and available period information of a timer. For example, the assistance information may include information required for the first UE to be assigned with a radio resource for executing the inter-UE direct communication, such as information associated with an amount of data to be transmitted through inter-UE direct communication, information associated with a type of data for inter-UE direct communication, ID information of an adjacent UE that desires inter-UE direct communication, and information associated with a DRB to be transmitted through inter-UE direct communication.

Also, the receiving unit 3830 may receive the second signal including the radio resource allocation information, according to the embodiments of the present invention. As another example, the second signal may further include available period information of the radio resource. As another example, the second signal may further include assistance information for inter-UE direct communication. For example, the assistance information may include one or more pieces of information from among discovery radio resource information for inter-UE direct communication, communication radio resource information for inter-UE direct communication, identification information of an adjacent UE located within a predetermined distance from the first UE, location information of an adjacent UE, identification information of a group that executes inter-UE direct communication, and information associated with a data radio bearer to be converted into the inter-UE direct communication.

As another example, the receiving unit 3830 may receive the second signal through a system information block, and one or more pieces of information from among available period information of the radio resource and priority information of the inter-UE direct communication may be further included.

The plurality of pieces of information included in the second signal may be separately transmitted, or one or more pieces of information may be transmitted together.

Also, the transmitting unit 3820 may transmit a third signal including various information, according to the embodiments of the present disclosure.

For example, in the first embodiment, the third signal may include one or more pieces of information from among indication information indicating the termination of inter-UE direct communication and buffer status information for inter-UE direct communication. That is, a termination message indicating the termination of the inter-UE direct communication with the second UE may be included, and residual buffer status information may be included. The BS may receive the same, and may allocate a radio resource for another purpose.

As another example, in the second embodiment, the third signal may include information that requests reallocation of a radio resource based on whether the available period of the radio resource expires. That is, the third signal may include re-request message information. Also, in the second embodiment, when the first UE no longer needs the radio resource, the third signal may not be transmitted.

Also, the radio resource allocation entity refers to an entity that executes at least one of a function of allocating radio resources for inter-UE direct communication, a function of transmitting a sync channel, and a function of managing a UE group that executes inter-UE direct communication.

In addition, the first UE may execute all the operations required for implementing each embodiment of the present disclosure.

In order to perform the communication status reporting method in accordance with the present embodiments, a UE has a configuration as follows.

The UE 3800 according to another embodiment of the present disclosure may include: the receiving unit 3830 that receives a first signal including inter-UE direct communication configuration information from the BS or the radio resource allocation entity; the controller 3810 that determines whether an inter-UE direct communication status report is triggered based on triggering condition information; and the transmitting unit 3820 that transmits a second signal including the inter-UE direct communication status report to the BS or the radio resource allocation entity.

Particularly, the controller 3810 may control the general operations of the UE, which are required to determine that the inter-UE direct communication status report is triggered and to transmit the inter-UE direct communication status report, which are required to implement the above described present invention. For example, the controller 3810 may determine whether the inter-UE direct communication status report is triggered based on the triggering condition information that is received from the BS or that is set in advance in the UE. Also, the controller 3810 may control an operation for executing inter-UE direct communication with a target UE.

The transmitting unit 3820 may transmit the second signal to the BS or the radio resource allocation entity when the inter-UE direct communication status report is triggered. The inter-UE direct communication status report included in the second signal may include various information according to the above described embodiments of the present invention. For example, the second signal may include information associated with the inter-UE direct communication, as described in FIG. 8. Alternatively, like the case of the second embodiment and the third embodiment, the second signal may include the discovery failure information or inter-UE direct communication failure information. Alternatively, the second signal may include all the three types of information or two or more pieces of information. Also, the transmitting unit 3820 may transmit data and signals through the inter-UE direct communication with the target UE.

The receiving unit 3830 may receive the first signal including inter-UE direct communication configuration information from the BS or the radio resource allocation entity. For example, the first signal may include radio resource allocation information required when the UE executes inter-UE direct communication, and may include configuration information for an inter-UE direct communication status report. Additionally, the first signal may include the described discovery message transmission configuration information. Also, the first signal may be received through an SIB or a higher layer signaling. For example, the higher layer signaling may be an RRC signaling.

In addition, the transmitting unit 3820 and the receiving unit 3830 may be used for transmitting and receiving a signal or a message and data required for implementing the above described present invention, to/from a UE.

Figure 39:
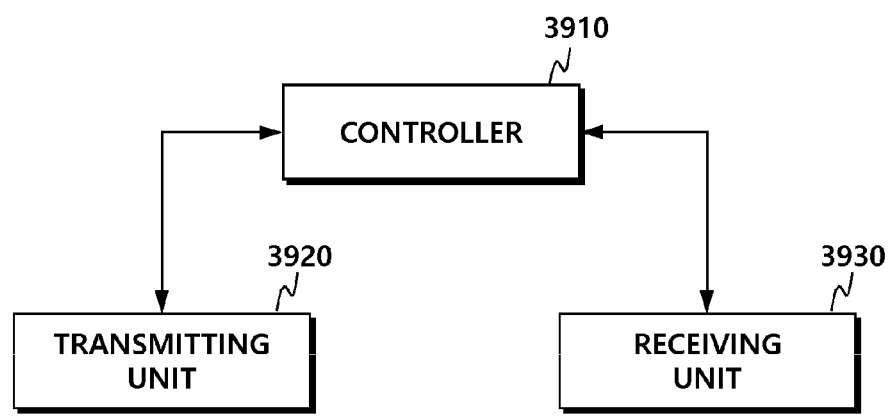
FIG. 39 is a diagram illustrating a configuration of a BS according to an embodiment of the present disclosure.

FIG. 39 is a block diagram illustrating a configuration of a BS according to an embodiment of the present disclosure.

A configuration of a BS for a buffer status reporting method of the present disclosure will be described first.

A BS 3900 according to an embodiment of the present disclosure may include a receiving unit 3930 to receive a BSR from a first UE when the BSR of a first UE for inter-UE direct communication is triggered, and a transmitting unit 3920 to transmit radio resource allocation information for inter-UE direct communication based on the BSR.

Referring to FIG. 39, the controller 3910 may control the operations of the BS 3900 in association with receiving a BSR including buffer information for inter-UE direct communication from the first UE and allocating radio resources for inter-UE direct communication, which are required to implement the embodiments of the present invention.

Also, the controller 3910 may allocate a logical channel for the inter-UE direct communication to a logical channel group, which is distinguished from a logical channel for the communication with the BS. That is, in the situation in which an incorporated BSR is transmitted according to the second embodiment, to distinguish the communication through a BS and inter-UE direct communication, the controller 3910 may execute a control to not allocate each logical channel into an identical logical channel group.

The receiving unit 3930 may receive a BSR from the first UE.

For example, the BSR may include a logical channel identity index value for inter-UE direct communication, which is distinguished from a logical channel identity index value for the communication with a BS. That is, a dedicated BSR for inter-UE direct communication may be configured and received. Also, as described above, when the UE configures D2D connections with a plurality of UEs, the BSR may include a D2D connection identify index value. Alternatively, both a logical channel identity index value and a D2D connection identity index value may be included, or a separate index value for defining the two values may be included.

As another example, the BSR may include buffer status information associated with a logical channel for the communication with a BS and a logical channel for inter-UE direct communication, and the logical channel for inter-UE direct communication may be allocated to a logical channel group that is distinguished from a logical channel for the communication with a BS. That is, when a BSR of the inter-UE direct communication and a BSR for the communication through the BS are incorporated and received, the characteristic of the logical channel for the inter-UE direct communication may be allocated to a predetermined logical channel group. Through the above, the BS may distinguish the logical channel group through the BS and the logical channel group for the inter-UE direct communication although the received BSR is an incorporated BSR. Therefore, the buffer information for the inter-UE direct communication may be distinguished, and radio resources may be allocated based on the buffer information.

The transmitting unit 3920 may transmit the radio resource allocation information to the first UE. The radio resource allocation information that the BS 3900 transmits may be information that is configured based on the buffer status report that is received based on the scheme described in the above embodiments of the present invention. For example, when the first UE transmits a buffer status report including information associated with an amount of data for inter-UE direct communication so to execute the inter-UE direct communication with the second UE, a BS may determine the buffer status report, which is configured through the above embodiments of the present invention. Subsequently, the BS may allocate an appropriate amount of radio resources based on the information associated with the amount of data of the first UE for the inter-UE direct communication.

In addition, the transmitting unit 3920 may transmit, to the first UE, downlink data, signals, messages, or the like. The receiving unit 3930 may further receive, from the first, uplink data, signals, messages, and the like.

In order to perform the radio resource allocating method of the present disclosure, a BS may have a configuration as follows.

The BS 3900 according to another embodiment of the present disclosure may include the receiving unit 3930, the controller 3910, and the transmitting nit 3920.

The controller 3910 may control the general operations of the BS in association with allocating radio resources for inter-UE direct communication, recognizing the termination of inter-UE direct communication between the first UE and the second UE, and managing radio resources, which are required to implement the present invention.

Particularly, for example, the BS 3900 according to another embodiment of the present disclosure may include: the receiving unit 3930 that receives a first signal including radio resource allocating request information for inter-UE direct communication from the first UE; and the transmitting unit 3920 that transmits a second signal including radio resource allocation information.

Also, the receiving unit 3930 may further receive, from the first UE, a third signal including information associated with the status of the inter-UE direct communication with the second UE.

Also, the receiving unit 3930 may receive the first signal that includes at least one piece of information from among radio resource allocation request information for inter-UE direct communication, assistance information for inter-UE direct communication, and available period information of a timer, according to the above described embodiments of the present invention. For example, the assistance information may include information required for the first UE to be assigned with a radio resource for executing the inter-UE direct communication, such as information associated with an amount of data to be transmitted through inter-UE direct communication, information associated with a type of data for inter-UE direct communication, ID information of an adjacent UE that desires inter-UE direct communication, and information associated with a DRB to be transmitted through inter-UE direct communication.

According to an embodiment of the present disclosure, the transmitting unit 3920 may include radio resource allocation information in the second signal. As another example, the second signal may further include available period information of the radio resource. As another example, the second signal may further include assistance information for inter-UE direct communication. For example, the assistance information may include one or more pieces of information from among discovery radio resource information for inter-UE direct communication, communication radio resource information for inter-UE direct communication, identification information of an adjacent UE located within a predetermined distance from the first UE, location information of an adjacent UE, identification information of a group that executes inter-UE direct communication, and information associated with a data radio bearer to be converted into the inter-UE direct communication. As another example, the second signal may be transmitted by being included in the system information block, and may further include one or more pieces of information from among available period information of the radio resource and priority information of the inter-UE direct communication. The plurality of pieces of information included in the second signal may be separately transmitted, or one or more pieces of information may be transmitted together.

Also, the receiving unit 3930 may receive various information as a third signal according to the embodiments of the present disclosure.

For example, in the first embodiment, the receiving unit 3930 may receive one or more pieces of information from among indication information indicating the termination of inter-UE direct communication and buffer status information for inter-UE direct communication, as the third signal. That is, a termination message indicating the termination of the inter-UE direct communication may be included, and residual buffer status information may be included. The BS may receive the same, and may allocate a radio resource for another purpose.

As another example, in the second embodiment, the third signal may include information that requests reallocation of a radio resource based on whether the available period of the radio resource expires. That is, the third signal may include re-request message information. Also, in the second embodiment, when the first UE no longer needs the radio resource, the third signal may not be transmitted.

In addition, the controller 3910 may execute all the operations required to implement the embodiments of the present invention. For example, in an embodiment of the present invention, the controller 3910 may execute a control to operate an expiration timer of allocated SPS configuration information, radio resource allocation information, or the like. Also, in another embodiment of the present invention, the transmitting unit 3920 may transmit the second signal by further including SPS configuration information as radio resource allocation information.

In addition, the receiving unit 3930 may receive, from the first UE, uplink control information, data, a message, through a corresponding channel.

Also, the transmitting unit 3920 may transmit, to the first UE, downlink control information, data, a message, through a corresponding channel.

In order to perform the communication status reporting method of the present embodiment, a BS may have a configuration as follows.

The BS 3900 according to another embodiment of the present disclosure may include: the controller 3910 that generates a first signal including inter-UE direct communication configuration information; the transmitting unit 3920 that transmits the first signal to a UE; and the receiving unit 3930 that receives a second signal including an inter-UE direct communication status report from the UE.

Particularly, the controller 3910 may control the general operations of the BS which are required to generate and transmit inter-UE direct communication configuration information to be transmitted to a UE, to receive an inter-UE direct communication status report from the UE, and to allocate radio resources. For example, the controller 3910 may generate inter-UE direct communication configuration information. The first signal may include radio resource allocation information required when the UE executes inter-UE direct communication, and may include configuration information for an inter-UE direct communication status report. Additionally, the first signal may include the described discovery message transmission configuration information.

Also, the controller 3910 may control an operation associated with the allocation of radio resources for inter-UE direct communication. For example, based on an inter-UE direct communication status report, the controller 3910 may allocate or change a radio resource.

The transmitting unit 3920 may transmit the generated first signal to the UE. The first signal may be transmitted through an SIB or a higher layer signaling.

The receiving unit 3930 may receive, from the UE, a second signal including inter-UE direct communication status report. For example, the second signal may include various information based on whether inter-UE direct communication is successfully executed, whether the transmission or reception of a discovery message fails, or whether the transmission of data fails. Particularly, the second signal may include information associated with the inter-UE direct communication, as described in FIG. 8. Alternatively, like the case of the second embodiment and the third embodiment, the second signal may include the discovery failure information or inter-UE direct communication failure information. Alternatively, the second signal may include all the three types of information or two or more pieces of information.

In addition, the transmitting unit 3920 and the receiving unit 3930 may be used for transmitting and receiving a signal or a message and data required for implementing the above described present invention, to/from a UE.

As described above, in accordance with at least one embodiment, a method and apparatus may be provided for transmitting, to the BS, a BSR including information associated with an amount of data to be transmitted through the inter-UE direct communication when the first UE executes inter-UE direct communication with the second UE.

The buffer status information associated with the inter-UE direct communication may be transmitted by defining dedicated buffer status information. Such buffer status information may be distinguished by allocating a logical channel to a logical channel group that is different from a logical channel group of a logical channel for the transmission or reception of data through the BS.

The BS may receive a BSR and may allocate radio resources based on an amount of data for inter-UE direct communication, according to the above described method. Therefore, by accurately distinguishing the radio resources used for the communication through the BS and the radio resources used for the inter-UE direct communication, the radio resources may be efficiently distributed and managed.

As described above, embodiments of the present disclosure may be applied when the BS dynamically or semi-persistently schedules the radio resources of the inter-UE direct communication. Also, the present invention may be applied when the BS allocates fixed radio resources and does not dynamically control the resources, in addition to the dynamic scheduling and semi-persistent scheduling. That is, although the BS does not control the radio resources based on the status of the use of the inter-UE direct communication, information associated with an amount of data through the inter-UE direct communication may need to be determined and collected and thus, the corresponding information may be received through a buffer status report.

Therefore, embodiments of the present disclosure described above may be applied, irrespective of the detailed scheme in which the BS allocates radio resources for inter-UE direct communication.

Various combinations of the above described embodiments are possible by combining one technical matter with another technical matter of the above described embodiments or combining technical ideas thereof.

Although preferred embodiments of the present disclosure have been described for illustrative purposes, those skilled in the art will appreciate that various modifications, additions and substitutions are possible, without departing from the scope and spirit of the invention as disclosed in the accompanying claims. Therefore, the embodiments disclosed in the present disclosure are intended to illustrate the scope of the technical idea of the present disclosure, and the scope of the present invention is not limited by the embodiment. The scope of the present disclosure shall be construed on the basis of the accompanying claims in such a manner that all of the technical ideas included within the scope equivalent to the claims belong to the present disclosure.

The invention claimed is:

1. A method for a first User Equipment (UE) to execute inter-UE direct communication with a second UE, the method comprising:

transmitting, to at least one of a Base Station (BS) and a radio resource allocation entity, a first signal including radio resource allocation request information for inter-UE direct communication with the second UE;

receiving, from at least one of the BS and the radio resource allocation entity, a second signal including radio resource allocation information, discovery frequency information associated with inter-UE direct communication, and assistance information for inter-UE direct communication, wherein the assistance information includes adjacent UE identification information for identifying at least one UE located within a predetermined distance from the first UE;

executing inter-UE direct communication with the second UE based on the radio resource allocation information; and transmitting, to at least one of the BS and the radio resource allocation entity, a third signal including information associated with a status of inter-UE direct communication with the second UE, wherein the second signal is transmitted by being included in a system information block; and wherein the transmitting a third signal includes:
transmitting, by the first UE, the third signal including indication information indicating termination of inter-UE direct communication with the second UE, to allow at least one of the BS and the radio resource allocation entity to release radio resources allocated for inter-UE direct communication between the first UE and the second UE.

2. The method as claimed in claim 1, wherein the third signal further includes buffer status information for inter-UE direct communication.

3. The method as claimed in claim 1, wherein the second signal further includes available period information of the radio resource.

4. The method as claimed in claim 3, wherein the third signal includes information that requests reallocation of the radio resource based on whether the available period of the radio resource expires.

5. The method as claimed in claim 1, wherein:
the assistance information further includes at least one of discovery radio resource information for inter-UE direct communication, communication radio resource information for inter-UE direct communication, location information associated with an adjacent UE, group identification information associated with a group that executes inter-UE direct communication, and information associated with a data radio bearer to be converted into inter-UE direct communication.

6. The method as claimed in claim 1, wherein:
the second signal further includes available period information of the radio resource.

7. The method as claimed in claim 1, wherein the radio resource allocation entity executes at least one of a function of allocating radio resources for inter-UE direct communication, a function of transmitting a sync channel, and a function of managing a group for inter-UE direct communication.

8. A method for a Base Station (BS) to control inter-User Equipment (UE) direct communication, the method comprising:

receiving, from a first UE, a first signal including radio resource allocation request information for inter-UE direct communication;

transmitting, to the first UE, a second signal including radio resource allocation information, discovery frequency information associated with inter-UE direct communication, and assistance information for inter-UE direct communication, wherein the assistance information includes adjacent UE identification information for identifying at least one UE located within a predetermined distance from the first UE, and the first UE performs inter-UE direct communication with the second UE based on the radio resource allocation information;

receiving, from the first UE, a third signal including information associated with a status of inter-UE direct communication; and releasing radio resources allocated for inter-UE direct communication between the first UE and a second UE when the third signal includes indication information indicating termination of inter-UE direct communication between the first UE and the second UE, wherein the second signal is transmitted by being included in a system information block.

9. The method as claimed in claim 8, wherein the third signal further includes buffer status information for inter-UE direct communication.

10. The method as claimed in claim 8, wherein the second signal further includes available period information of the radio resource.

11. The method as claimed in claim 10, wherein the third signal includes information that requests reallocation of the radio resource based on whether the available period of the radio resource expires.

12. The method as claimed in claim 8, wherein:
the assistance information further includes at least one of discovery radio resource information for inter-UE direct communication, communication radio resource information for inter-UE direct communication, location information associated with an adjacent UE, group identification information associated with a group that executes inter-UE direct communication, and information associated with a data radio bearer to be converted into inter-UE direct communication.

13. The method as claimed in claim 8, wherein:
the second signal further includes available period information of the radio resource.

14. A first User Equipment (UE) for performing inter-UE direct communication with a second UE, the first UE comprising:

a transmitter configured to transmit, to at least one of a Base Station (BS) and a radio resource allocation entity, a first signal including radio resource allocation request information for inter-UE direct communication with the second UE;

a receiver configured to receive, from at least one of the BS and the radio resource allocation entity, a second signal including radio resource allocation information, discovery frequency information associated with inter-UE direct communication, and assistance information for inter-UE direct communication, wherein the assistance information includes adjacent UE identification information for identifying at least one UE located within a predetermined distance from the first UE; and a controller configured to perform inter-UE direct communication with the second UE based on the radio resource allocation information, wherein the second signal is transmitted by being included in a system information block;

wherein the transmitter further transmits, to at least one of the BS and the radio resource allocation entity, a third signal including information associated with a status of inter-UE direct communication with the second UE; and wherein the transmitter transmits the third signal including indication information indicating termination of inter-UE direct communication with the second UE, to allow at least one of the BS and the radio resource allocation entity to release radio resources allocated for inter-UE direct communication between the first UE and the second UE.

15. The first UE as claimed in claim 14, wherein the third signal further includes buffer status information for inter-UE direct communication.

16. The first UE as claimed in claim 14, wherein the second signal further includes available period information of the radio resource.

17. The first UE as claimed in claim 16, wherein the third signal includes information that requests reallocation of the radio resource based on whether the available period of the radio resource expires.

18. The first UE as claimed in claim 14, wherein:
the assistance information further includes at least one of discovery radio resource information for inter-UE direct communication, communication radio resource information for inter-UE direct communication, location information associated with an adjacent UE, group identification information associated with a group that executes inter-UE direct communication, and information associated with a data radio bearer to be converted into inter-UE direct communication.

19. The first UE as claimed in claim 14, wherein:
the second signal further includes available period information of the radio resource.

20. The first UE as claimed in claim 14, wherein the radio resource allocation entity executes at least one of a function of allocating radio resources for inter-UE direct communication, a function of transmitting a sync channel, and a function of managing a group for inter-UE direct communication.

* * * * *